(12) United States Patent
Matsusaka et al.

(10) Patent No.: US 8,576,501 B2
(45) Date of Patent: Nov. 5, 2013

(54) WIDE-ANGLE OPTICAL SYSTEM, IMAGE PICKUP LENS DEVICE, MONITOR CAMERA, AND DIGITAL APPARATUS

(75) Inventors: Keiji Matsusaka, Osaka (JP); Toru Nakatani, Uda (JP)

(73) Assignee: Konica Minolta Opto, Inc., Tokyo (JP)

( * ) Notice: Subject to any disclaimer, the term of this patent is extended or adjusted under 35 U.S.C. 154(b) by 723 days.

(21) Appl. No.: 12/679,703

(22) PCT Filed: Sep. 22, 2008

(86) PCT No.: PCT/JP2008/067075
§ 371 (c)(1),
(2), (4) Date: Mar. 24, 2010

(87) PCT Pub. No.: WO2009/041382
PCT Pub. Date: Apr. 2, 2009

(65) Prior Publication Data
US 2010/0194853 A1    Aug. 5, 2010

(30) Foreign Application Priority Data
Sep. 28, 2007   (JP) ................................ 2007-254791

(51) Int. Cl.
*G02B 3/02* (2006.01)
*G02B 13/18* (2006.01)
*G02B 9/06* (2006.01)

(52) U.S. Cl.
USPC .......................................... 359/717; 359/794

(58) Field of Classification Search
USPC .................. 359/717, 793, 794, 753
See application file for complete search history.

(56) References Cited

U.S. PATENT DOCUMENTS

| 6,025,961 | A | 2/2000 | Kohno et al. ............... 359/691 |
| 7,667,901 | B2 * | 2/2010 | Baba ........................... 359/717 |
| 2005/0168807 | A1 | 8/2005 | Endo ............................ 359/354 |
| 2006/0077563 | A1 | 4/2006 | Mihara et al. ............... 359/680 |
| 2007/0183062 | A1 | 8/2007 | Nakamura ................... 359/781 |
| 2007/0206295 | A1 | 9/2007 | Yamashita et al. ........... 359/717 |
| 2007/0217035 | A1 | 9/2007 | Baba ........................... 359/793 |
| 2008/0130128 | A1 | 6/2008 | Yamashita et al. ........... 359/649 |
| 2008/0316618 | A1 * | 12/2008 | Yamakawa et al. .......... 359/781 |

FOREIGN PATENT DOCUMENTS

| CN | 101029958 A | 9/2007 |
| CN | 101038365 A | 9/2007 |
| EP | 1 830 211 A1 | 9/2007 |
| JP | 4-261510 A | 9/1992 |
| JP | 10-282415 A | 10/1998 |

(Continued)

OTHER PUBLICATIONS

The First Office Action (PCT application Entering the Chinese National Phase) issued in Chinese Patent Application No. 2008 80108550.8 dated Sep. 6, 2011.

*Primary Examiner* — William Choi
(74) *Attorney, Agent, or Firm* — Cozen O'Connor

(57) ABSTRACT

A wide-angle optical system comprises a front lens group (11), and a rear lens group (12), with an aperture stop (13) interposed between. The front lens group (11) includes at least two negative lenses (111, 112) and at least one positive lens (113). At least one of the positive lenses included in the front lens group (11) has at least one aspherical surface. The front lens group (11) satisfies the conditional expression vdp<29 where vdp is the minimum value of the Abbe number of the positive lens(es) included in the front lens group (11).

20 Claims, 71 Drawing Sheets

(56) References Cited

FOREIGN PATENT DOCUMENTS

| | | |
|---|---|---|
| JP | 2005-215389 A | 8/2005 |
| JP | 2005-227426 A | 8/2005 |
| JP | 2006-98432 A | 4/2006 |
| JP | 2006-301222 A | 11/2006 |
| JP | 2007-25499 A | 2/2007 |
| JP | 2007-101920 A | 4/2007 |
| JP | 2007-127960 A | 5/2007 |
| JP | 2007-206516 A | 8/2007 |
| JP | 2007-233152 A | 9/2007 |
| JP | 2007-249073 A | 9/2007 |
| WO | WO 2007/010928 A1 | 1/2007 |
| WO | WO 2009/041382 A1 | 4/2009 |

* cited by examiner

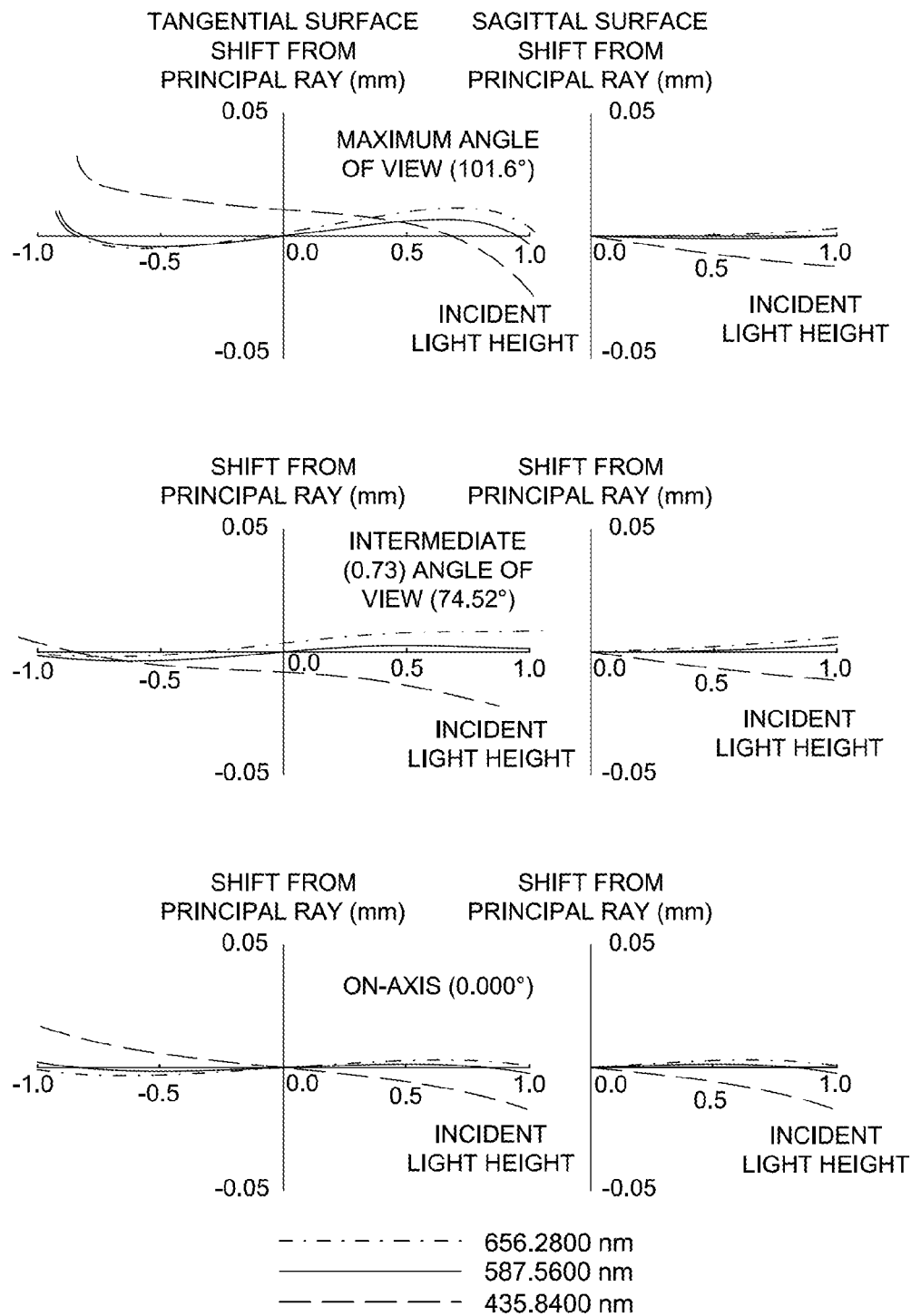

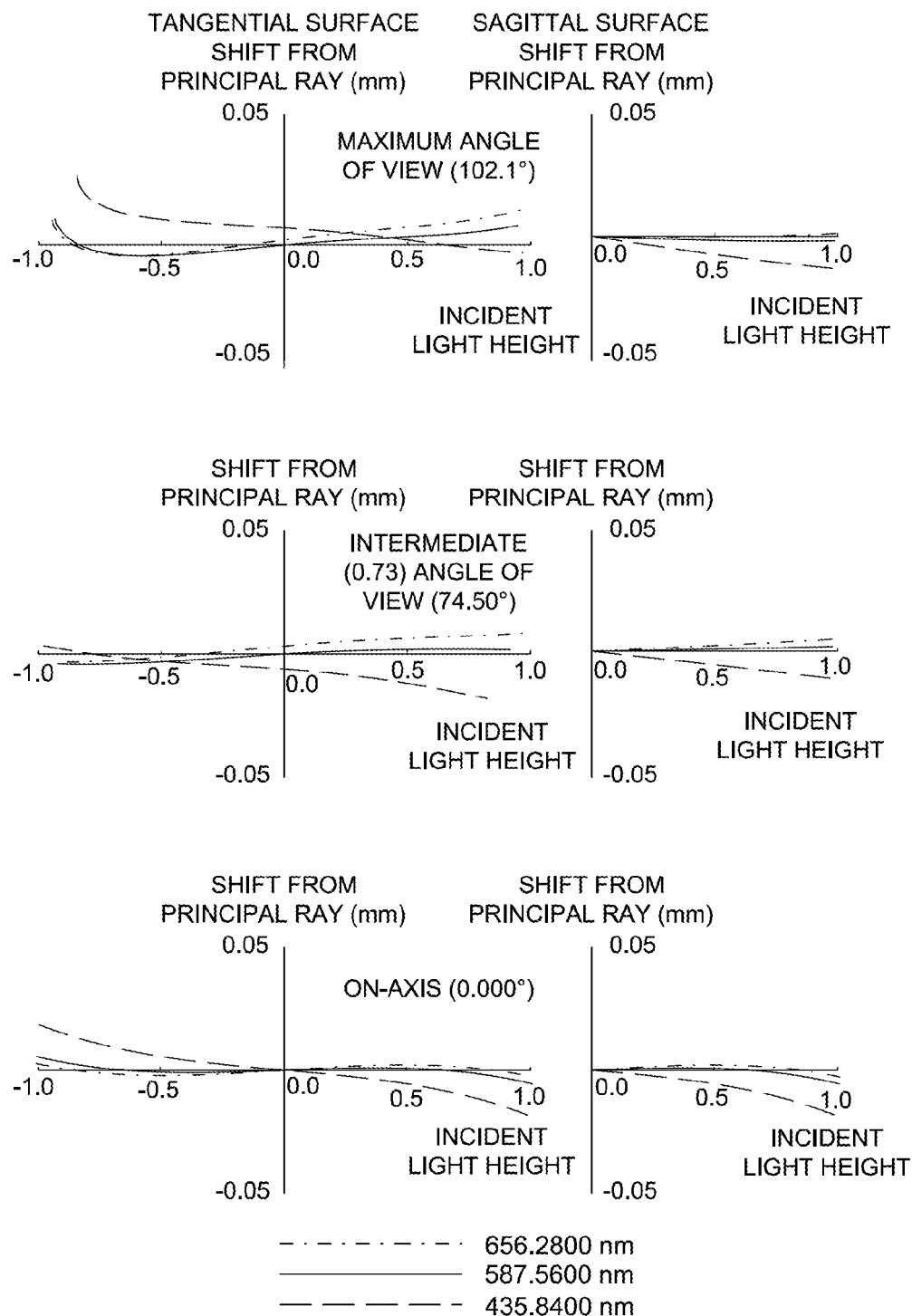

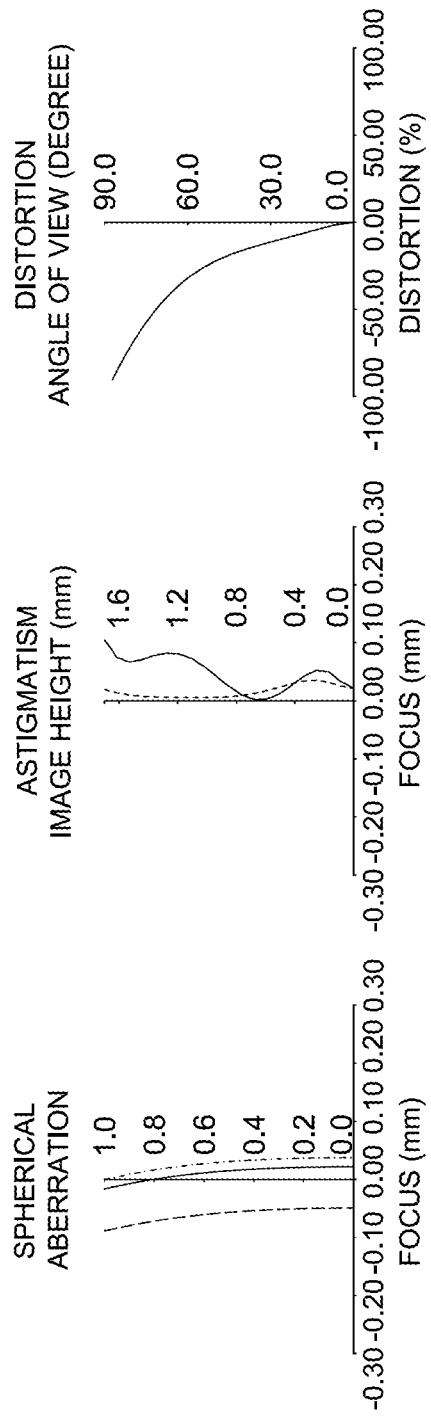

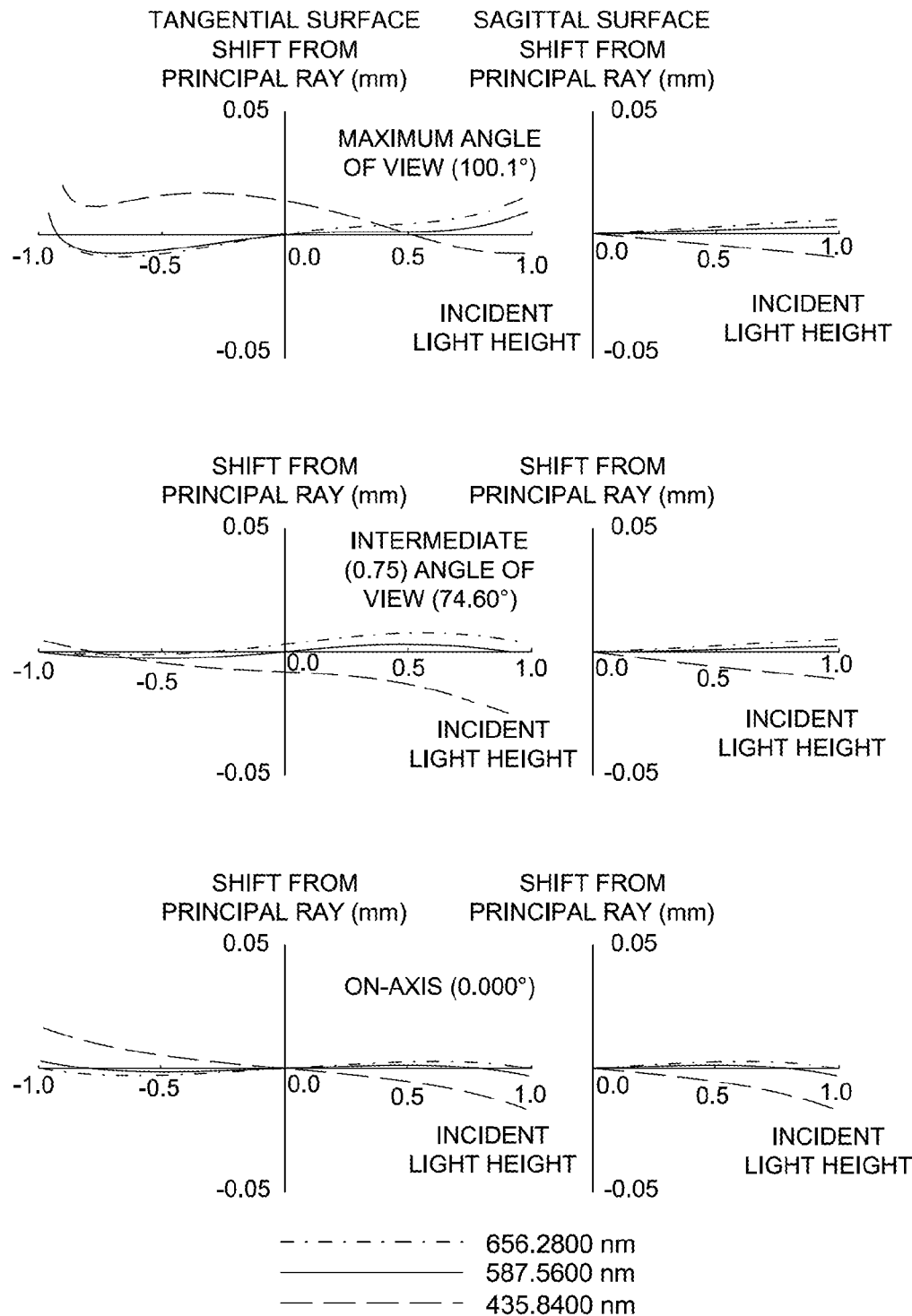

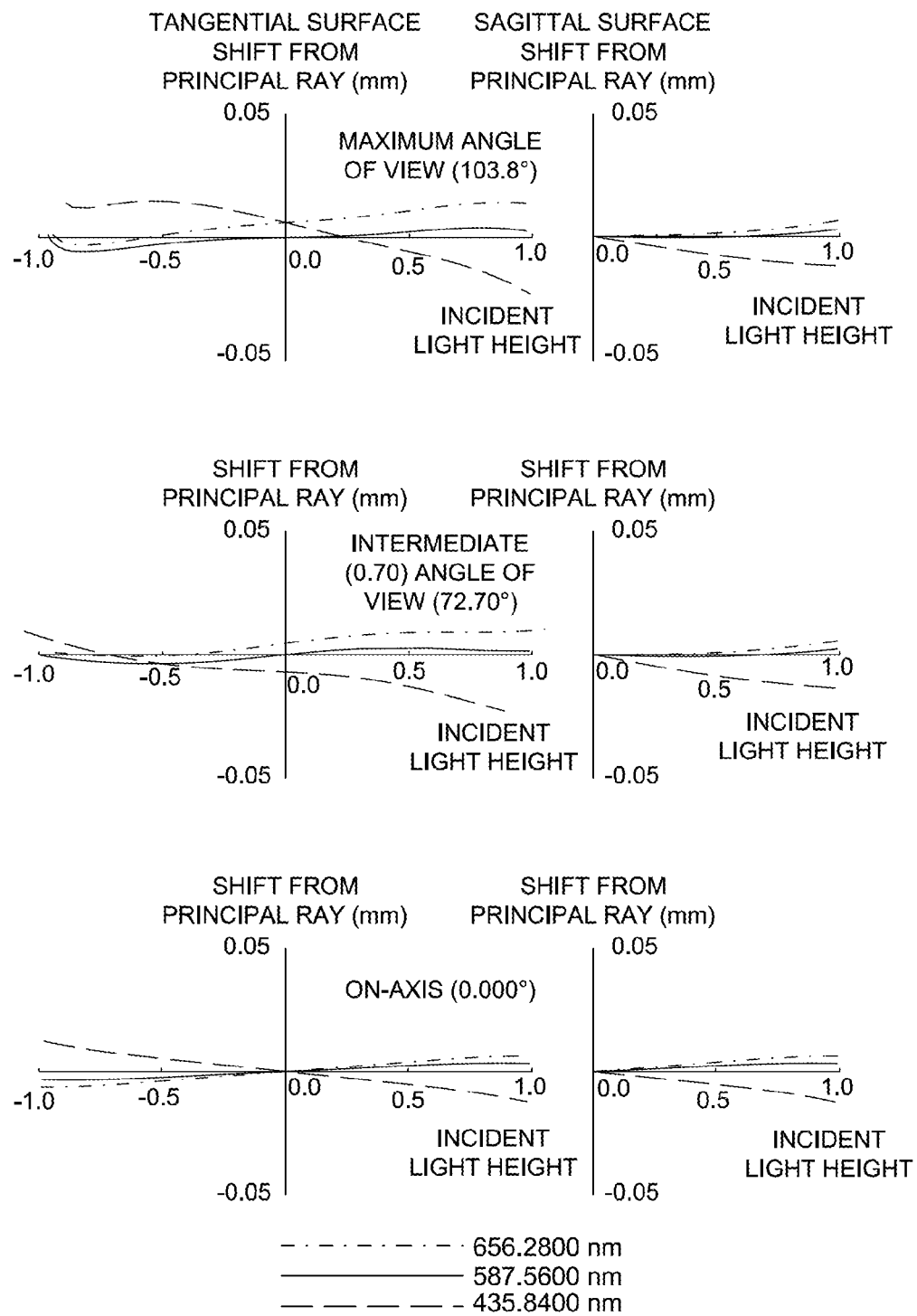

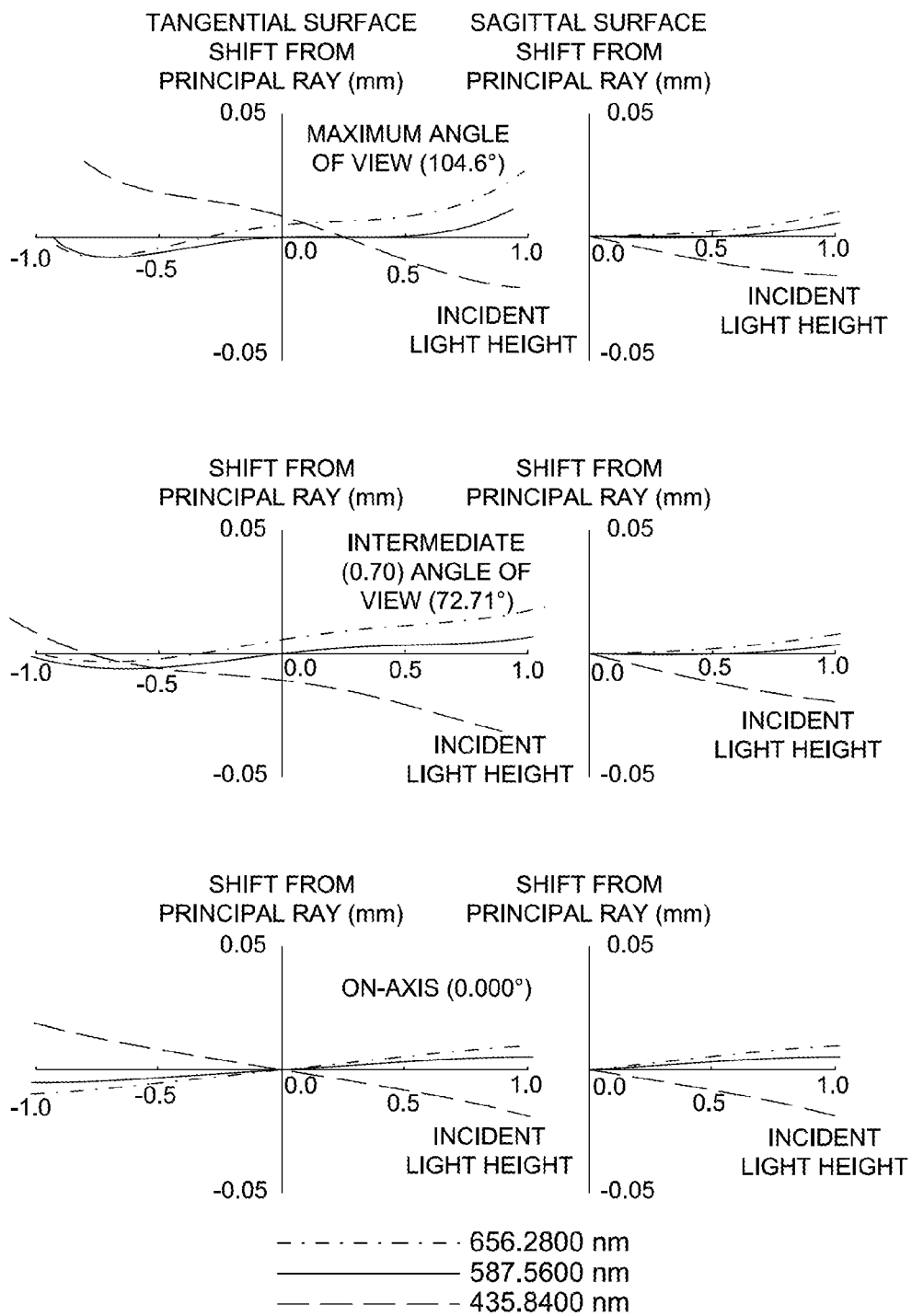

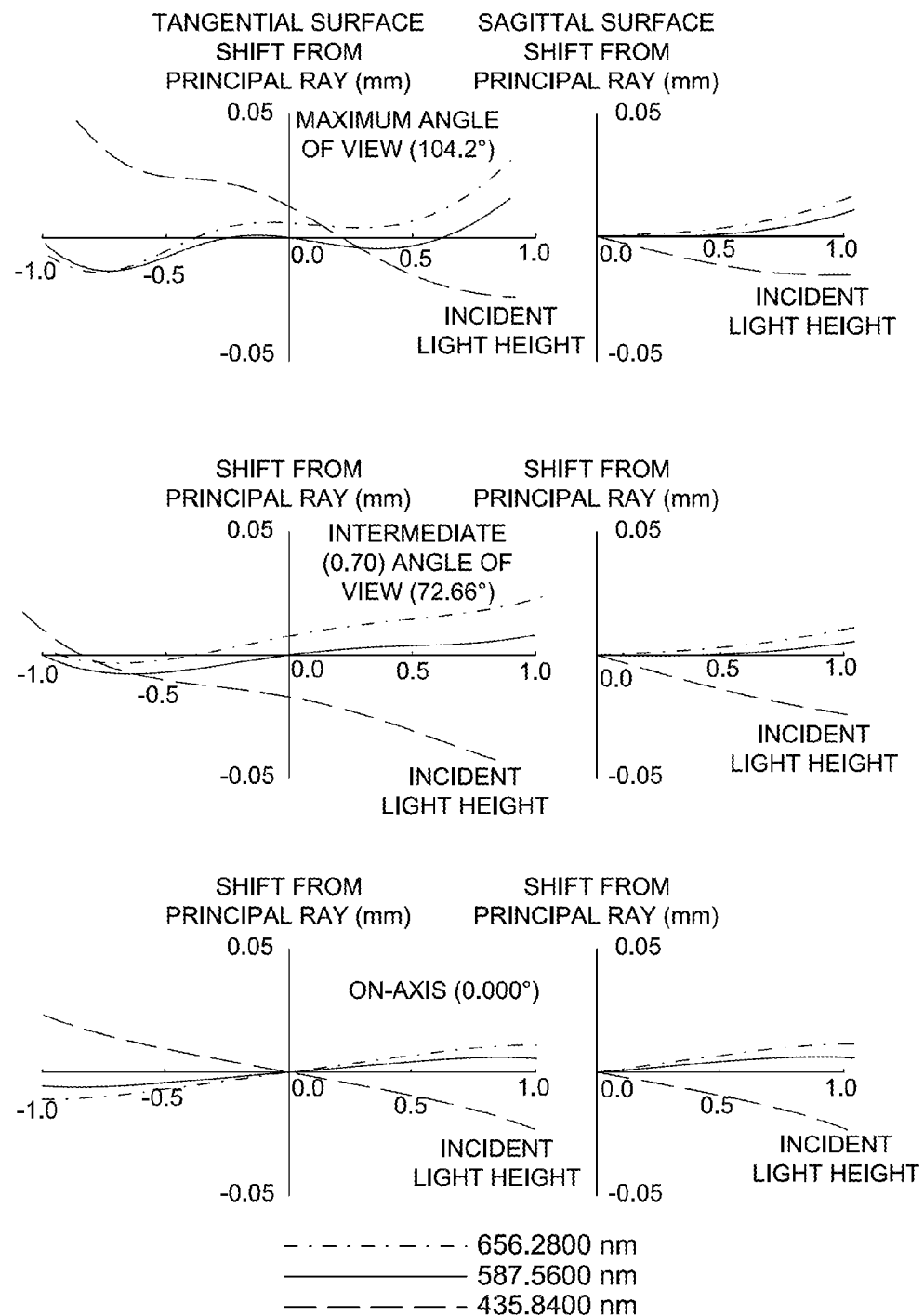

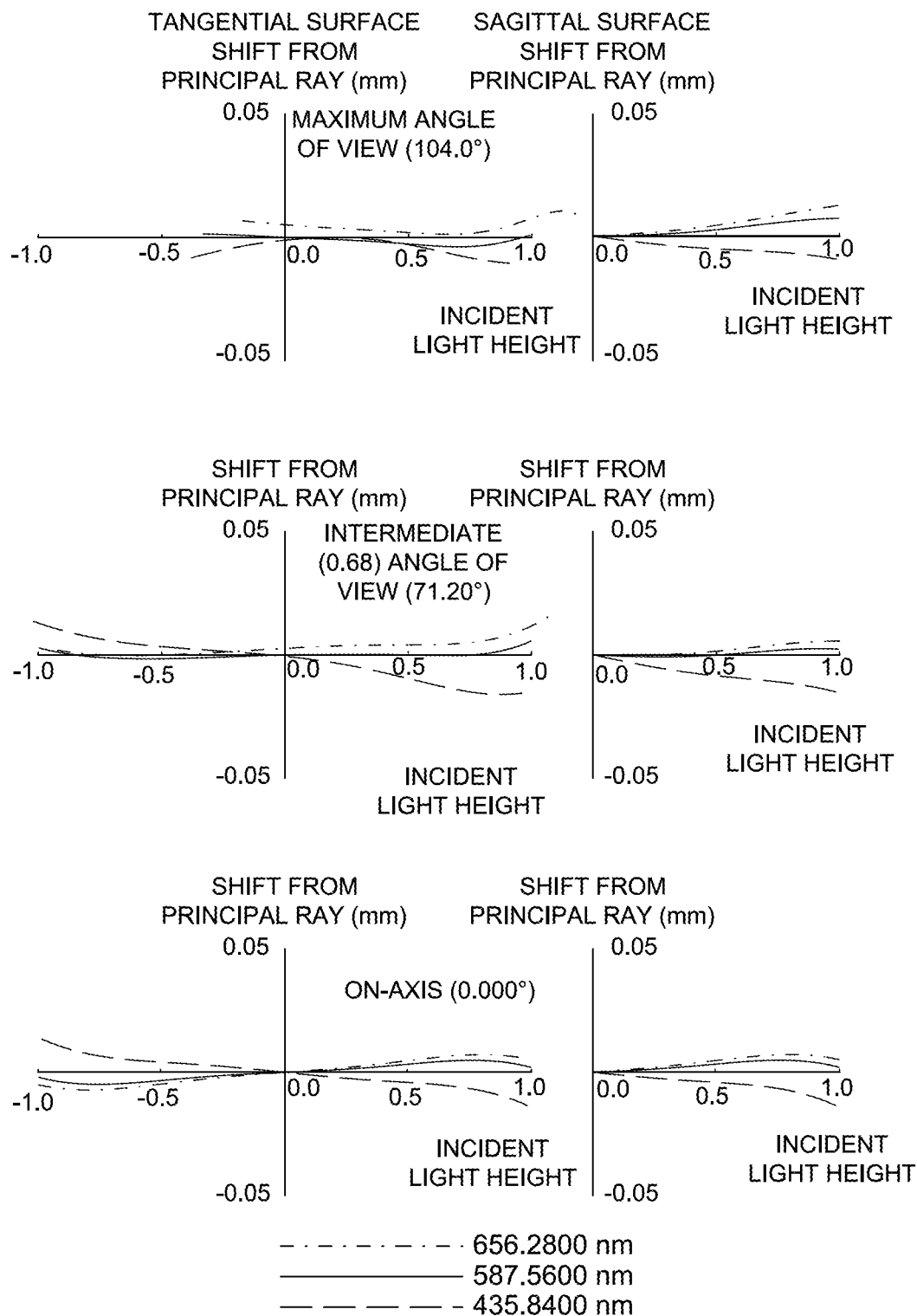
FIG. 31B LATERAL ABERRATION

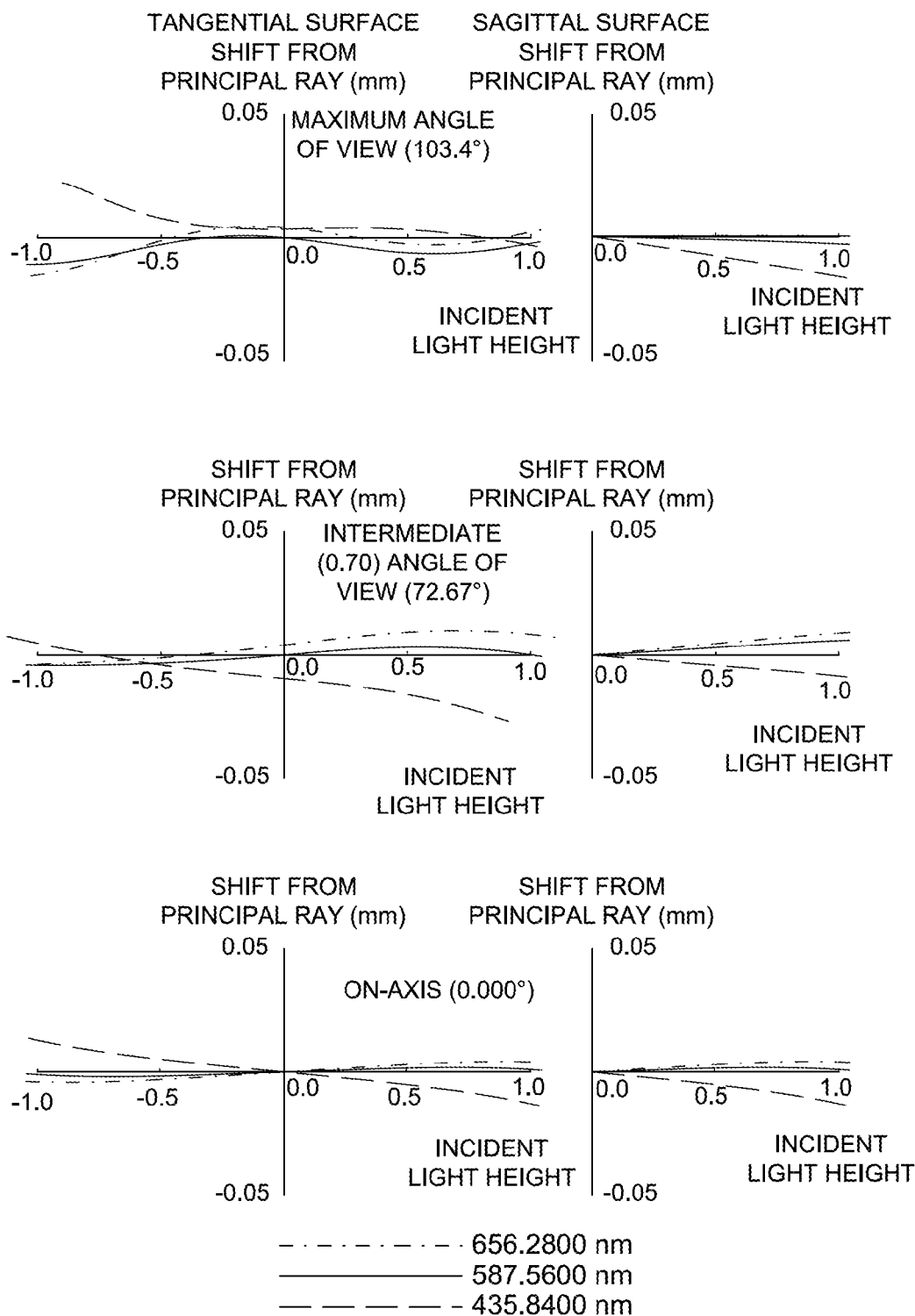
FIG. 32B LATERAL ABERRATION

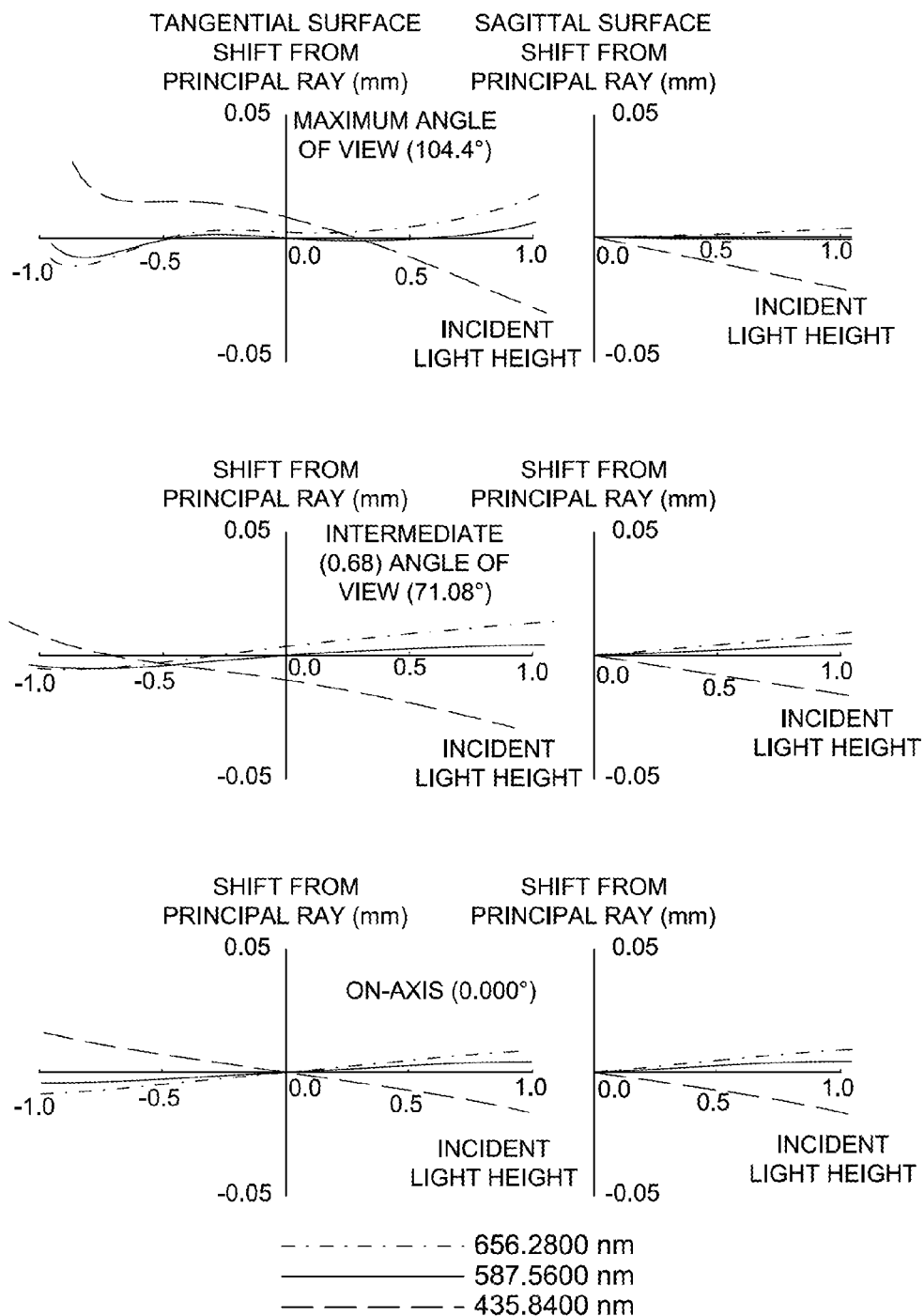
FIG. 33B LATERAL ABERRATION

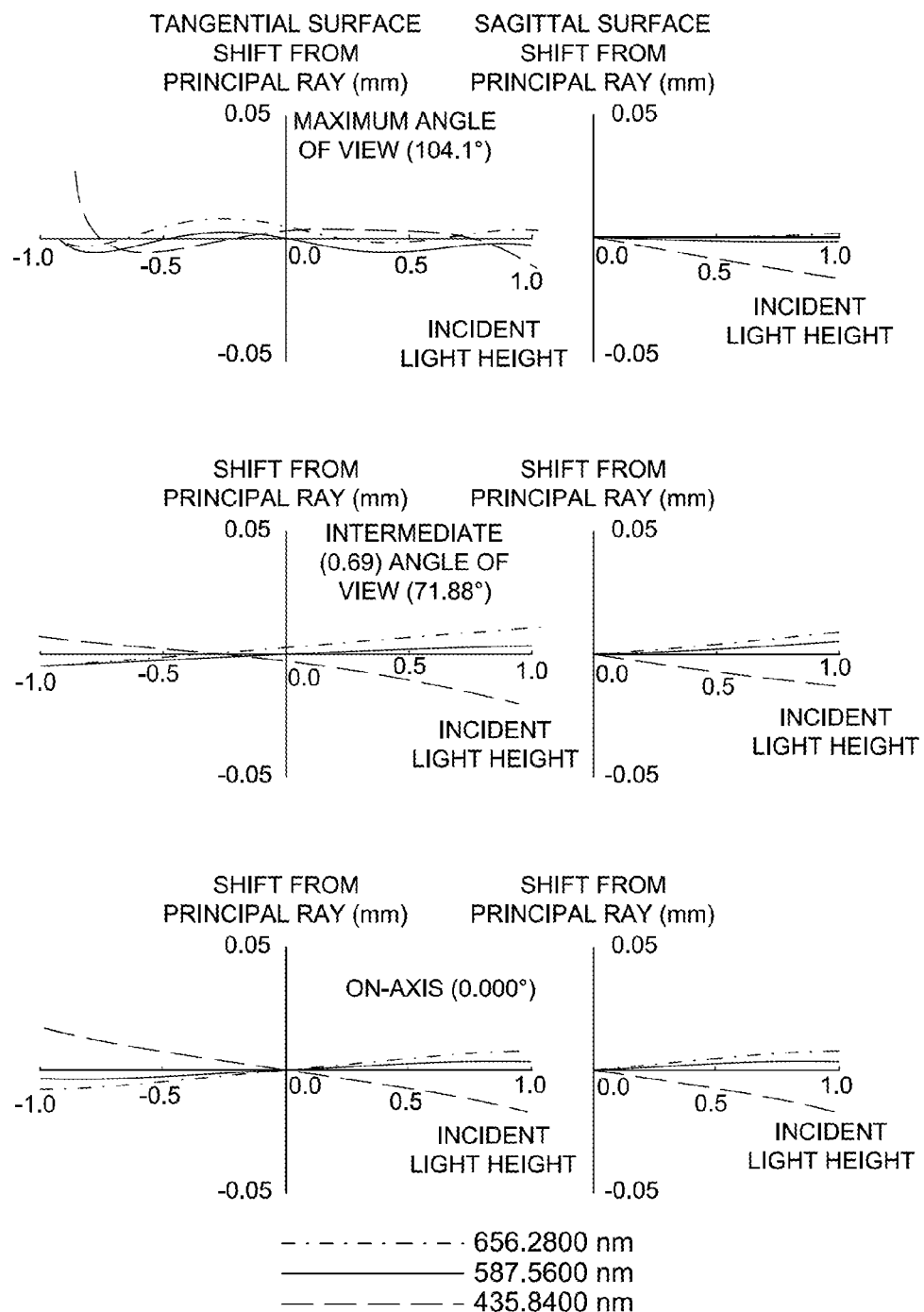

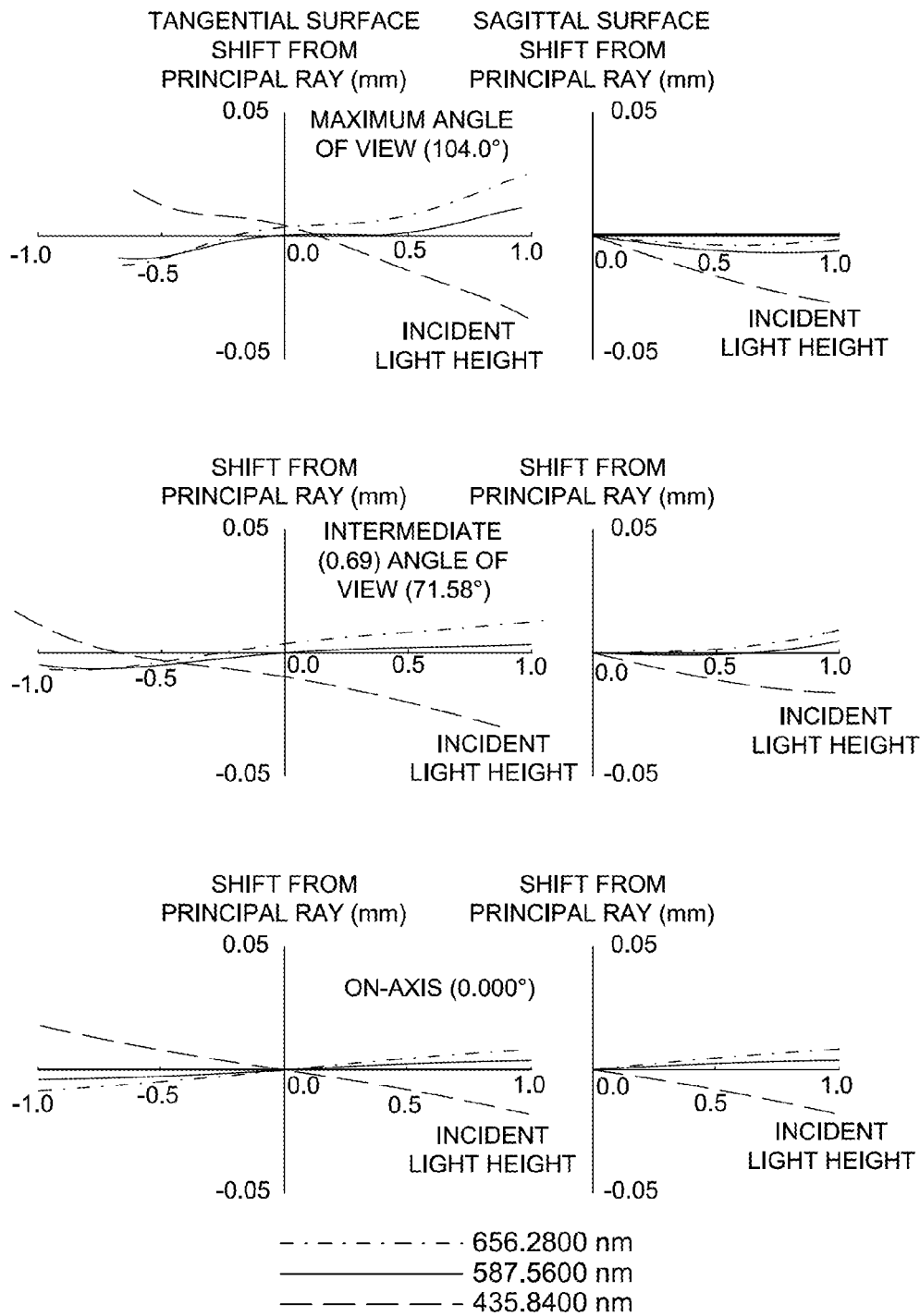
FIG. 35B LATERAL ABERRATION

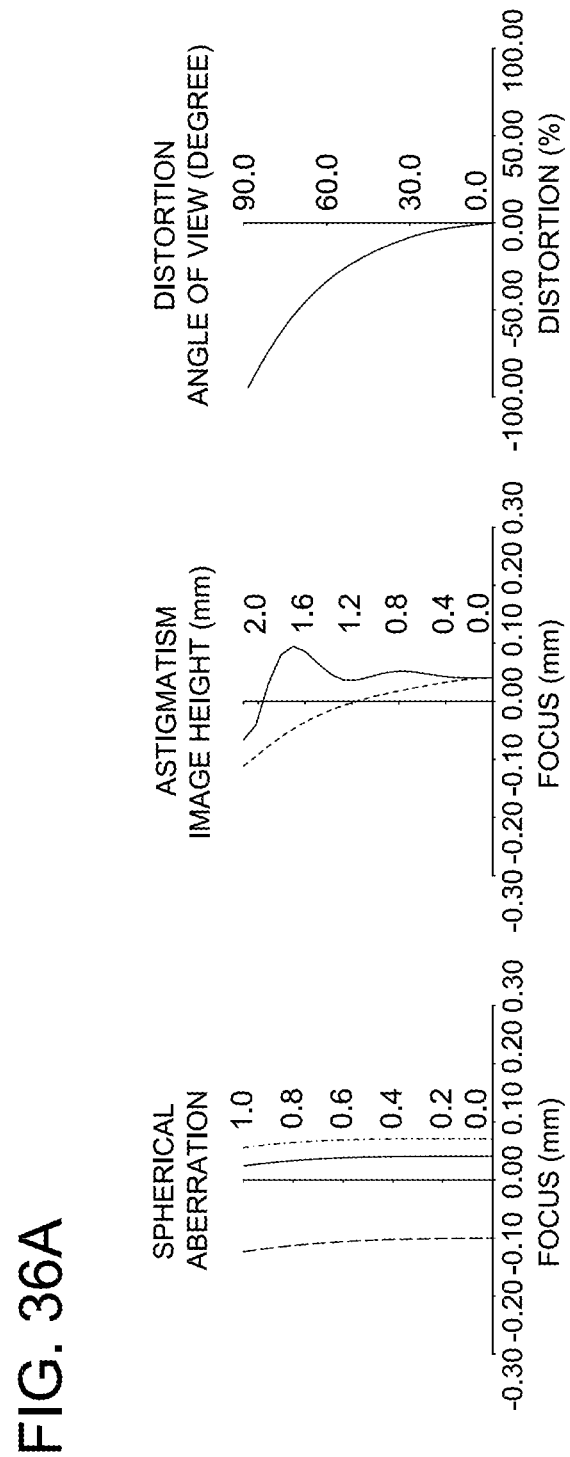

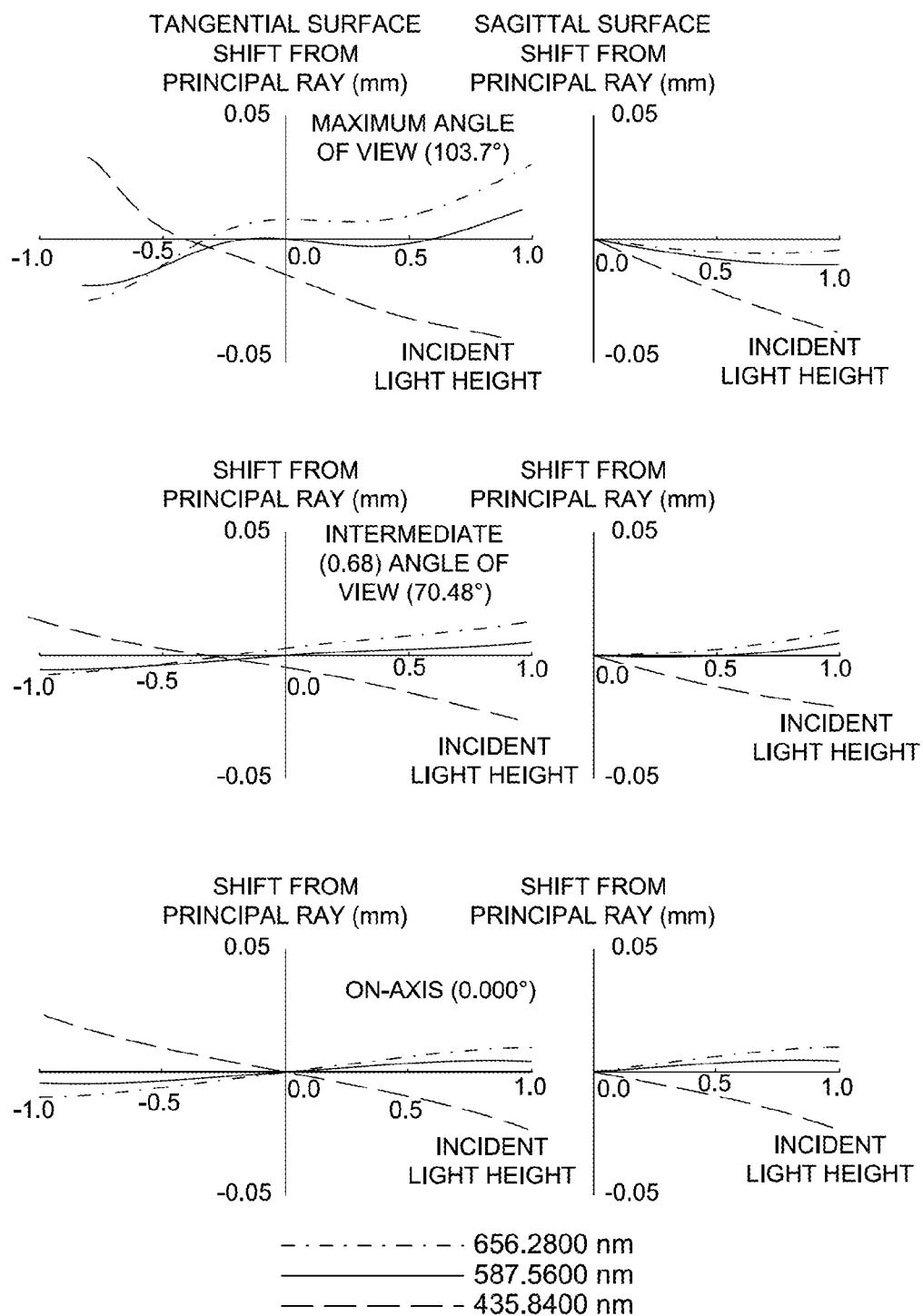
FIG. 36B LATERAL ABERRATION

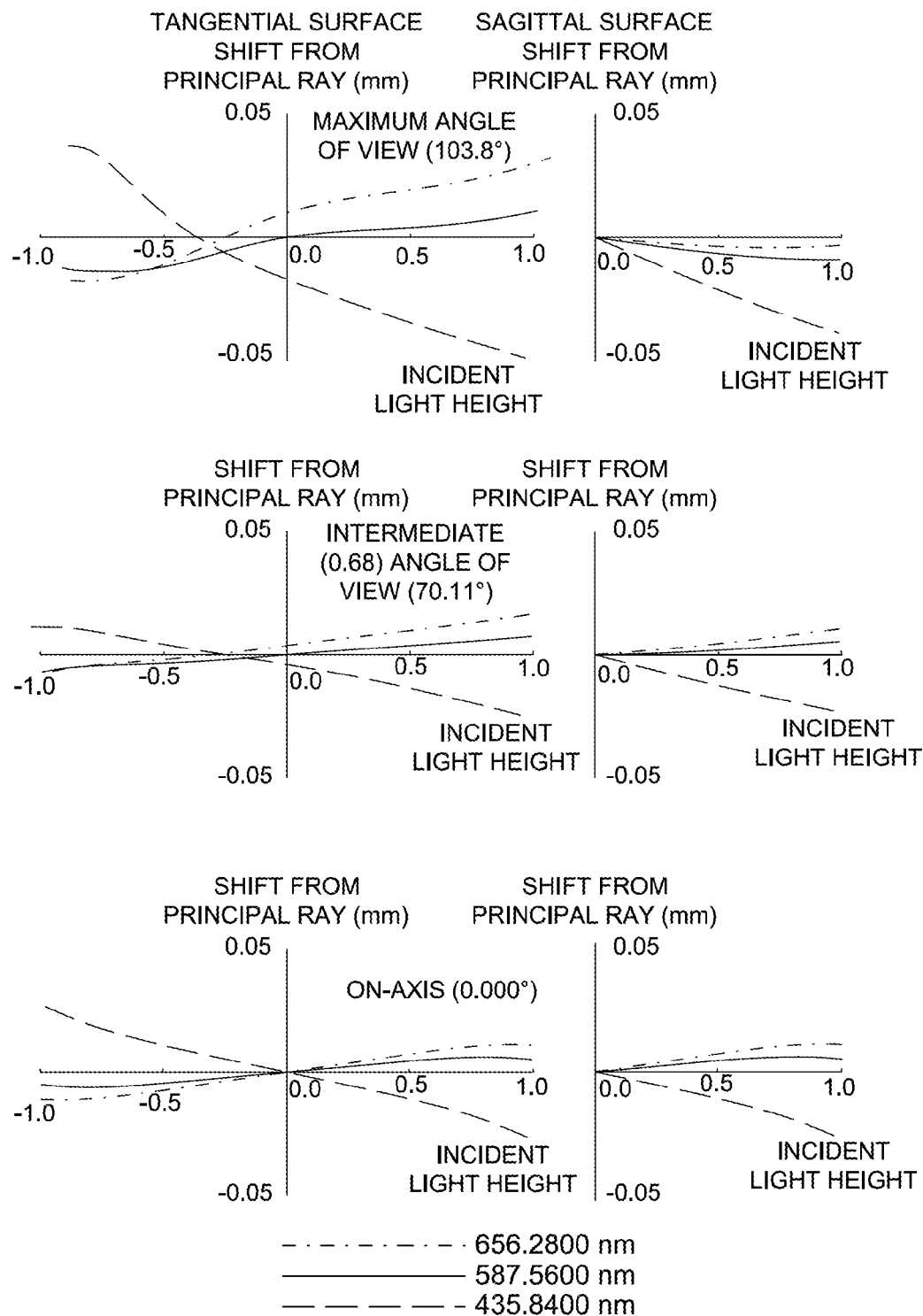
FIG. 37B LATERAL ABERRATION

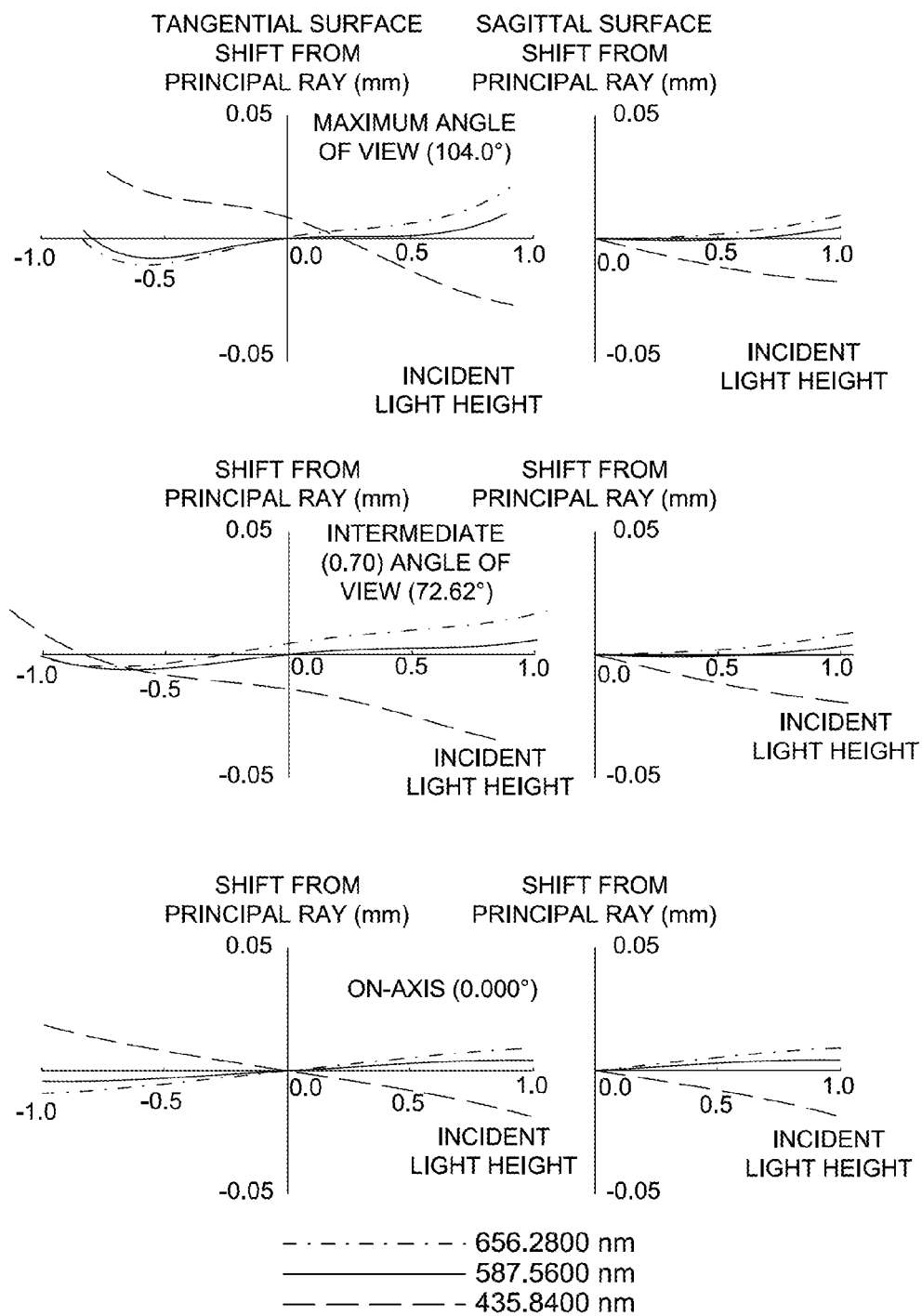

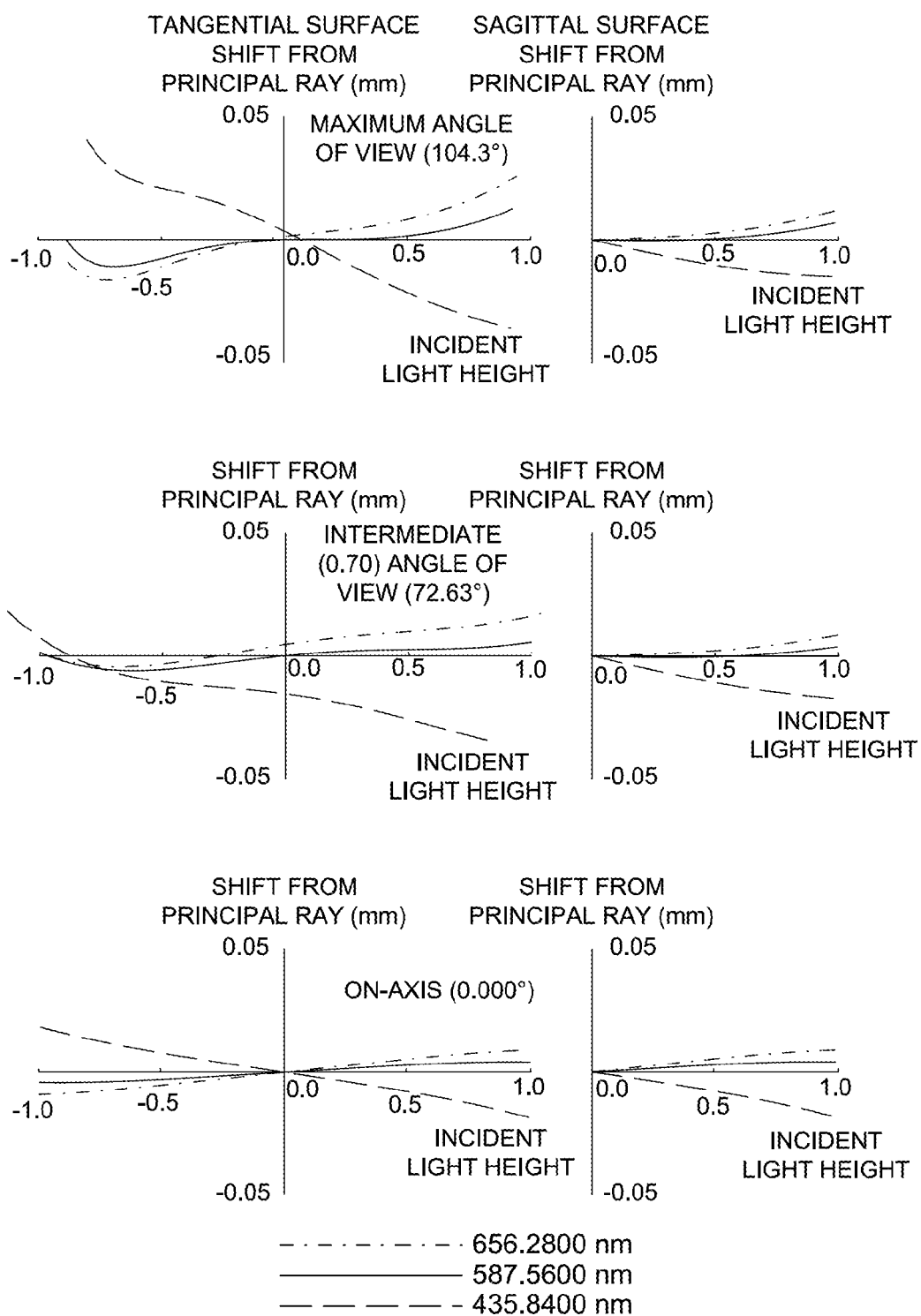

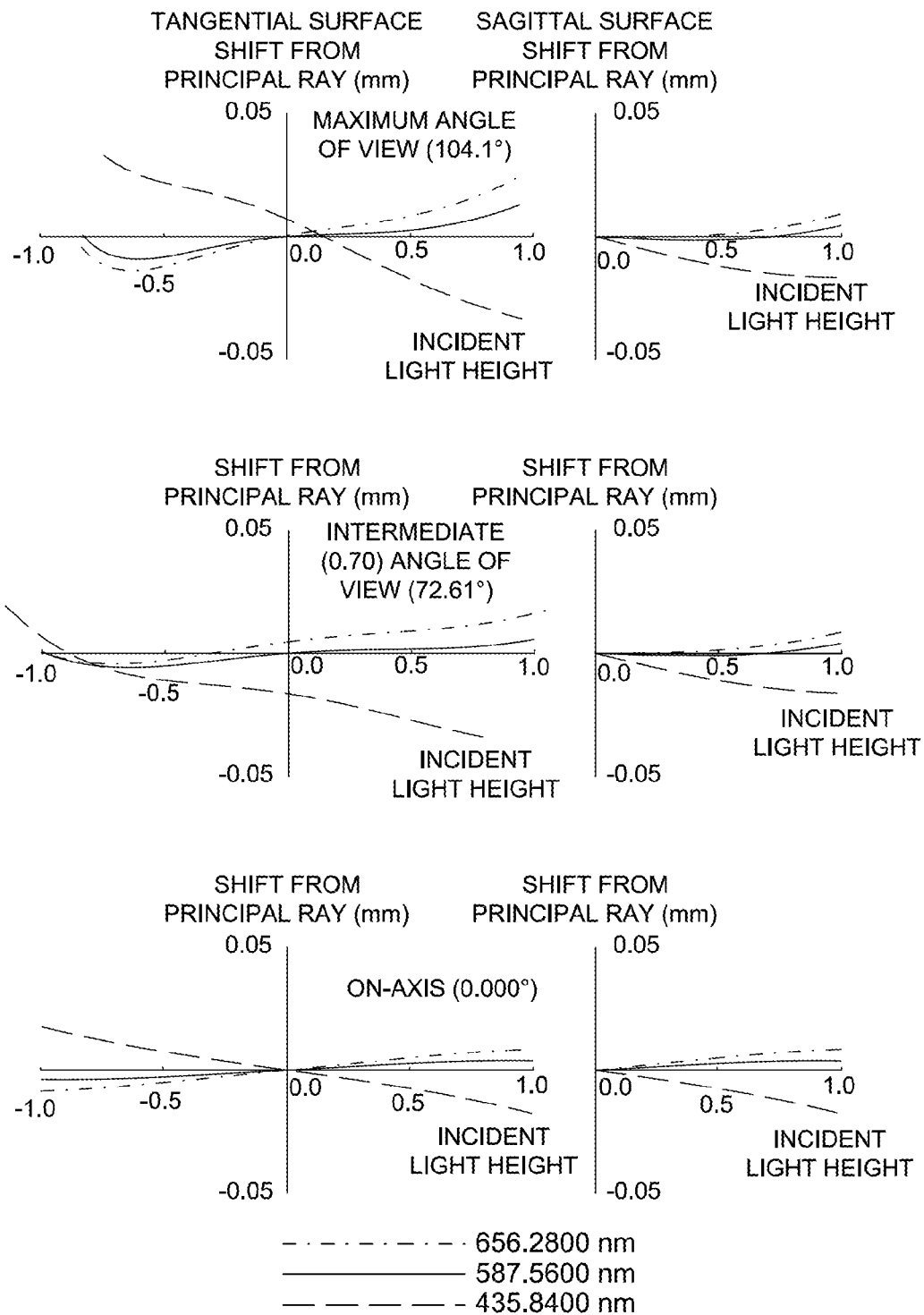

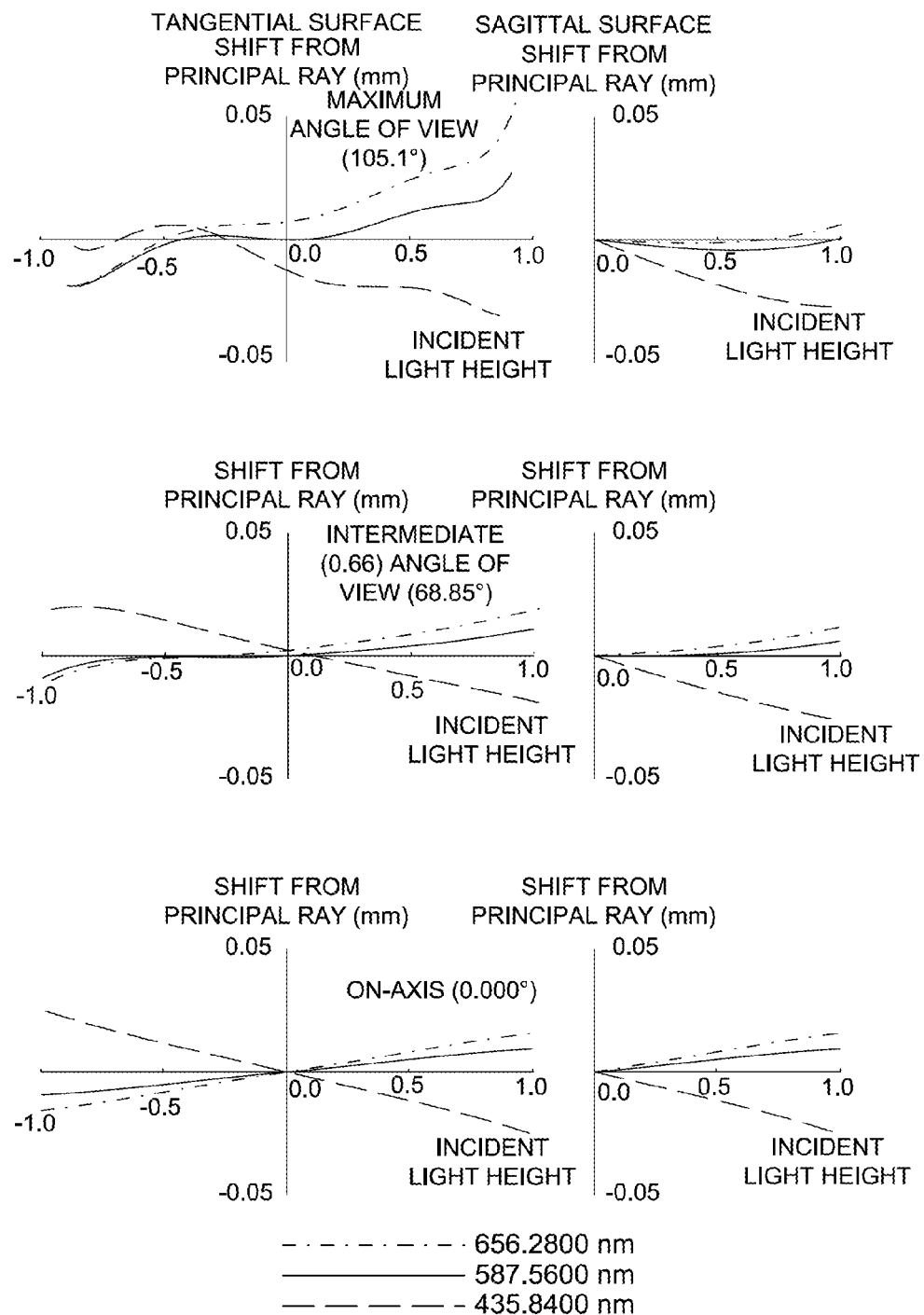

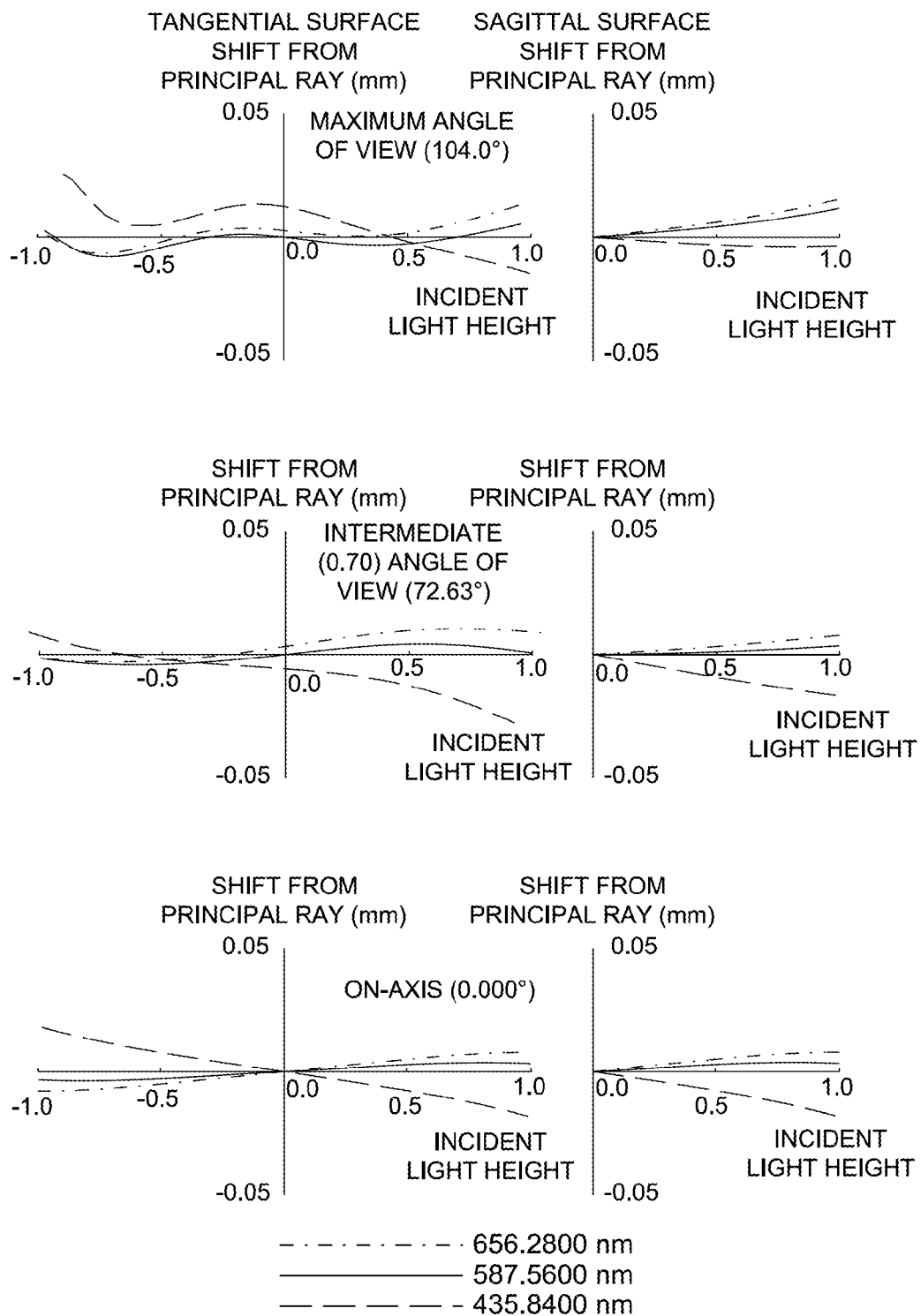

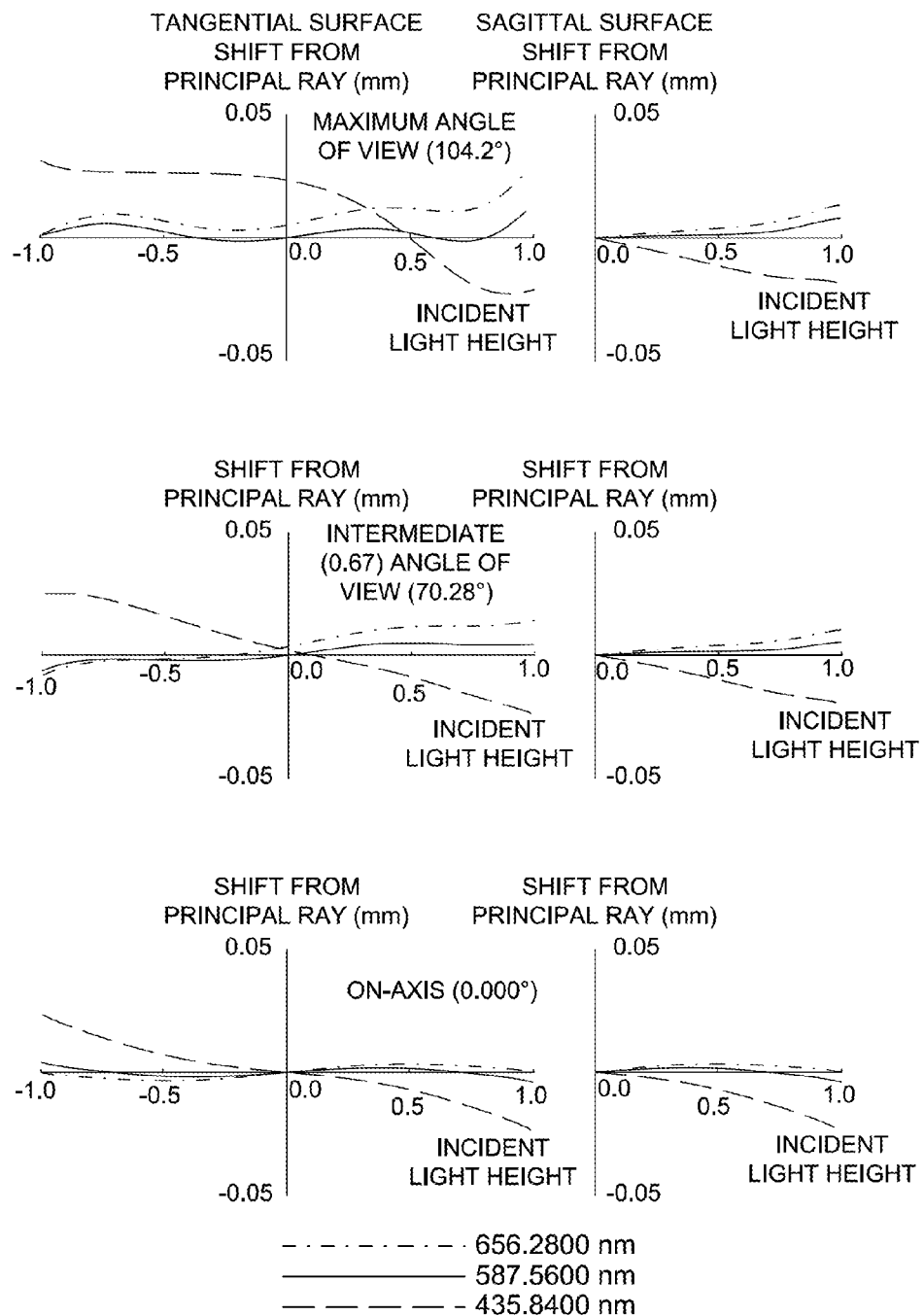

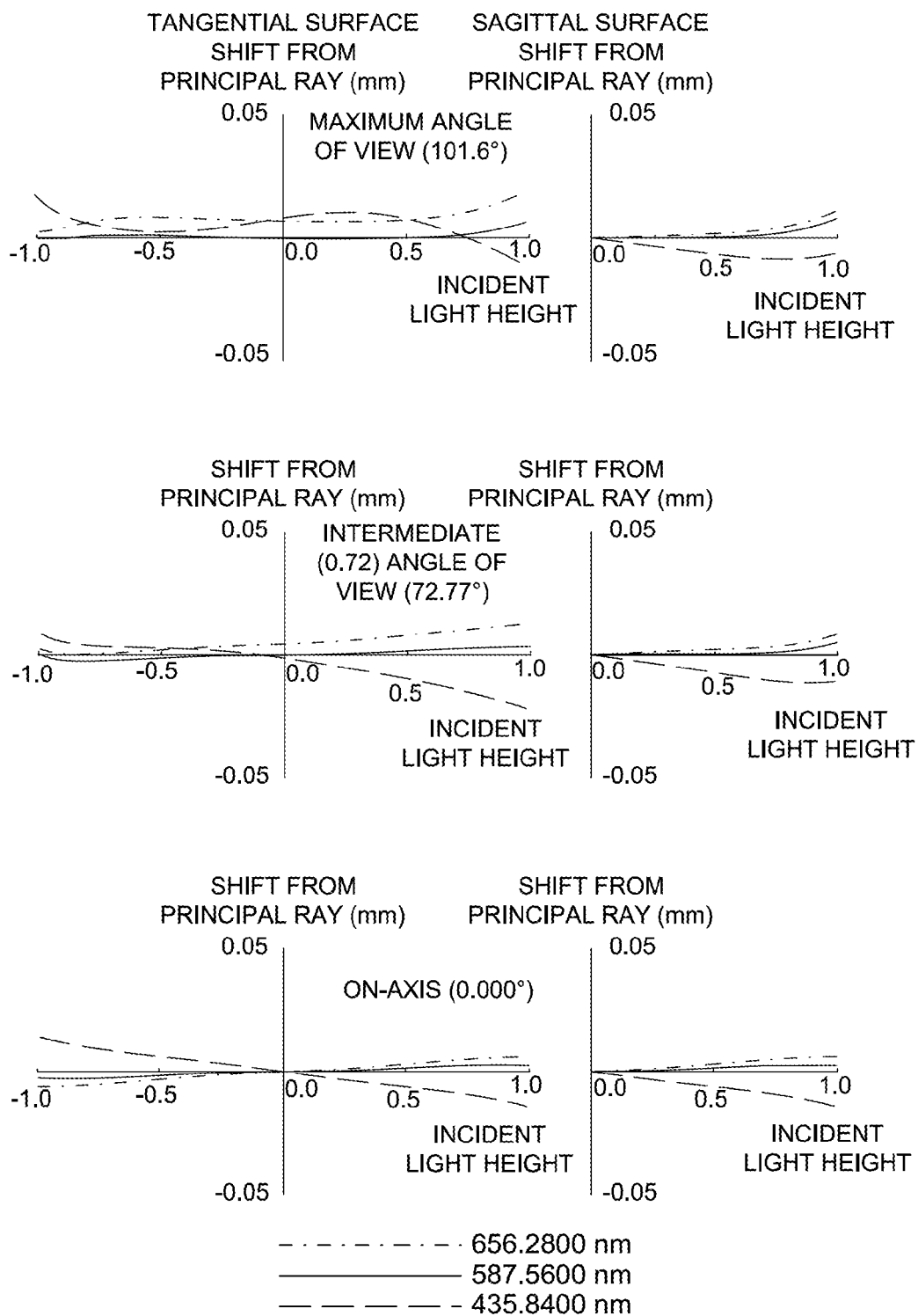
FIG. 44B LATERAL ABERRATION

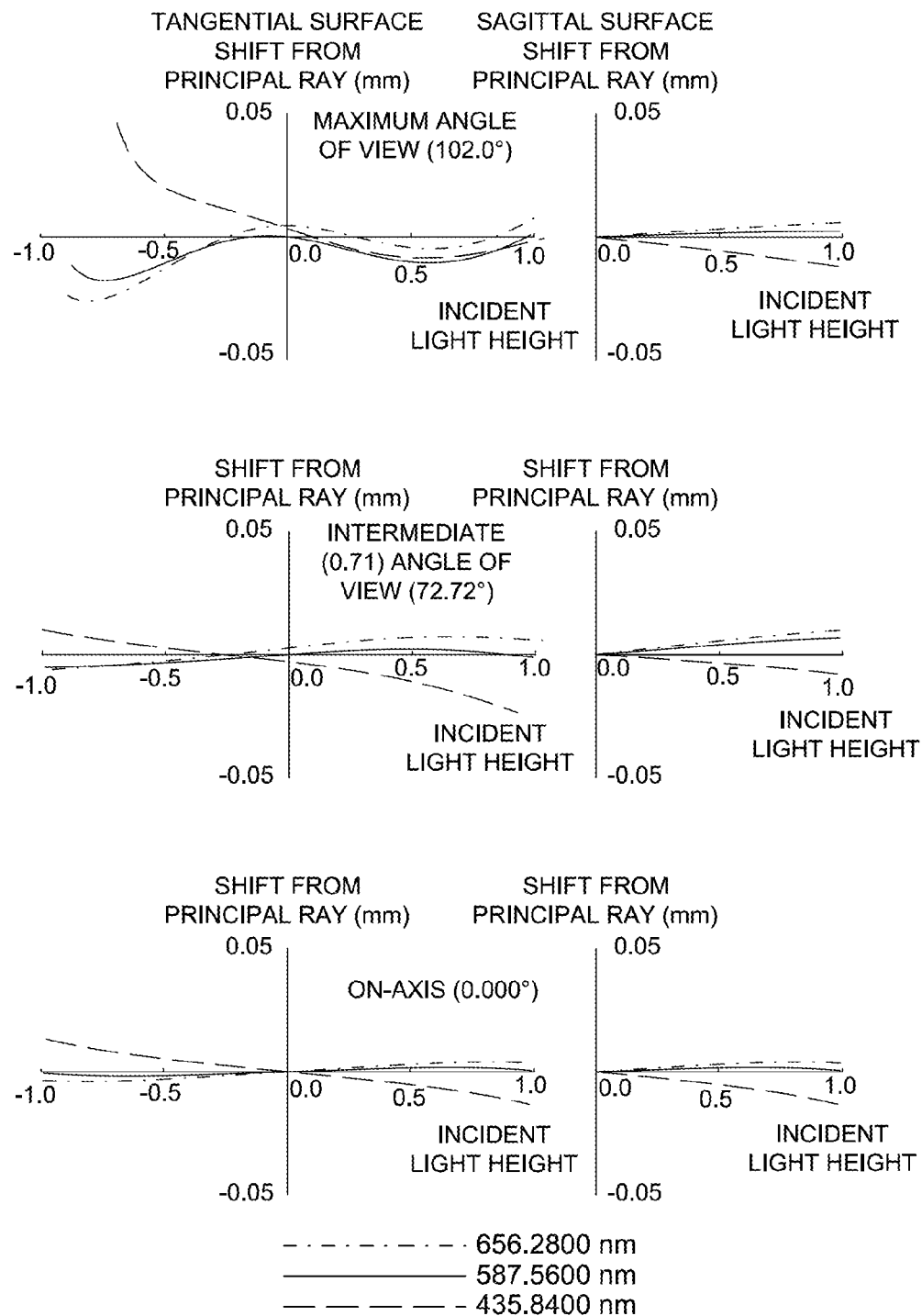

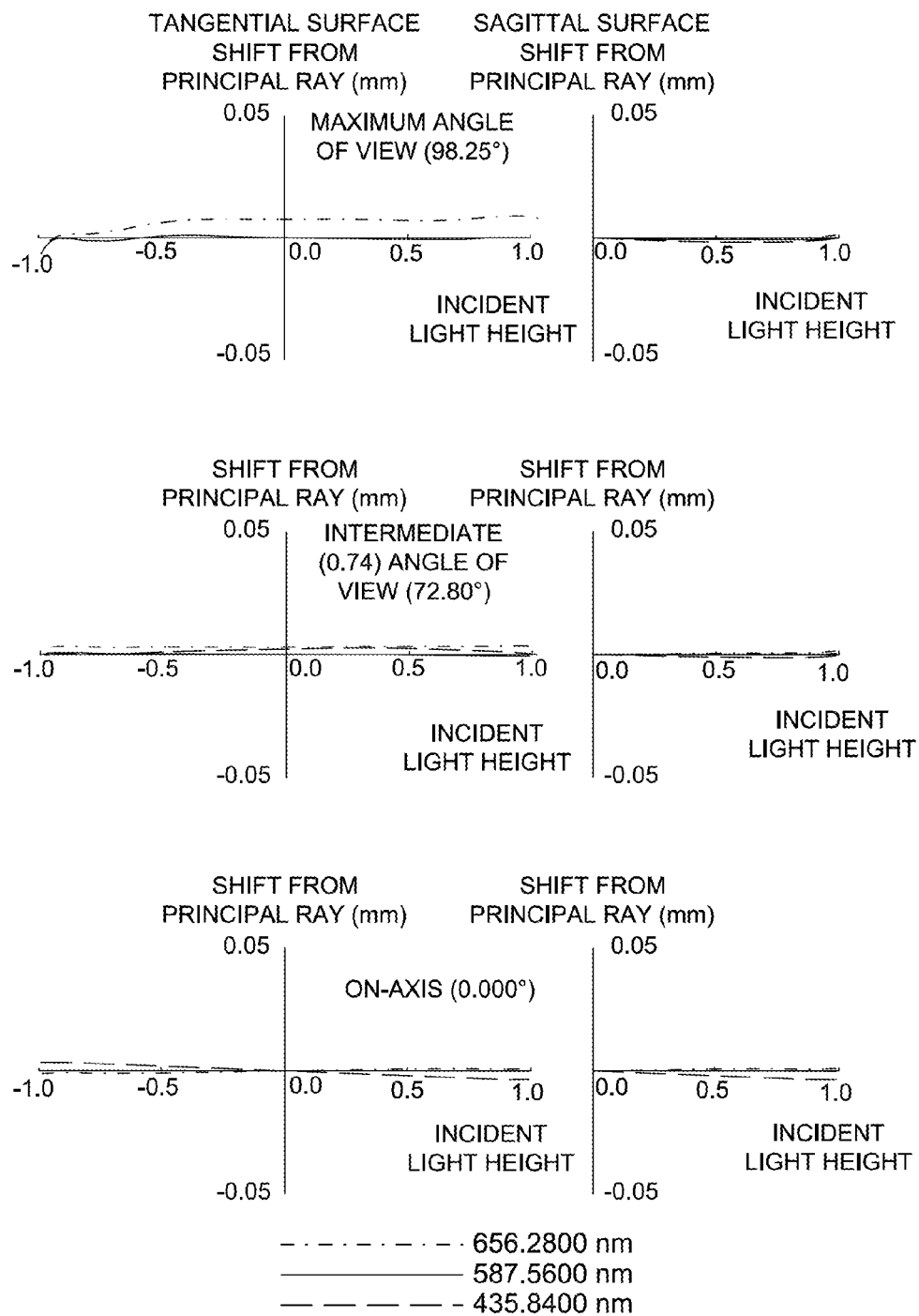

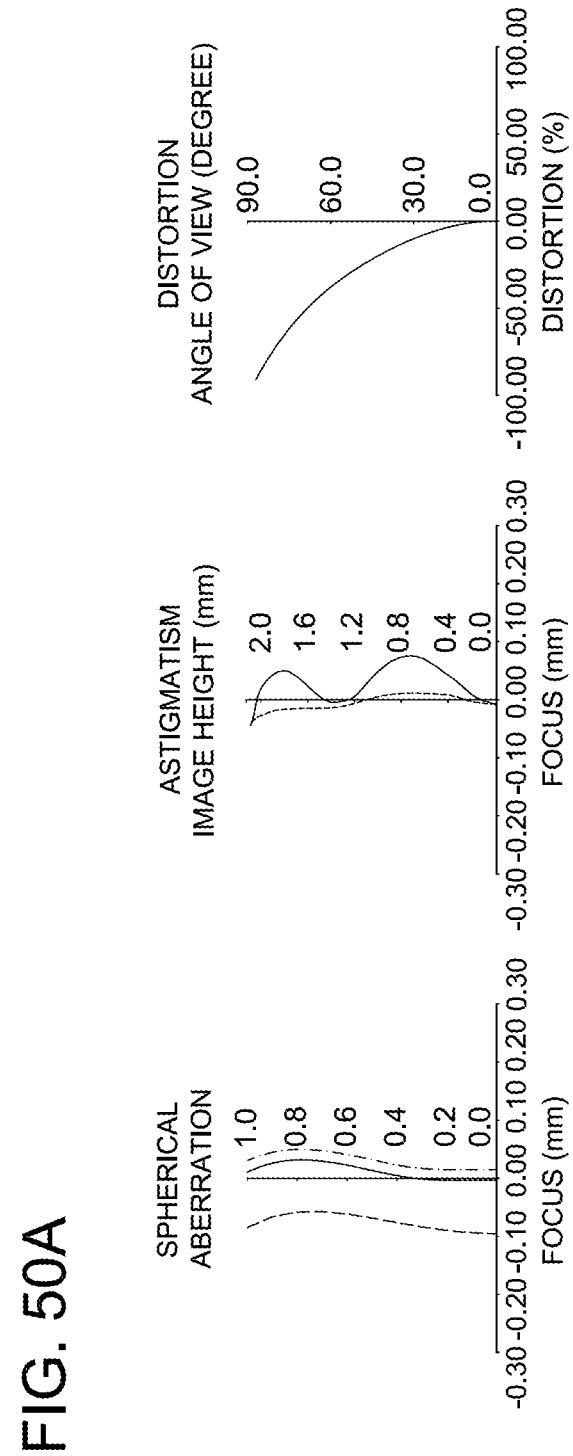

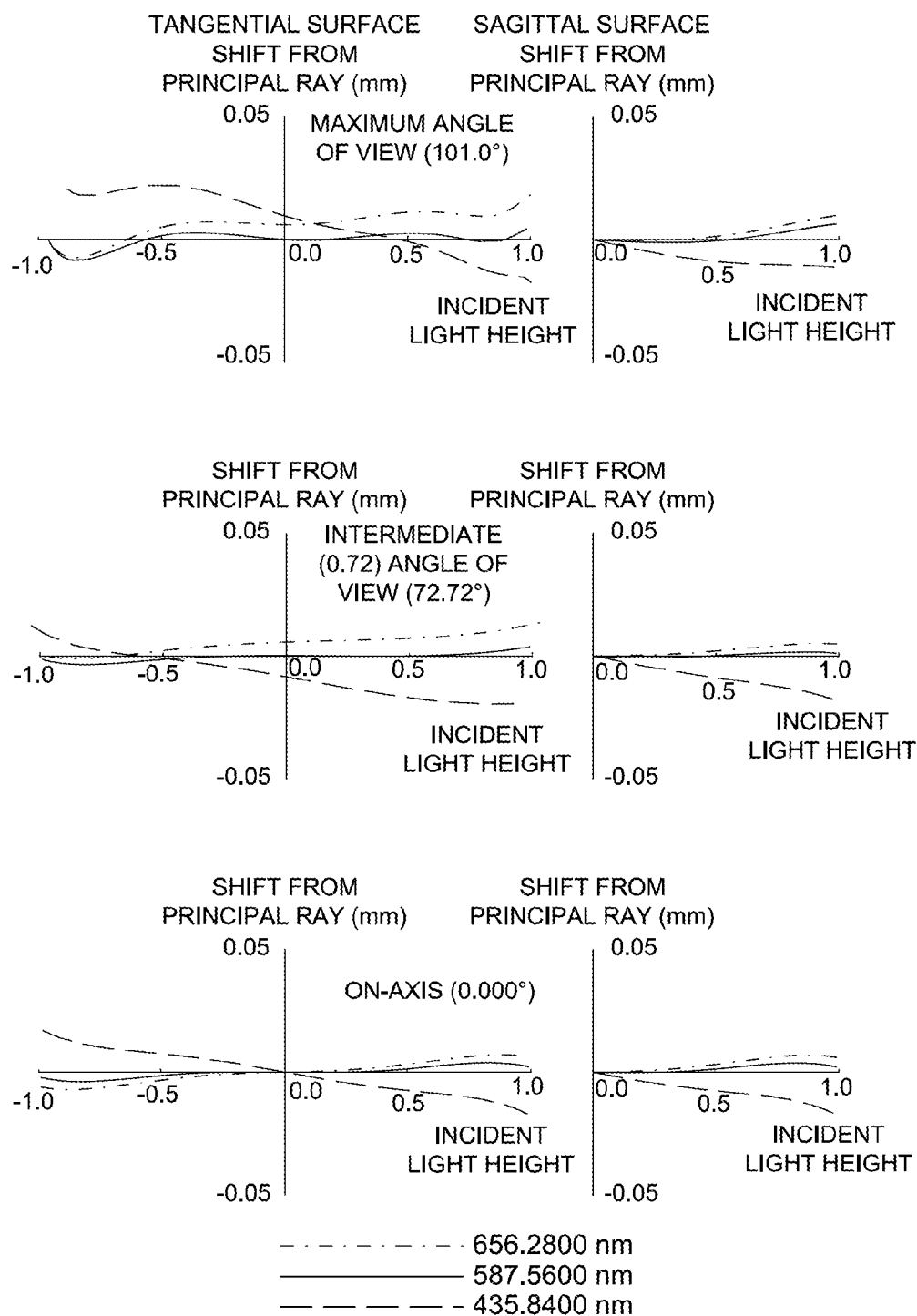
FIG. 50B LATERAL ABERRATION

WIDE-ANGLE OPTICAL SYSTEM, IMAGE PICKUP LENS DEVICE, MONITOR CAMERA, AND DIGITAL APPARATUS

RELATED APPLICATIONS

This is a U.S. National Phase under 35 U.S.C. §371 of International Application No. PCT/JP2008/067075, filed Sep. 22, 2008, which claims priority to Japanese Patent Application No. 2007-254791, filed Sep. 28, 2007.

TECHNICAL FIELD

The present invention relates to a wide-angle optical system that is compact and copes with a wide angle of view, and in particular, relates to a wide-angle optical system that is suitable to a super wide-angle optical system that copes with a super wide angle and has a total angle of view of 90° or more. Further, the present invention relates to an image pickup lens device equipped with the aforesaid wide-angle optical system, and to a monitor camera and a digital apparatus each housing therein the image pickup lens device.

BACKGROUND ART

When image information in surroundings is picked up with a small number of cameras, wide-angle optical systems having a large angle of view for taking images (wide angle of view) are employed in general. For example, such the wide-angle optical system has been used for the purpose of a surveillance system and onboard system.

Further, an onboard camera for monitoring rear view of a vehicle, for example, has been required to be more compact in addition to have a wide angle of view from a viewpoint of a practical use to keep the visibility of a driver and a viewpoint of a beautiful appearance of the vehicle.

Such the wide-angle optical systems are disclosed in Patent Literature 1 and Patent Literature 2, for example. The wide-angle optical system disclosed in Patent Literature 1 prevents shading that is a problem caused when the optical system has a super wide angle and is formed of a small number of lenses such as about four or five lenses. The wide-angle optical system disclosed in Patent Literature 2 controls fluctuations of an image forming position under various temperature environments by employing glass members arranged at proper positions.

Patent Literature 1: JP-A No. 2005-227426
Patent Literature 2: JP-A No. 2007-101920

DISCLOSURE OF INVENTION

Technical Problem

The wide-angle optical systems disclosed in Patent Literature 1 and Patent Literature 2 achieve the prevented shading and controlled fluctuation of image-forming positions under the various temperature environments. However, chromatic aberrations which are caused because of downsizing of the optical system is not sufficiently corrected, and contrast over the entire image area is lowered.

The present invention is achieved in view of the aforesaid circumstances, and its object is to provide a wide-angle optical system which is compact and has more excellent optical property; an image pickup lens device equipped with the aforesaid wide-angle optical system; and a monitor camera and digital apparatus each of which the aforesaid image pickup lens device are mounted in.

Solution to Problem

For solving the aforesaid technical problems, the present invention provides a wide-angle optical system, an image pickup lens device, a monitor camera and a digital apparatus, each having the following structures. Incidentally, technical terms used in the following explanations are defined as follows in the present description.

(a) A refractive index is defined as a refractive index at the wavelength of d line (587.56 nm).
(b) The Abbe number is defined as the Abbe number vd obtained by the definitional equation:

$$vd=(nd-1)/(nF-nC),$$

where nd, nF and nC represent respectively refractive indexes at d line, F line (486.13 nm) and C line (656.28 nm), and vd represents the Abbe number.

(c) A surface shape is expressed based on a paraxial curvature.
(d) Denotations of "concave", "convex" and "meniscus" used for lenses, are defined to express lens forms in the vicinity of the optical axis (vicinity of the center of lens), namely, the denotations are based on a paraxial curvature.
(e) A resin material used for a compound aspheric lens is not handled as an independent optical member, because it has only additional function to a glass material for a substrate. The resin material is handled in the same way as in the case where the glass material for the substrate is formed to have an aspheric surface, and is handled as a single lens together with the substrate. As for the refractive index of the lens, a refractive index of the glass material forming the substrate is considered as the refractive index of the lens. The compound aspheric lens is a lens which is formed into an aspheric surface with a thin resin member applied on a glass member which is a substrate.

1. A wide-angle optical system comprising:
a front lens group;
a rear lens group; and
an aperture stop arranged between the front lens group and the rear lens group,
wherein the front lens group includes at least two negative lenses and at least one positive lens,
at least one of a positive lens or positive lenses in the front lens group includes at least one aspheric surface, and
the front lens group satisfies the following conditional expression (1).

$$vdp<29 \quad (1)$$

In the expression, vdp is a minimum Abbe number of the positive lens or positive lenses in the front lens group.

2. The wide-angle optical system of Item 1,
wherein the positive lens satisfying the conditional expression (1) satisfies the following conditional expression (2).

$$|Hp|/Rp>0.65 \quad (2)$$

In the expression, Hp is a height (a distance from an optical axis) of a principal ray of a light flux corresponding to a maximum image height on an object-side surface of the positive lens, and
Rp is a maximum effective radius of the object-side surface of the positive lens.

3. The wide-angle optical system of Item 1 or 2, wherein the positive lens satisfying the conditional expression (1) satisfies the following conditional expression (3).

$$Ndp>1.6 \qquad (3)$$

In the expression, Ndp is a refractive index of the positive lens.

4. The wide-angle optical system of any one of Items 1 to 3, wherein the positive lens satisfying the conditional expression (1) is a lens made of a resin material.

5. The wide-angle optical system of any one of Items 1 to 4, wherein a lens arranged at a closest position to an object is a negative lens which satisfies the following conditional expression (4).

$$33<vd1<47 \qquad (4)$$

In the expression, vd1 is an Abbe number of the lens arranged at the closest position to the object.

6. The wide-angle optical system of any one of Items 1 to 5, wherein the front lens group consists of three lenses, and the rear lens group consists of one lens.

7. The wide-angle optical system of any one of Items 1 to 5, wherein the front lens group consists of three lenses, and the rear lens group consists of three lenses.

8. The wide-angle optical system of any one of Items 1 to 5, wherein the front lens group consists of four lenses, and the rear lens group consists of two lenses.

9. The wide-angle optical system of any one of Items 1 to 5, wherein the front lens group consists of three lenses, and the rear lens group consists of two lenses.

10. The wide-angle optical system of any one of Items 1 to 9, wherein a first lens and a second lens are defined by numbering in order from an object side, and the first lens and the second lens satisfy the following conditional expression (5).

$$2.1<D12/f<5.3 \qquad (5)$$

In the expression, D12 is a distance on an optical axis between the first lens and the second lens, and f is a focal length of a total system of the wide-angle optical system.

11. The wide-angle optical system of any one of Items 1 to 10, wherein a second lens and a third lens are defined by numbering in order from an object side, and the second lens and the third lens satisfy the following conditional expression (6).

$$1<D23/f<2.2 \qquad (6)$$

In the expression, D23 is a distance on an optical axis between the second lens and the third lens, and f is a focal length of a total system of the wide-angle optical system.

12. The wide-angle optical system of any one of Items 1 to 11, wherein a third lens and a fourth lens are defined by numbering in order from an object side, and the third lens and the fourth lens satisfy the following conditional expression (7).

$$1.1<D34/f<1.77 \qquad (7)$$

In the expression, D34 is a distance on an optical axis between the third lens and the fourth lens, and f is a focal length of a total system of the wide-angle optical system.

13. The wide-angle optical system of any one of Items 1 to 12, wherein the front lens group includes two negative meniscus lenses whose convex surfaces face an object side and a biconvex positive lens, arranged in order from the object side, and the rear lens group includes a biconvex positive lens arranged in order from the object side.

14. The wide-angle optical system of any one of Items 1 to 5, 7, and 10 to 12, wherein the wide-angle optical system includes a negative meniscus lens whose convex surface faces an object side, a negative lens, a biconvex lens, an aperture stop, a biconvex lens, a negative meniscus lens whose convex surface faces an image side, and an biconvex lens, arranged in order from the object side.

15. The wide-angle optical system of any one of Items 1 to 5, 8, 10 to 12, wherein the wide-angle optical system includes a negative meniscus lens whose convex surface faces an object side, a negative lens, a biconvex lens, a positive lens, an aperture stop, a positive lens, and a negative meniscus lens whose convex surface faces an image side, arranged in order from the object side.

16. The wide-angle optical system of any one of Items 1 to 5, 9 to 12, wherein the wide-angle optical system includes a negative meniscus lens whose convex surface faces an object side, a negative lens, a positive lens, an aperture stop, a biconvex lens, and a negative meniscus lens whose convex surface faces an image side, arranged in order from the object side.

17. The wide-angle optical system of any one of Items 1 to 16, wherein a lens arranged at a closest position to an object is a glass lens.

18. The wide-angle optical system of Item 17, wherein the lens arranged at the closest position to the object satisfies the following conditional expression (8).

$$DA1<0.35 \qquad (8)$$

In the expression, DA1 is a value representing acid-resistance which is obtained by putting powder of a glass material of the lens arranged at the closest position to the object into nitric acid solution with a concentration of 0.01 mol/l, heating the nitric acid solution in a boiling bath, and measuring a reduced mass (%) of the powder of the glass material as the value representing acid-resistance.

19. The wide-angle optical system of any one of Items 1 to 18, wherein a second lens is defined by numbering in order from an object side, and the second lens is a lens made of a resin material, including at least one aspheric surface.

20. The wide-angle optical system of any one of Items 1 to 19, wherein a fourth lens is defined by numbering in order from an object side, and the fourth lens is a lens made of a resin material, including at least one aspheric surface.

21. The wide-angle optical system of any one of Items 1 to 20, wherein the wide-angle optical system satisfies the following conditional expression (9) for a principal ray of a light flux with a half angle of view of 90 degrees.

$$-0.3<(Yr/2f)-1<0.7 \qquad (9)$$

In the expression, Yr is a position (distance from an optical axis) of the principal ray on an image plane, and f is a focal length of a total system of the wide-angle optical system.

22. The wide-angle optical system of any one of Items 1 to 21, wherein the wide-angle optical system satisfies the following conditional expression (10).

$$Y'/TL>0.1 \qquad (10)$$

In the expression, Y' is a maximum image height, and

TL is a distance along an optical axis from a surface vertex on a lens surface arranged at a closest position to an object, to an image plane (where a back focal length is measured in an air conversion length).

23. The wide-angle optical system of any one of Items 1 to 22, wherein the wide-angle optical system satisfies the following conditional expression (11).

$$|Ep|/Lb>2.2 \qquad (11)$$

In the expression, Ep is a position (distance from an image plane) of an exit pupil for a principal ray corresponding to a maximum image height, and Lb is a back focal length (measured in an air conversion length).

24. The wide-angle optical system of any one of Items 4 to 23, further comprising a means controlling transmission of an ultraviolet ray, arranged on an optical surface at a closer position to an object than the positive lens satisfying the conditional expression (1) or on an object-side surface of the positive lens.

25. The wide-angle optical system of any one of Items 4 to 24, wherein the lens made of a resin material which is the positive lens satisfying the conditional expression (1), is a lens formed of a material such that particles with a maximum size of 30 nanometers or less are dispersed in a resin material.

26. The wide-angle optical system of Item 19 or 20, wherein the lens made of a resin material is a lens formed of a material such that particles with a maximum size of 30 nanometers or less are dispersed in a resin material.

27. An image pickup lens device comprising:
the wide-angle optical system of any one of Items 1 to 26 whose structure is capable of forming an image of an object on a predetermined image-forming plane.

28. A monitor camera to be attached to a predetermined position and pick up an image of an object in a predetermined area surrounding the position where the monitor camera is attached, the monitor camera comprising:
the image pickup lens device of Item 27, and
an image pickup element for converting an optical image of the object guided by the image pickup lens device into electric signal.

29. A digital apparatus comprising:
the image pickup lens device of Item 27;
an image pickup element for converting an optical image of an object guided by the image pickup lens device into electric signal; and
a controller configured to make the image pickup lens device and the image pickup element shoot at least one of a static image of an object or a movie of the object.

30. The digital apparatus of Item 29, further comprising:
an image processing section for correcting a distortion in an optical image of the object formed on a light-receiving surface of the image pickup element.

ADVANTAGEOUS EFFECTS OF INVENTION

According to the present invention, the front lens group is arranged at a closer position to the object than the aperture stop and the rear lens group is arranged at a closer position to the image than the aperture stop, which makes correction of off-axis aberrations at a wide angle of view easy. Further, when a negative lens is arranged in the front lens group, the optical system becomes so called a retrofocus type (Inverted telephoto lens), which allows the optical system to secure a sufficient back focal length even when the optical system copes with an wide angle or has a short focal length required to realize a super wide angle. Further, when the optical system forms an image on an image pickup element such as a CCD, the incident angle of a ray entering an image plane can be brought to a telecentric condition. When at least one positive lens is arranged in the front lens group, Petzval's sum can be controlled and astigmatism can be corrected easily. A super wide-angle optical system is generally required to employ a strong negative lens arranged in the front lens group, and such the structure can cause a great magnification chromatic aberration. However, the aberrations can be corrected by a positive lens arranged in the front lens group.

Further, when at least one positive lens among a positive lens or positive lenses included in the front lens group, includes at least one aspheric surface, spherical aberration, coma and astigmatism are improved greatly. When trying to obtain desired negative optical power with one negative lens, its curvature radius becomes small, which hinders easy manufacturing of the negative lens. However, when at least two negative lenses are arranged in the front lens group, desired negative optical power is distributed to at least two negative lenses. As a result, its productivity is improved, which enables a cost reduction. Then, when a value of the conditional expression (1) exceeds the upper limit, correction of the magnification chromatic aberration becomes insufficient to cause deterioration of image quality caused by a decline of contrast. However, the decline of the contrast is improved, when the front lens group satisfies the conditional expression (1).

When a positive lens satisfies the conditional expression (1), it is possible to correct magnification chromatic aberration that is caused when powers of the positive lens(es) and negative lenses in the front lens group are strengthened in order to make the optical system compact. Therefore, the wide-angle optical system having such the structure can provide a wide-angle optical system that has more excellent optical property and becomes compact (downsized), an image pickup lens device, a monitor camera and a digital apparatus.

Figure 3A:
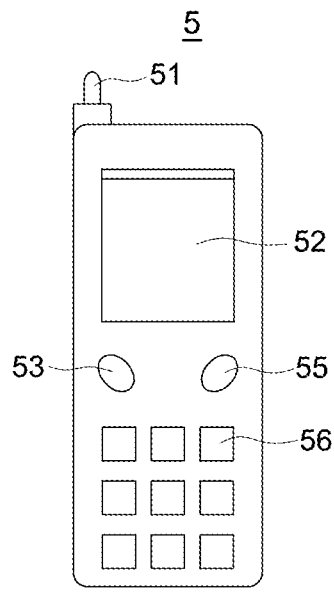
Figure 3B:
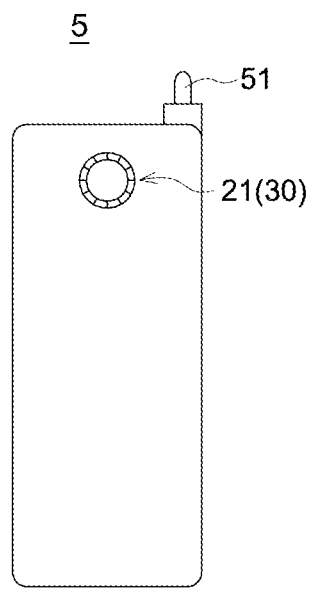

Each of FIGS. 3A and 3B is an external block diagram of a cell-phone equipped with a camera, showing an embodiment of a digital apparatus.

Figure 4:
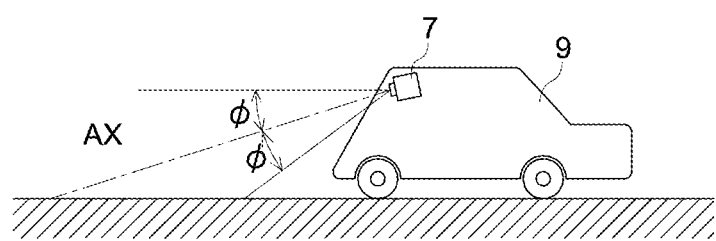

FIG. 4 is a diagram for explaining an outline of an onboard monitor camera, showing an embodiment of a digital apparatus.

Figure 5:
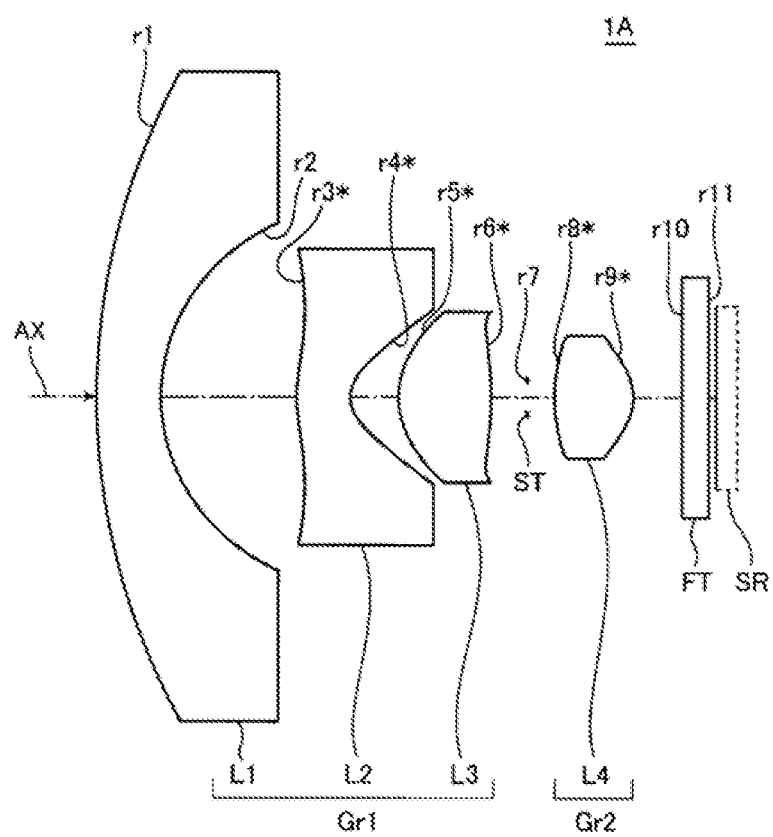

FIG. 5 is a sectional view showing an arrangement of lens groups in a wide-angle optical system of Example 1.

Figure 6:
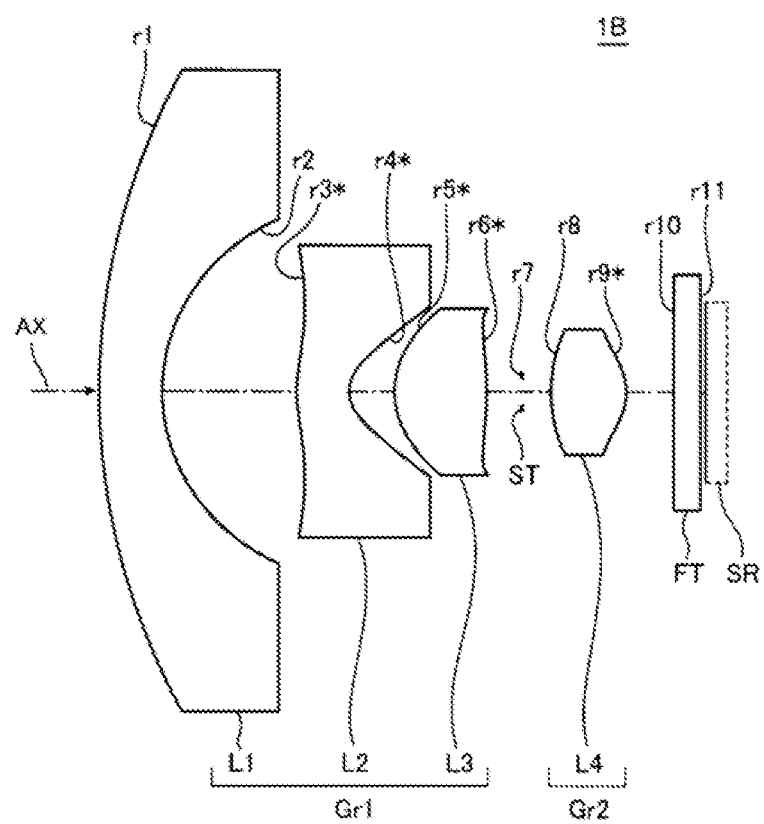

FIG. 6 is a sectional view showing an arrangement of lens groups in a wide-angle optical system of Example 2.

Figure 7:
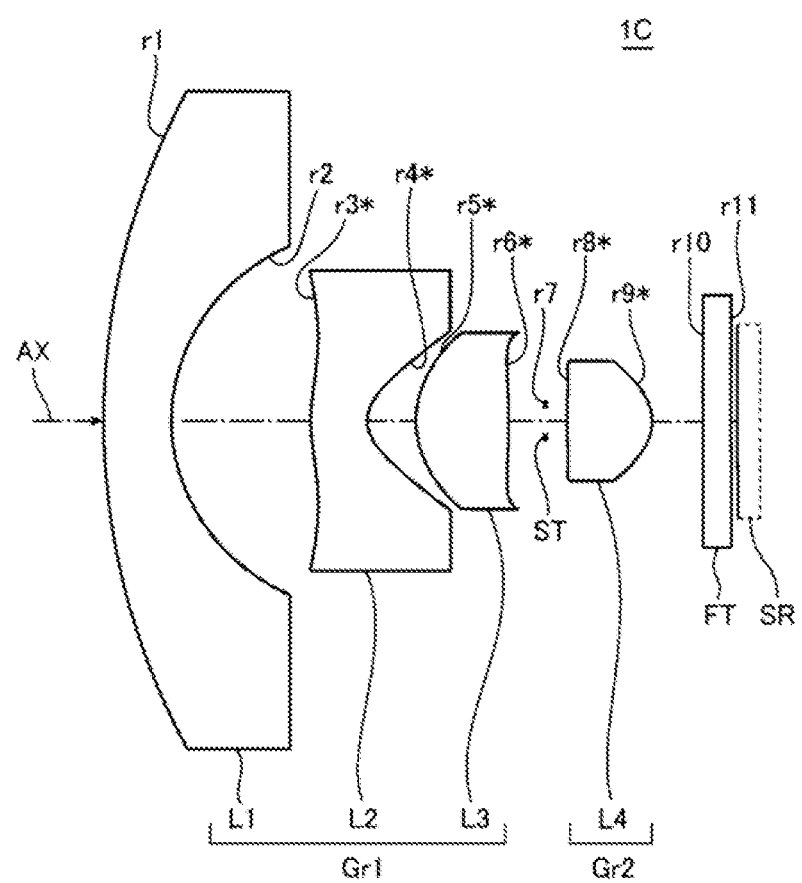

FIG. 7 is a sectional view showing an arrangement of lens groups in a wide-angle optical system of Example 3.

Figure 8:
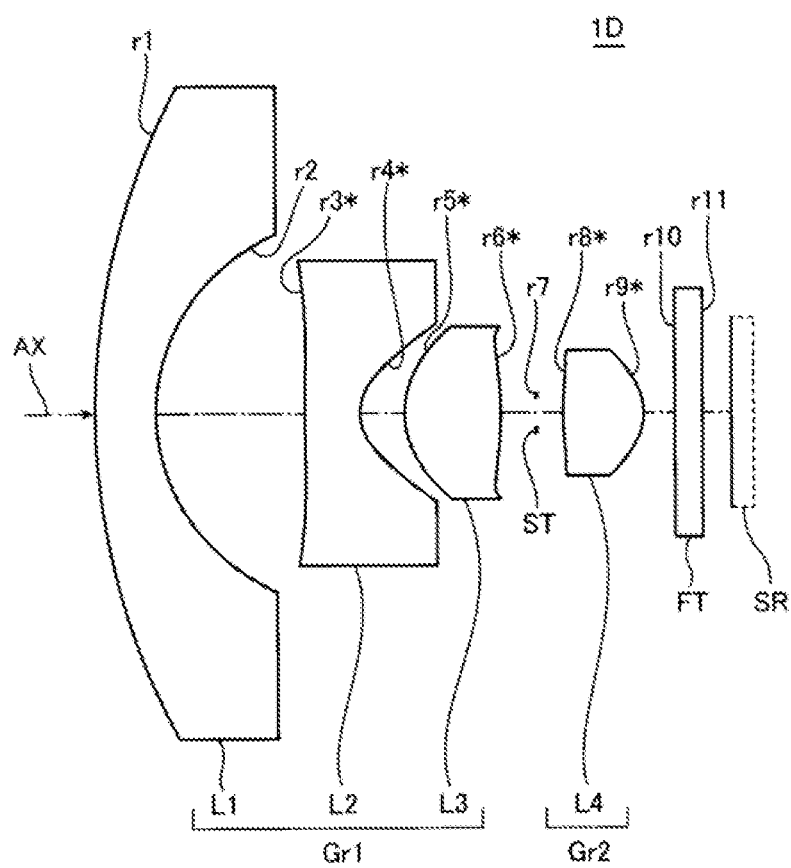

FIG. 8 is a sectional view showing an arrangement of lens groups in a wide-angle optical system of Example 4.

Figure 9:
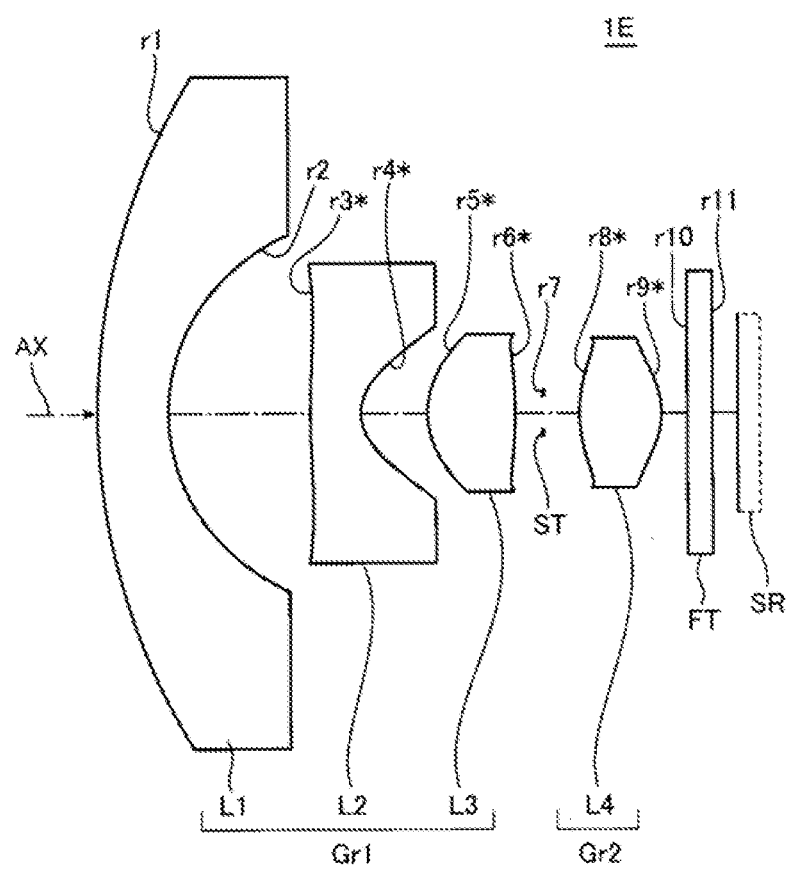

FIG. 9 is a sectional view showing an arrangement of lens groups in a wide-angle optical system of Example 5.

Figure 10:
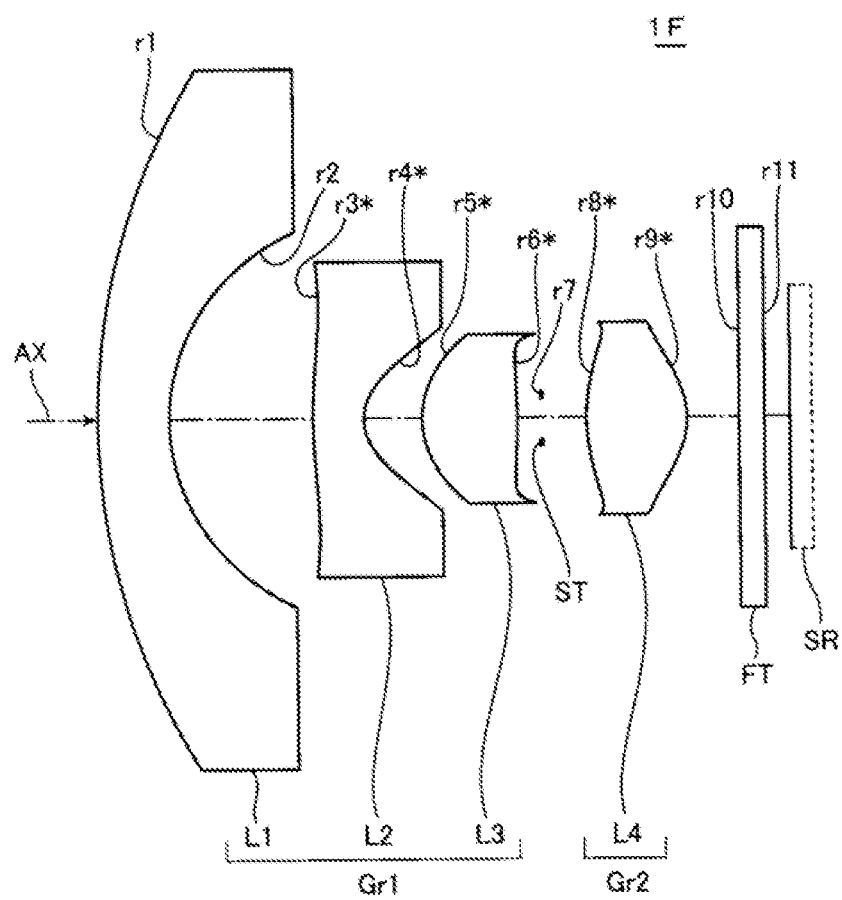

FIG. 10 is a sectional view showing an arrangement of lens groups in a wide-angle optical system of Example 6.

Figure 11:
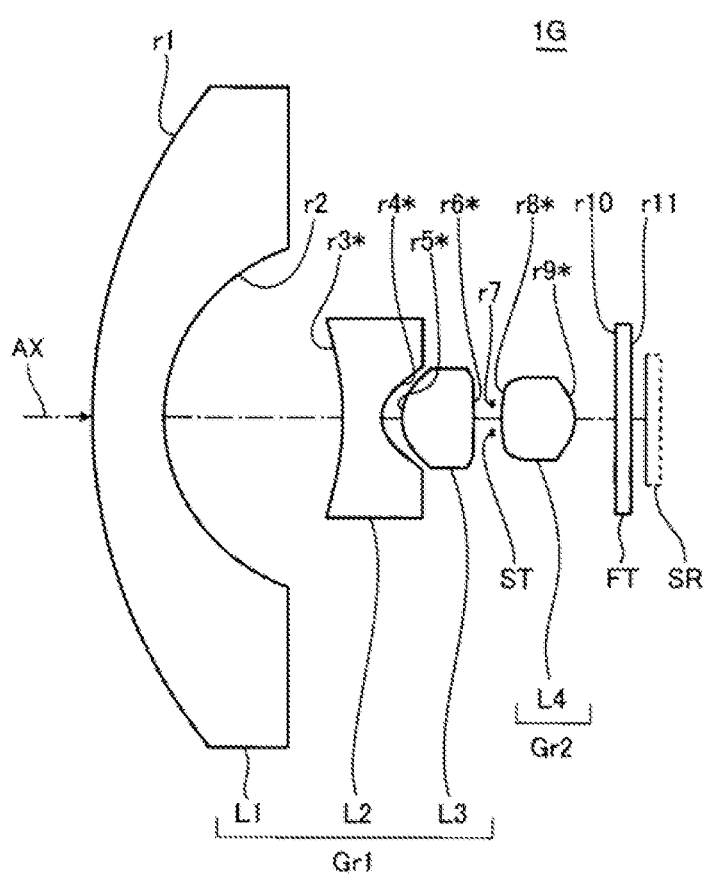

FIG. 11 is a sectional view showing an arrangement of lens groups in a wide-angle optical system of Example 7.

Figure 12:
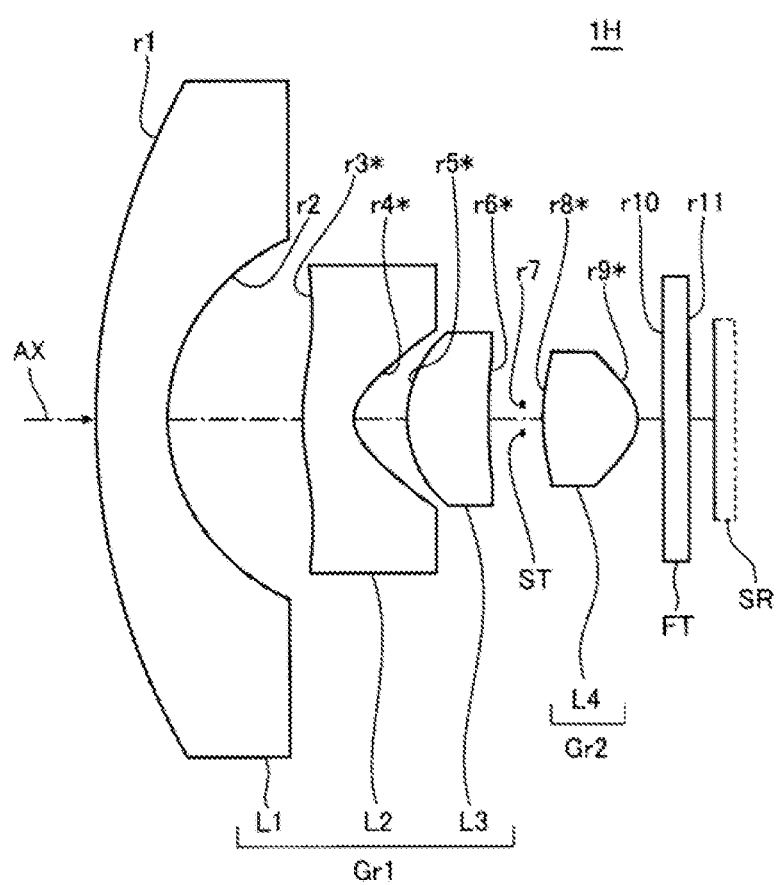

FIG. 12 is a sectional view showing an arrangement of lens groups in a wide-angle optical system of Example 8.

Figure 13:
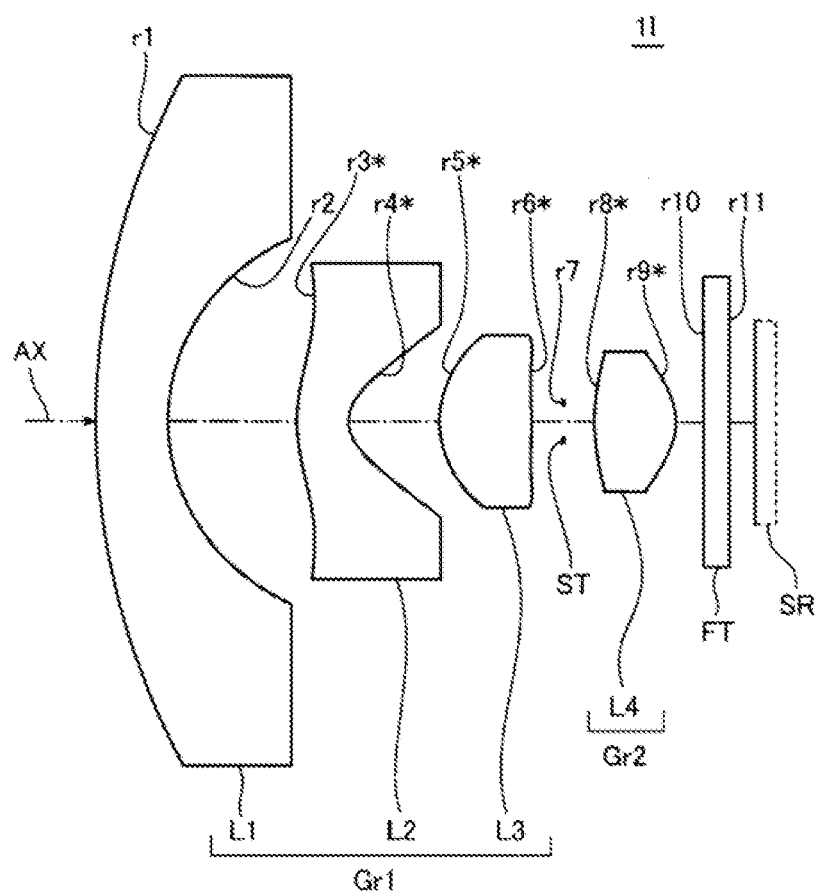

FIG. 13 is a sectional view showing an arrangement of lens groups in a wide-angle optical system of Example 9.

Figure 14:
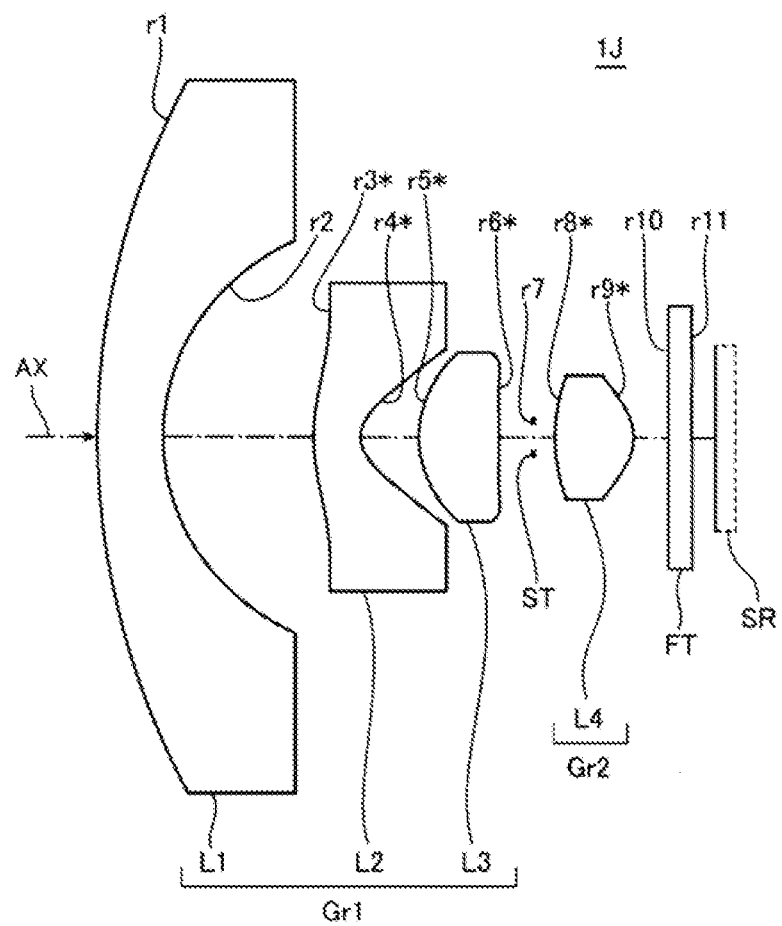

FIG. 14 is a sectional view showing an arrangement of lens groups in a wide-angle optical system of Example 10.

Figure 15:
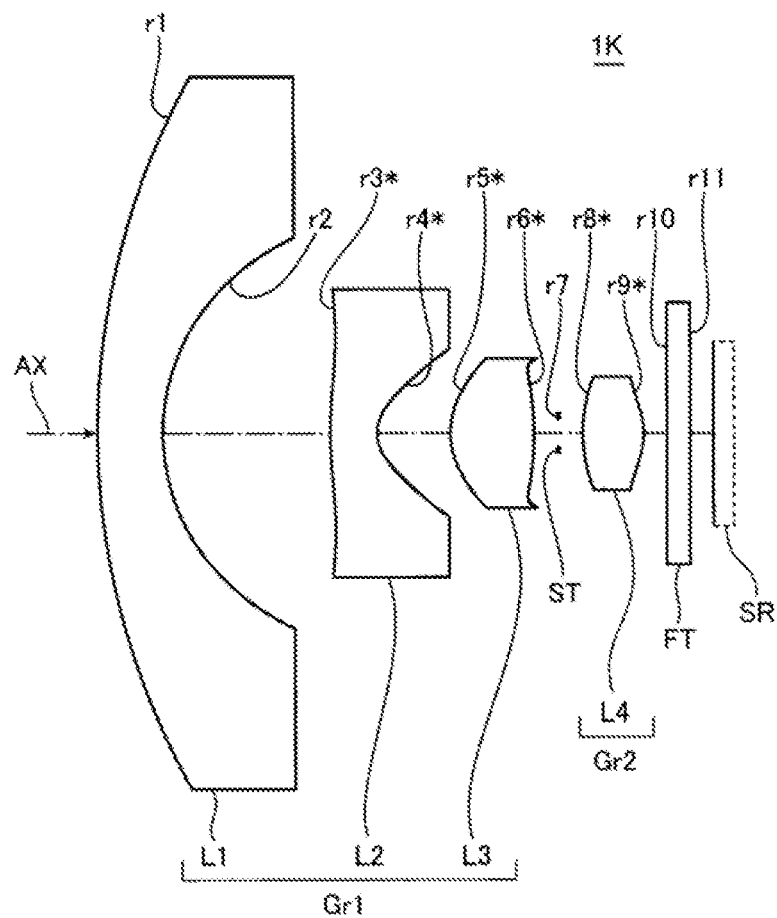

FIG. 15 is a sectional view showing an arrangement of lens groups in a wide-angle optical system of Example 11.

Figure 16:
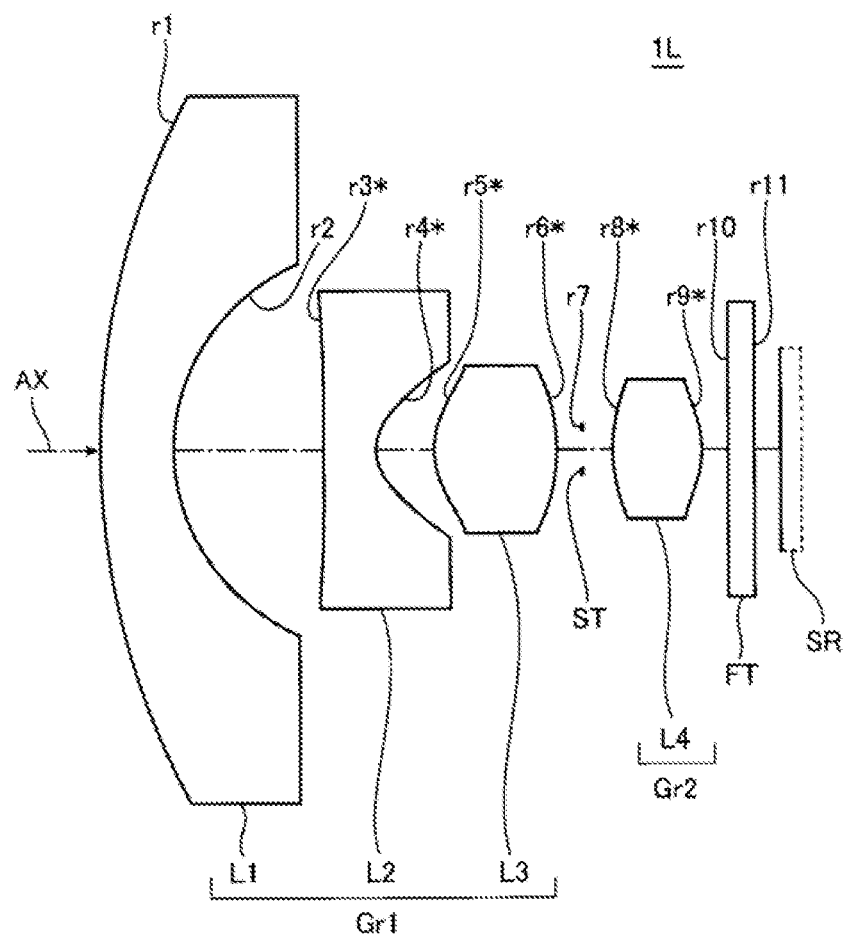

FIG. 16 is a sectional view showing an arrangement of lens groups in a wide-angle optical system of Example 12.

Figure 17:
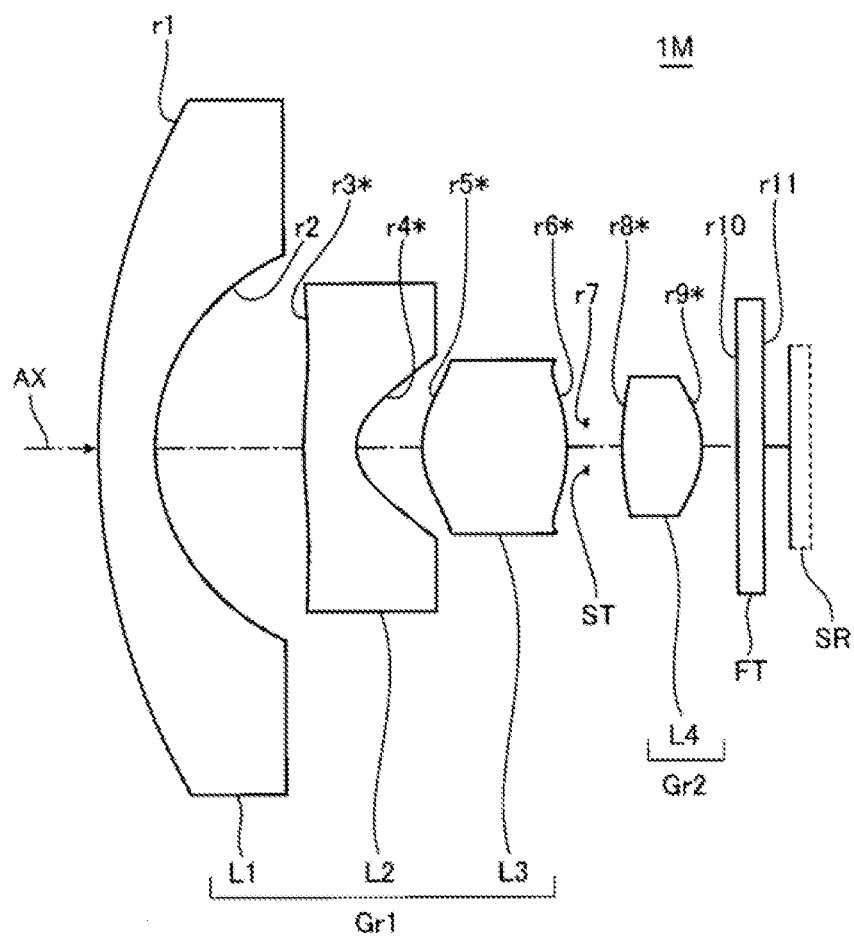

FIG. 17 is a sectional view showing an arrangement of lens groups in a wide-angle optical system of Example 13.

Figure 18:
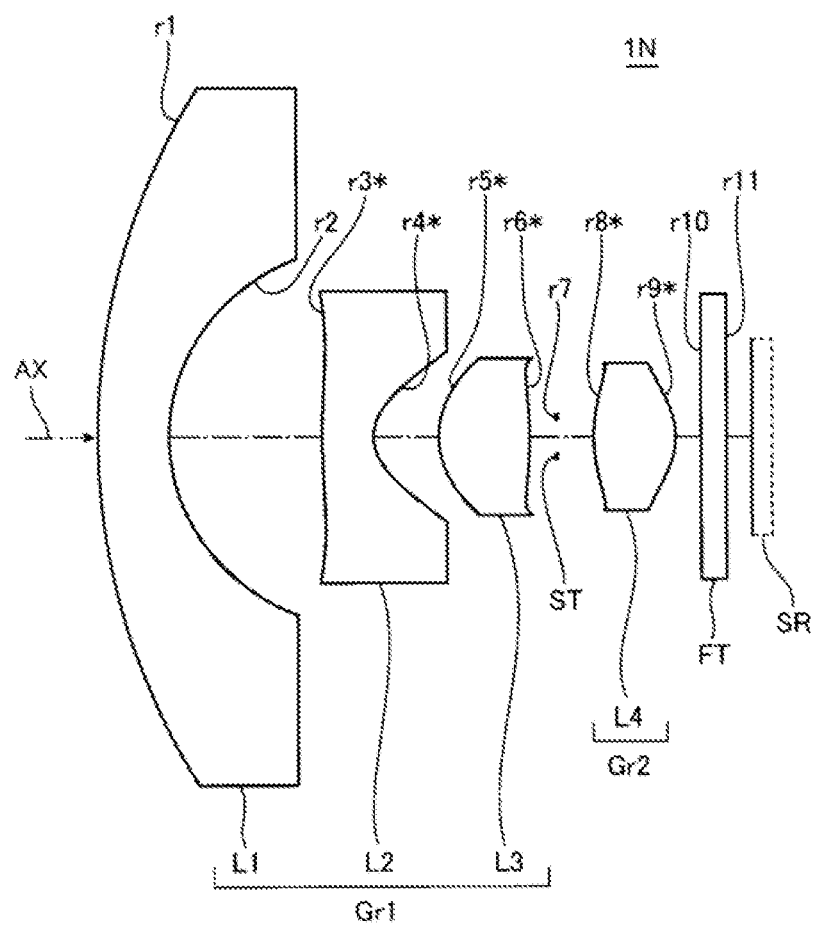

FIG. 18 is a sectional view showing an arrangement of lens groups in a wide-angle optical system of Example 14.

Figure 19:
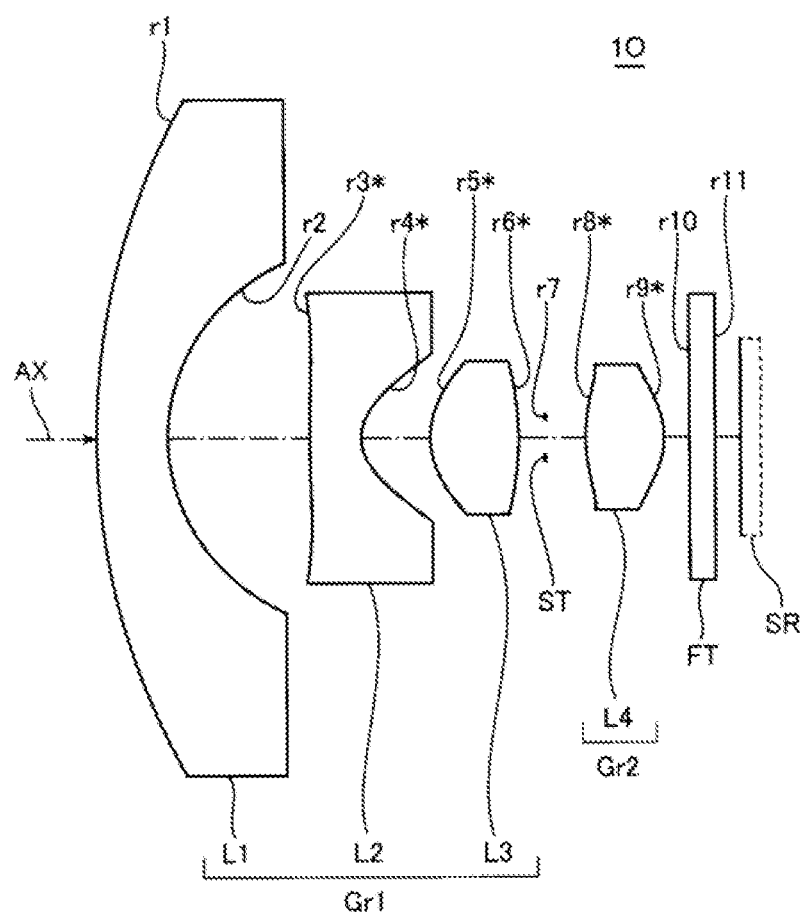

FIG. 19 is a sectional view showing an arrangement of lens groups in a wide-angle optical system of Example 15.

Figure 20:
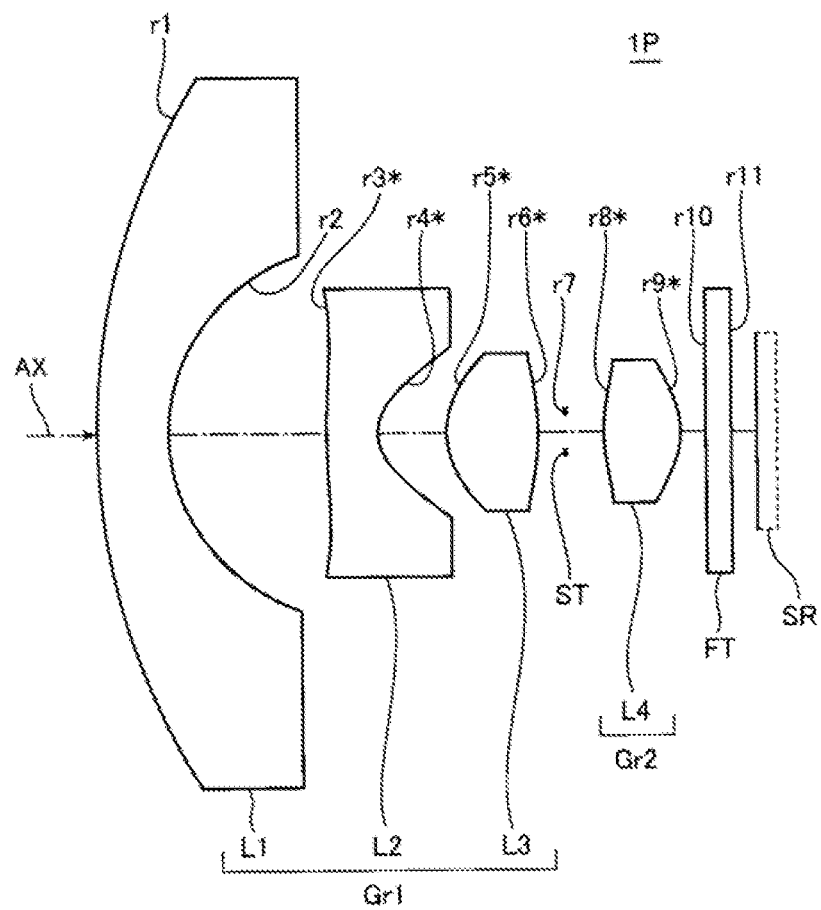

FIG. 20 is a sectional view showing an arrangement of lens groups in a wide-angle optical system of Example 16.

Figure 21:
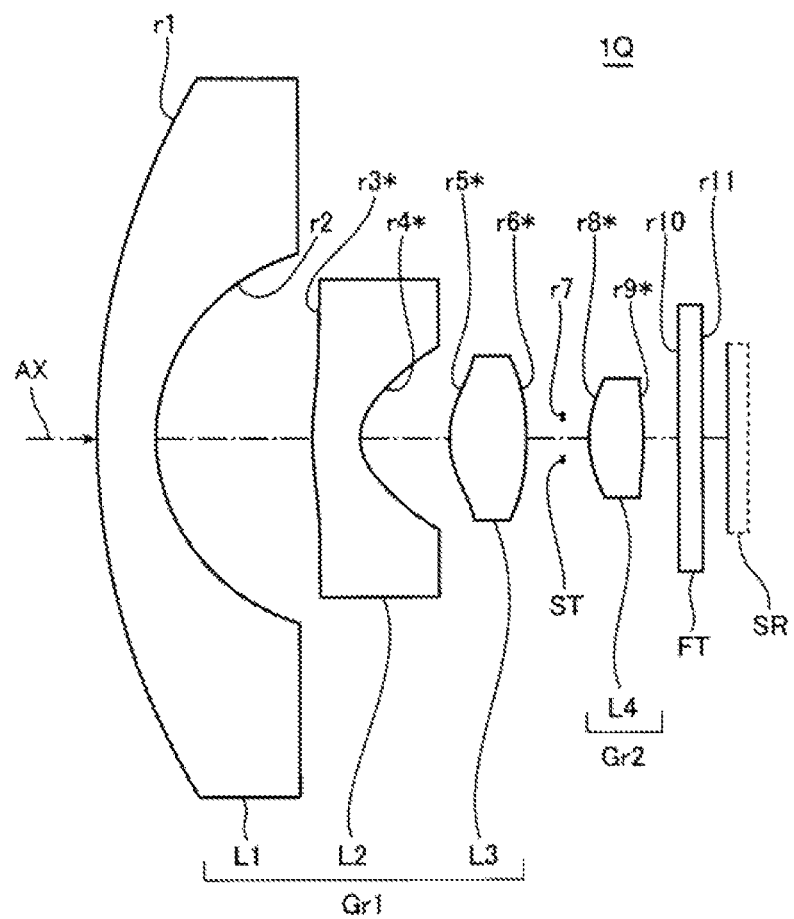

FIG. 21 is a sectional view showing an arrangement of lens groups in a wide-angle optical system of Example 17.

Figure 22:
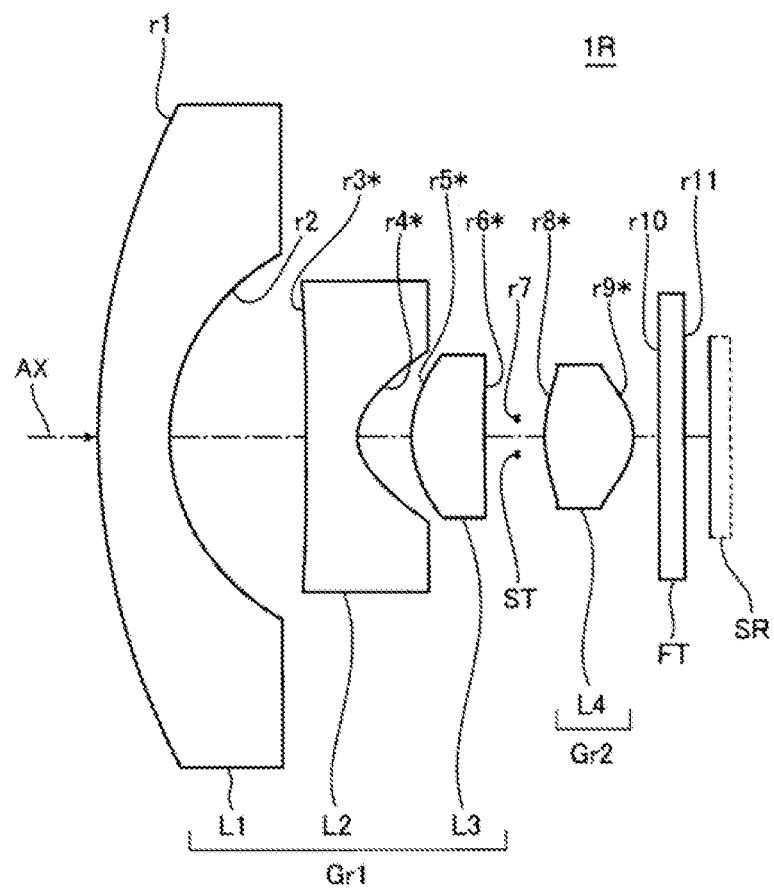

FIG. 22 is a sectional view showing an arrangement of lens groups in a wide-angle optical system of Example 18.

Figure 23:
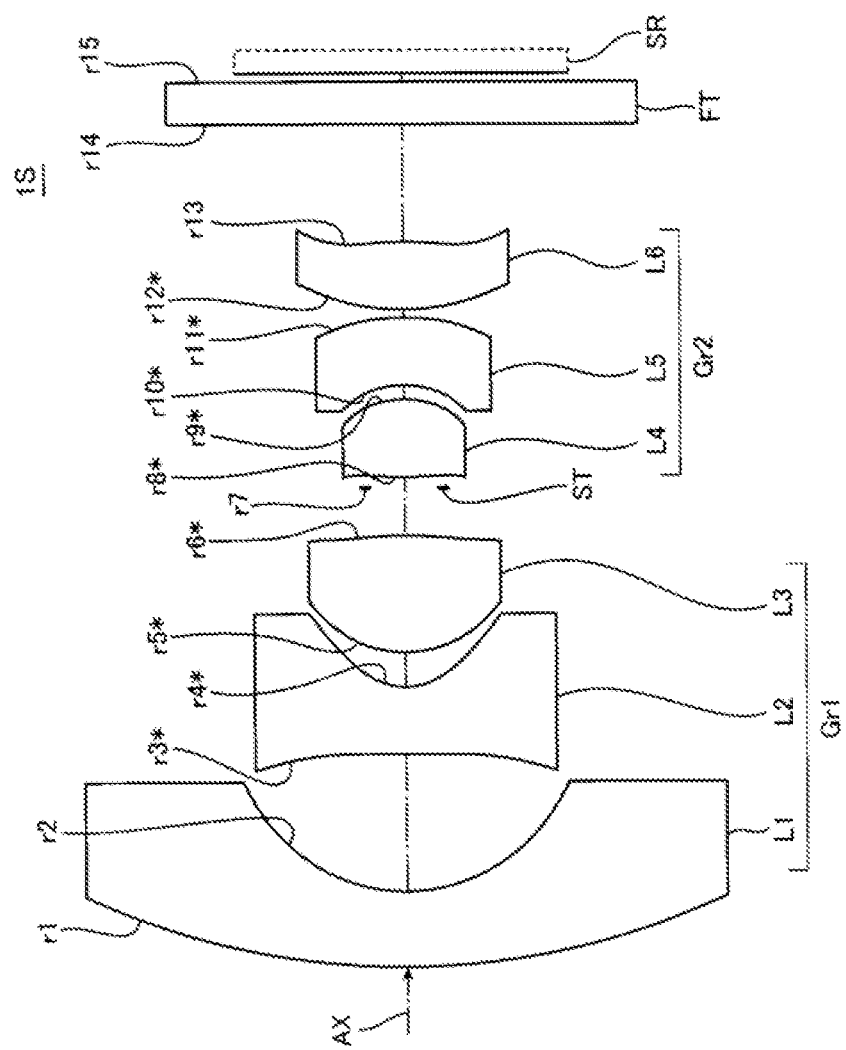

FIG. 23 is a sectional view showing an arrangement of lens groups in a wide-angle optical system of Example 19.

Figure 24:
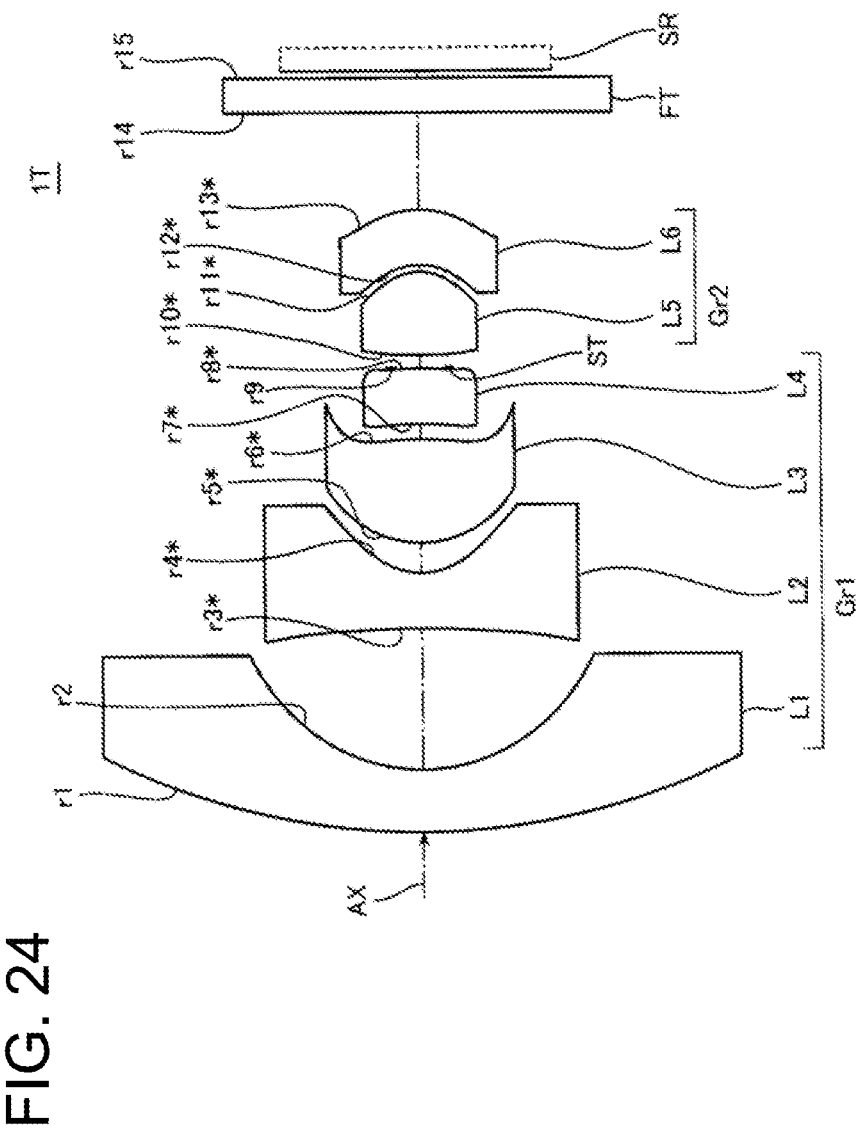

FIG. 24 is a sectional view showing an arrangement of lens groups in a wide-angle optical system of Example 20.

Figure 25A:
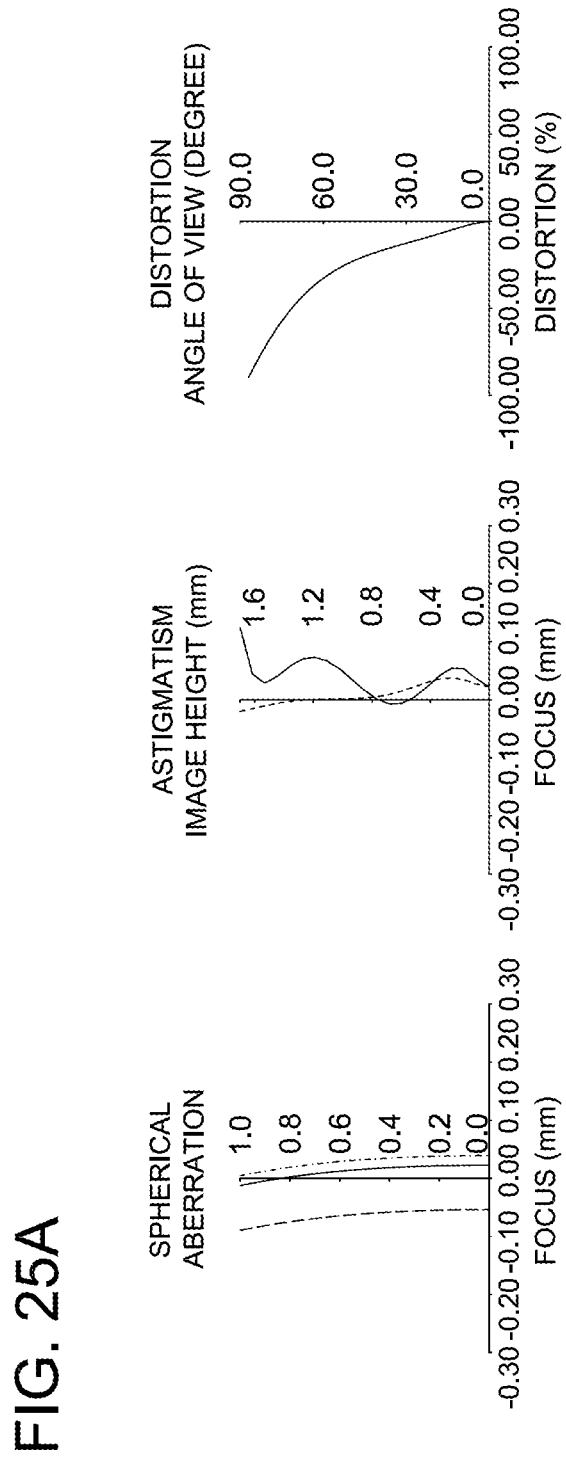

Each of FIGS. 25A and 25B is an aberration diagram of lens groups in a wide-angle optical system in Example 1.

Figure 26A:
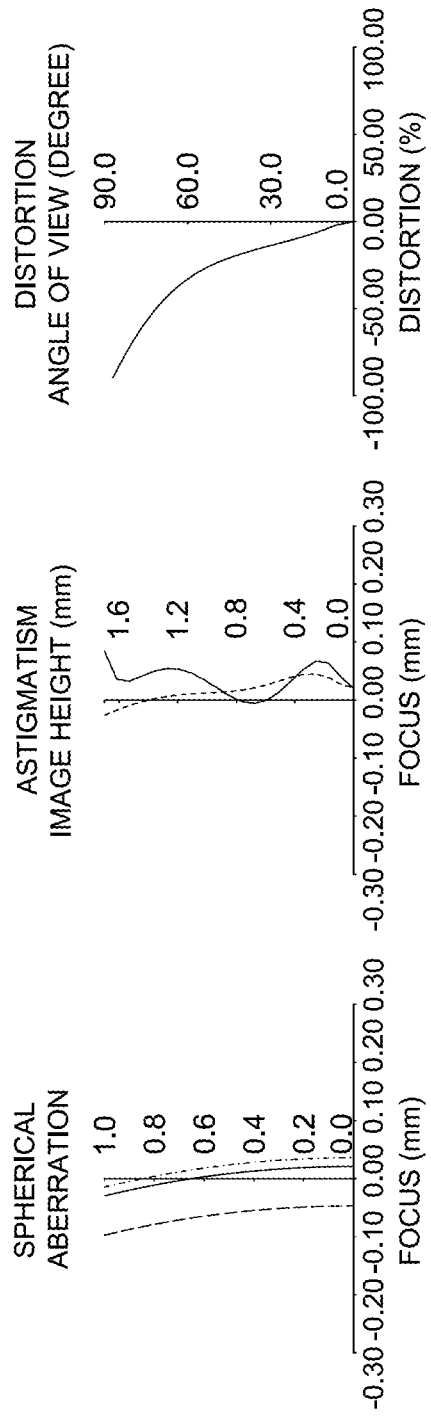

Each of FIGS. 26A and 26B is an aberration diagram of lens groups in a wide-angle optical system in Example 2.

Each of FIGS. 27A and 27B is an aberration diagram of lens groups in a wide-angle optical system in Example 3.

Figure 28A:
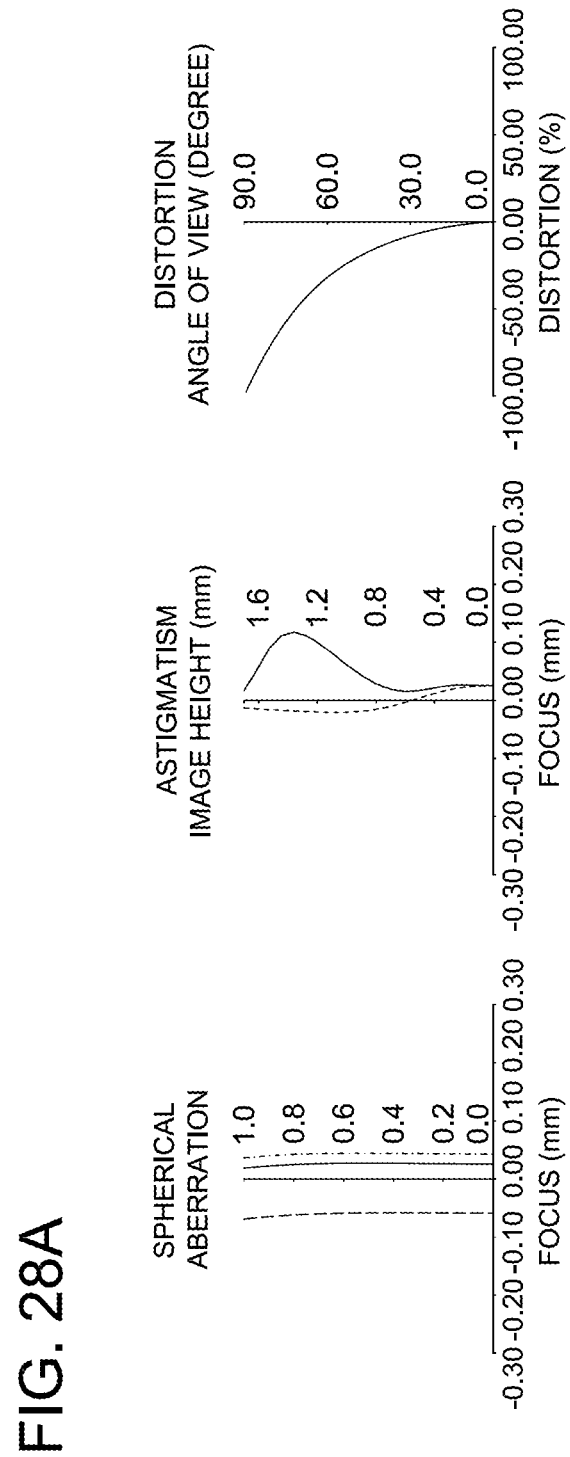

Each of FIGS. 28A and 28B is an aberration diagram of lens groups in a wide-angle optical system in Example 4.

Figure 29A:
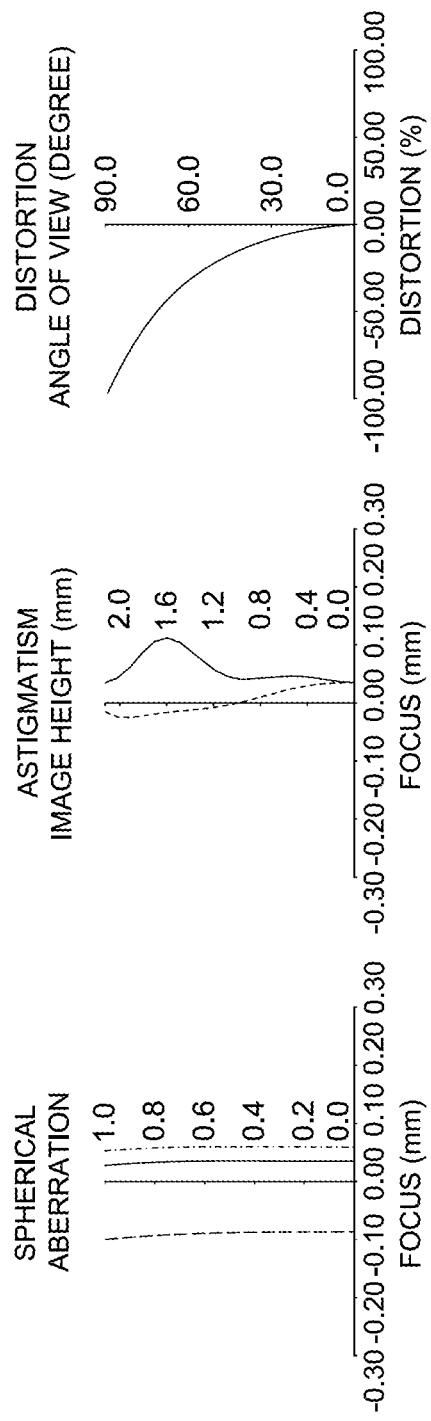

Each of FIGS. 29A and 29B is an aberration diagram of lens groups in a wide-angle optical system in Example 5.

Figure 30A:
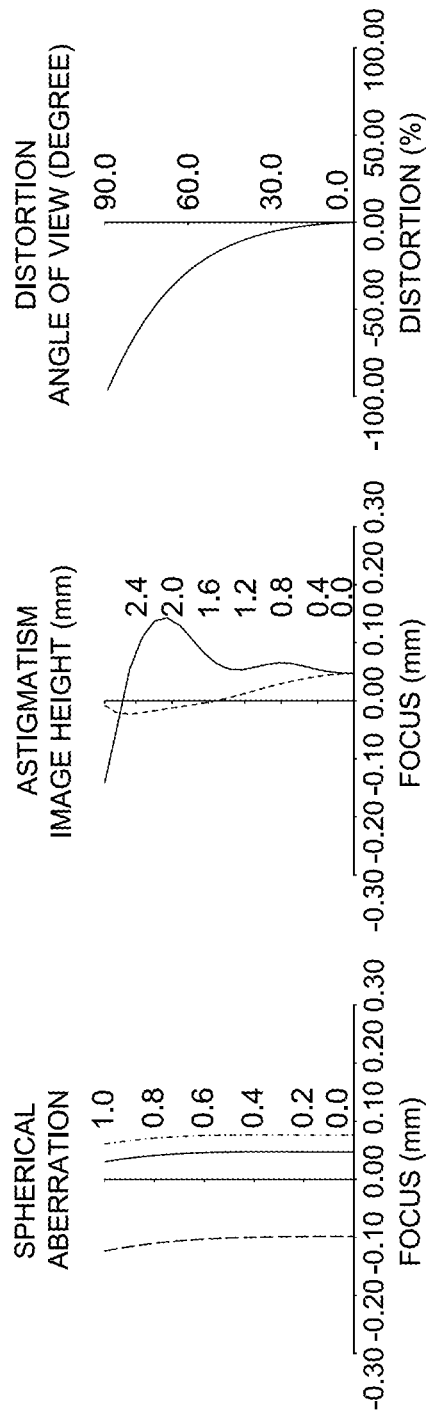

Each of FIGS. 30A and 30B is an aberration diagram of lens groups in a wide-angle optical system in Example 6.

Figure 31A:
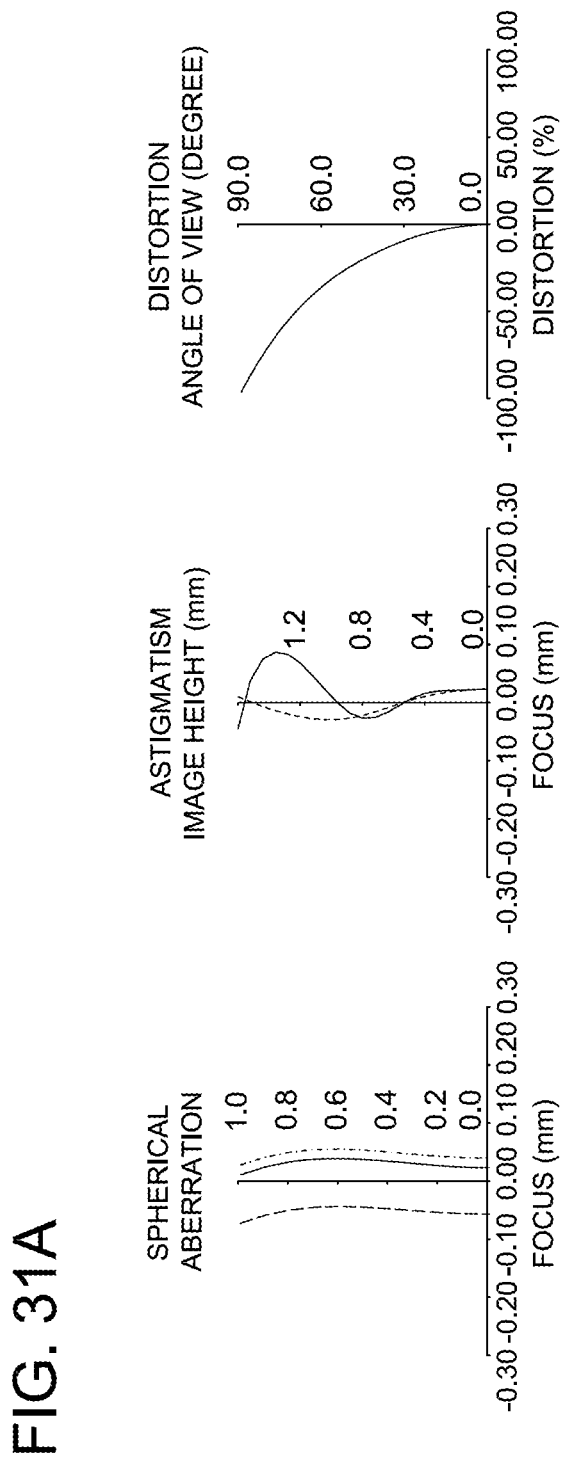

Each of FIGS. 31A and 31B is an aberration diagram of lens groups in a wide-angle optical system in Example 7.

Figure 32A:
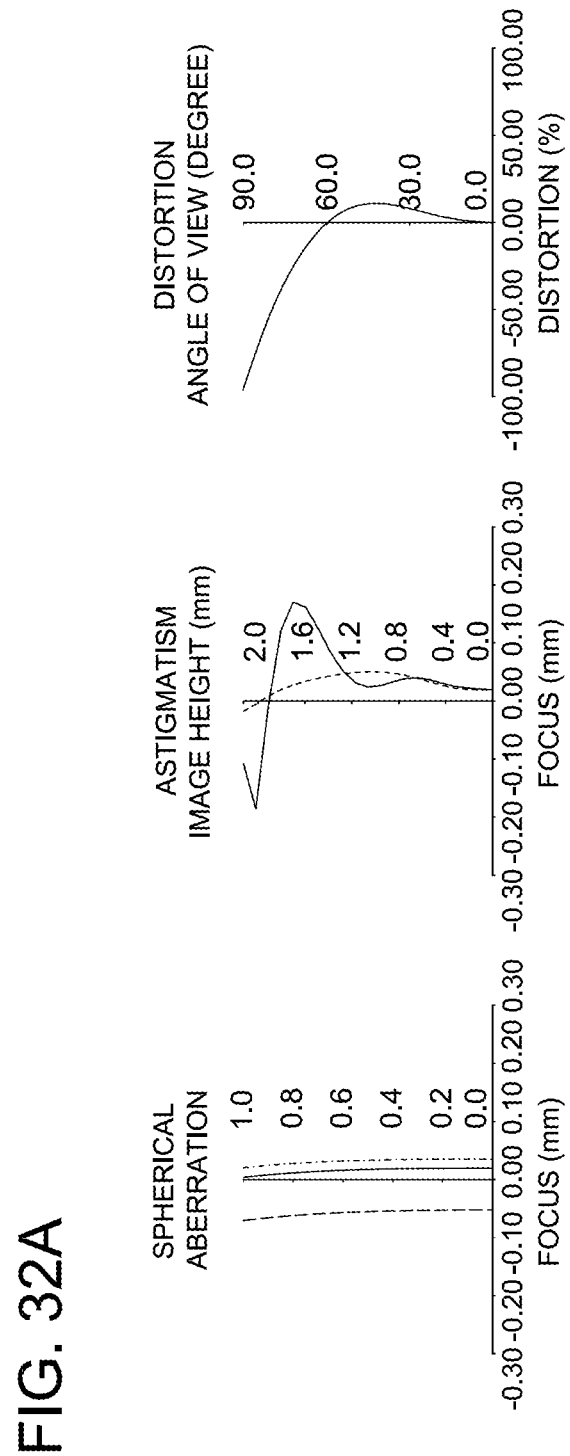

Each of FIGS. 32A and 32B is an aberration diagram of lens groups in a wide-angle optical system in Example 8.

Figure 33A:
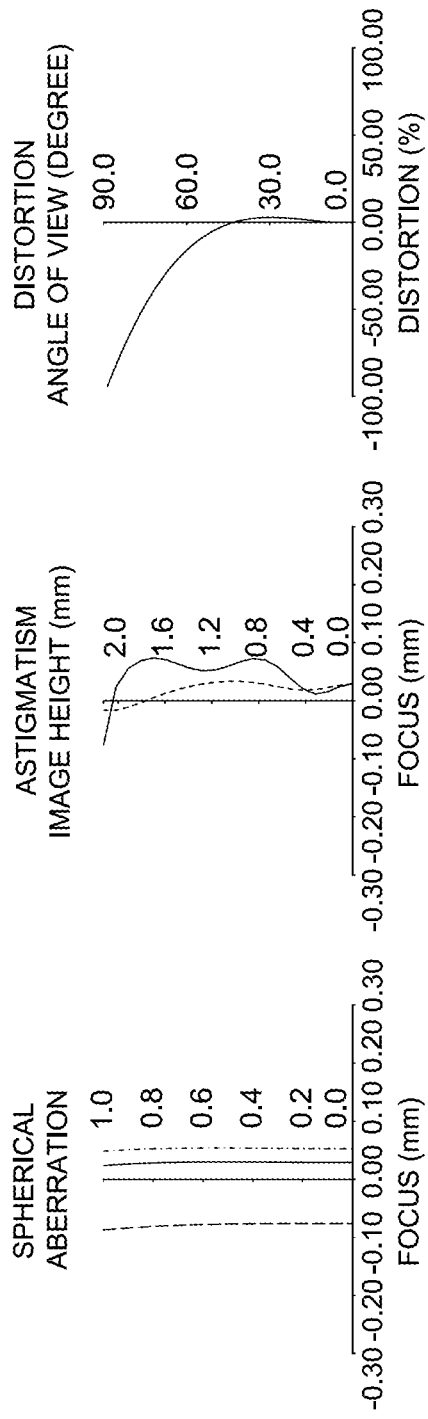

Each of FIGS. 33A and 33B is an aberration diagram of lens groups in a wide-angle optical system in Example 9.

Figure 34A:
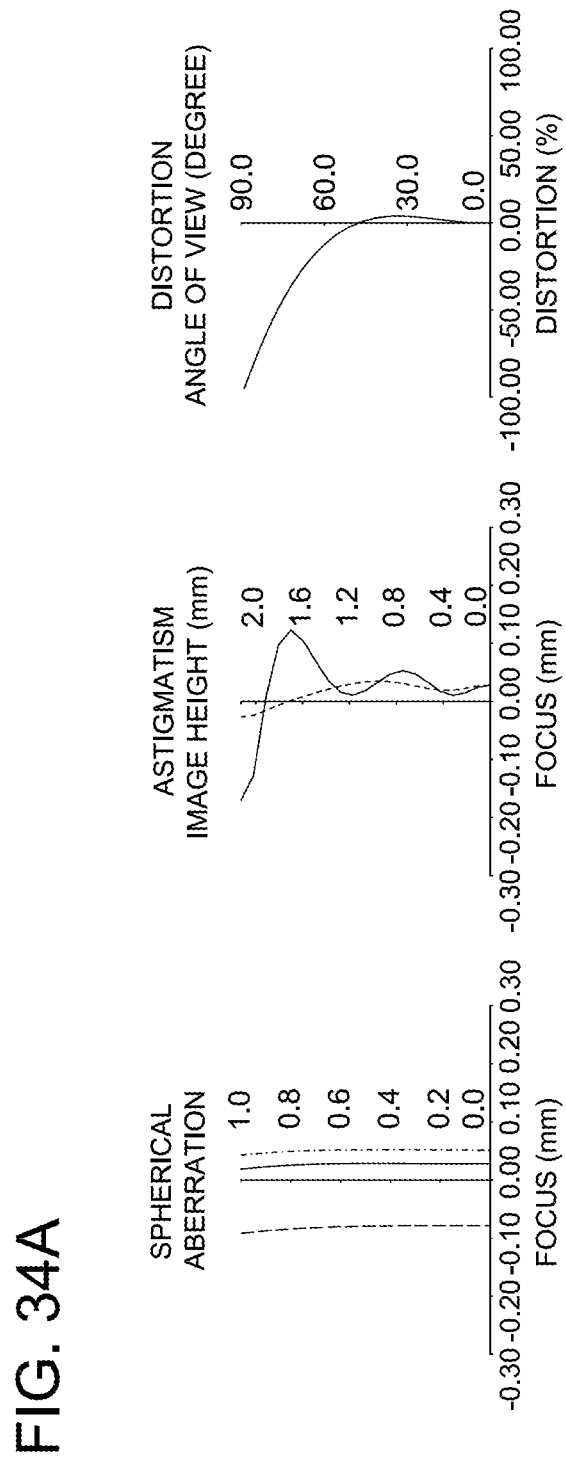

Each of FIGS. 34A and 348 is an aberration diagram of lens groups in a wide-angle optical system in Example 10.

Figure 35A:
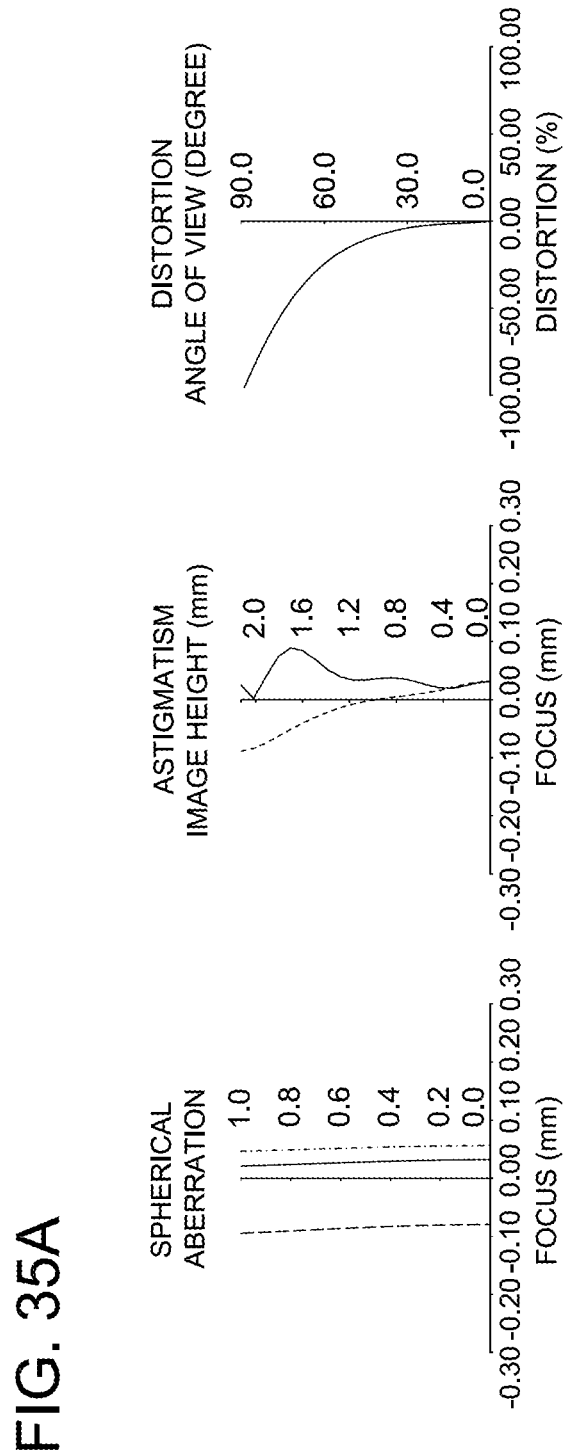

Each of FIGS. 35A and 35B is an aberration diagram of lens groups in a wide-angle optical system in Example 11.

Each of FIGS. 36A and 36B is an aberration diagram of lens groups in a wide-angle optical system in Example 12.

Figure 37A:
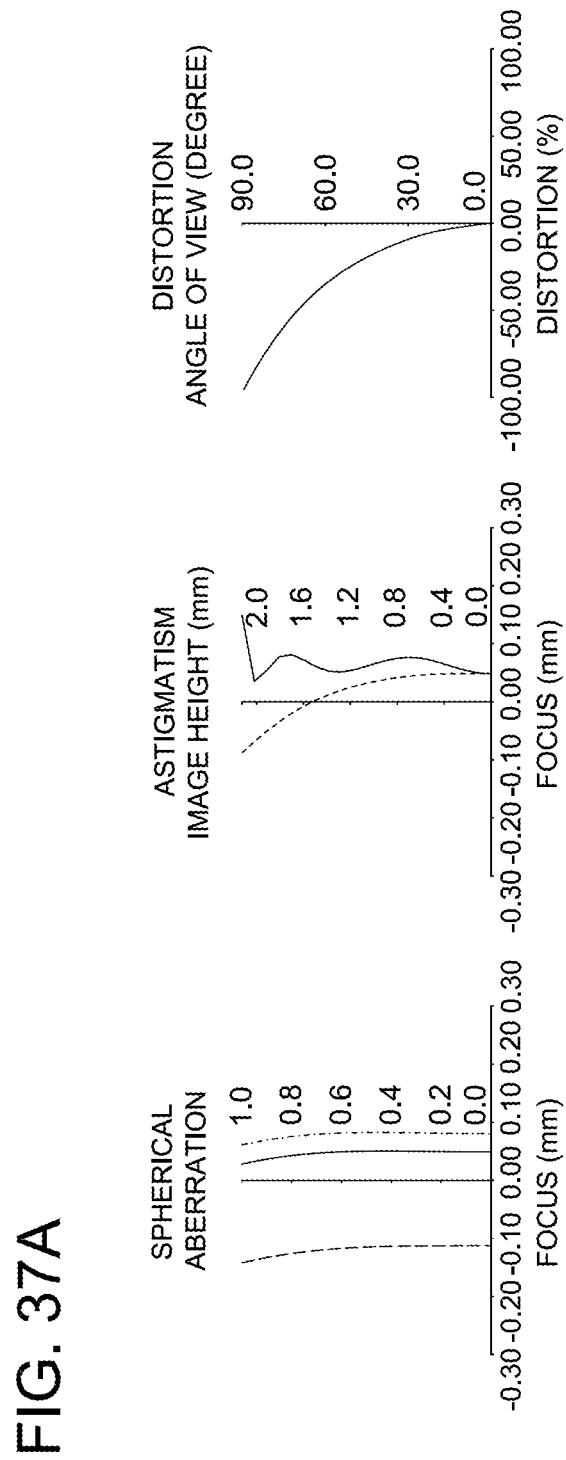

Each of FIGS. 37A and 37B is an aberration diagram of lens groups in a wide-angle optical system in Example 13.

Figure 38A:
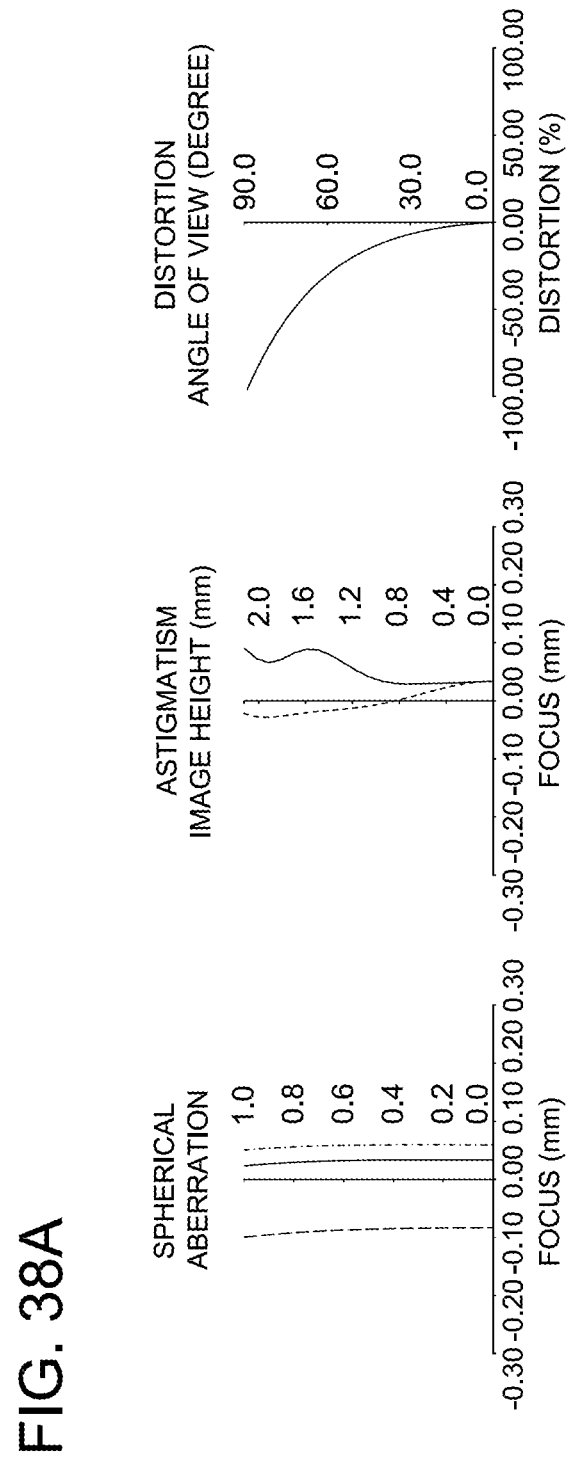

Each of FIGS. 38A and 38B is an aberration diagram of lens groups in a wide-angle optical system in Example 14.

Figure 39A:
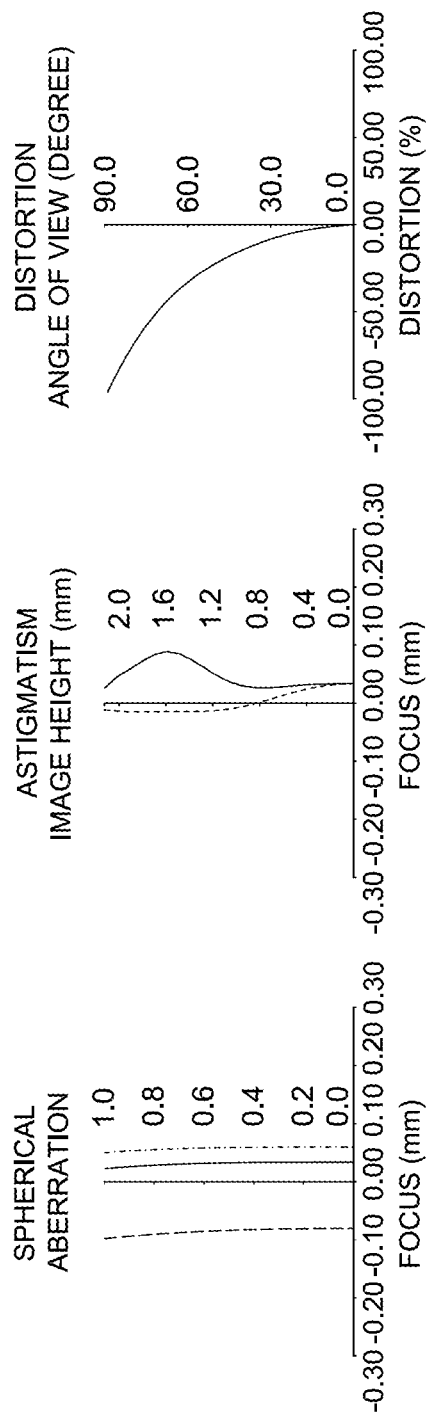

Each of FIGS. 39A and 39B is an aberration diagram of lens groups in a wide-angle optical system in Example 15.

Figure 40A:
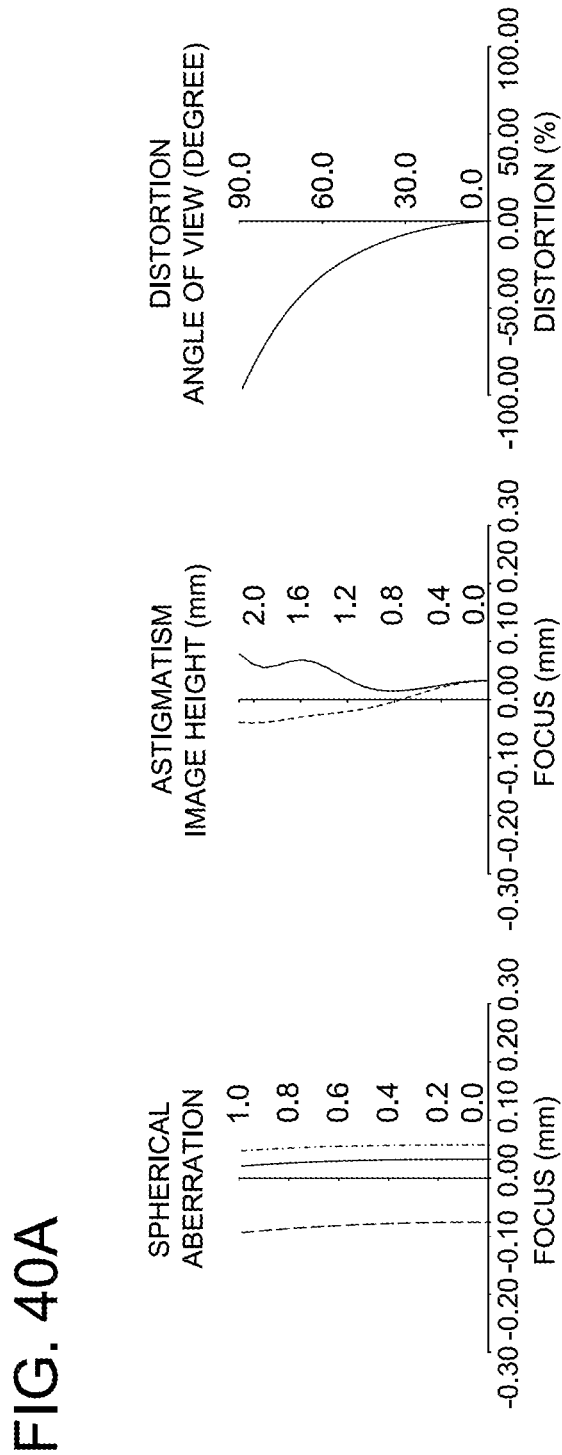

Each of FIGS. 40A and 40B is an aberration diagram of lens groups in a wide-angle optical system in Example 16.

Figure 41A:
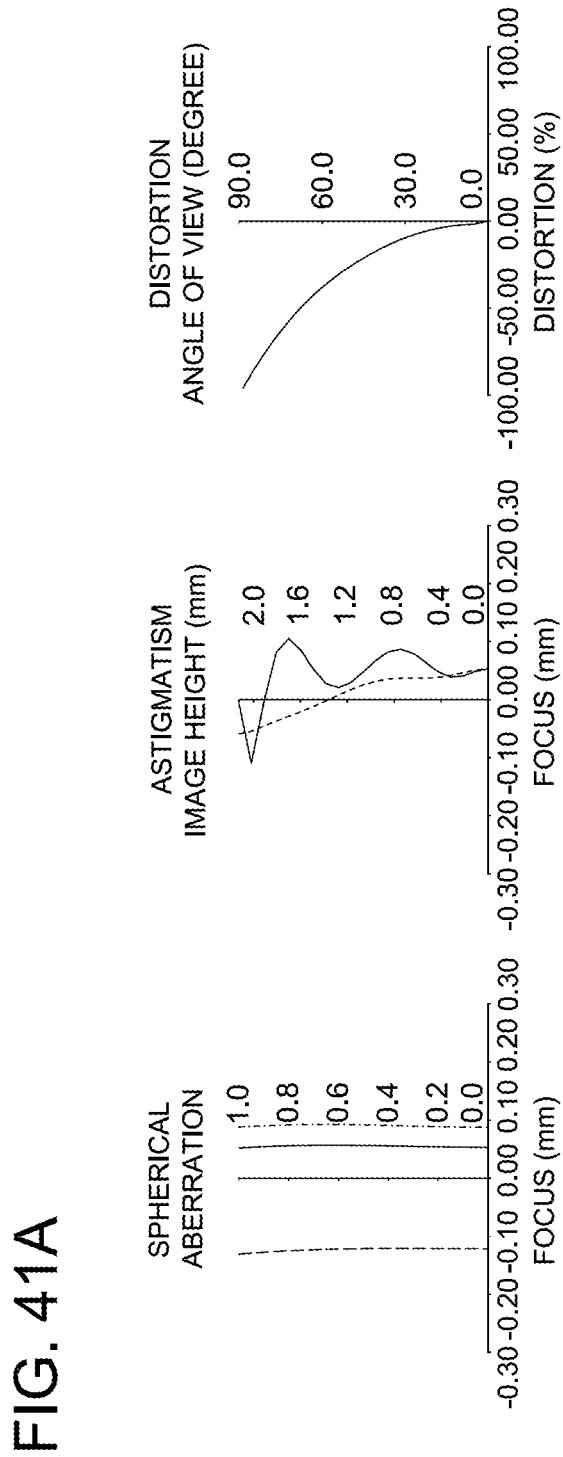

Each of FIGS. 41A and 41B is an aberration diagram of lens groups in a wide-angle optical system in Example 17.

Figure 42A:
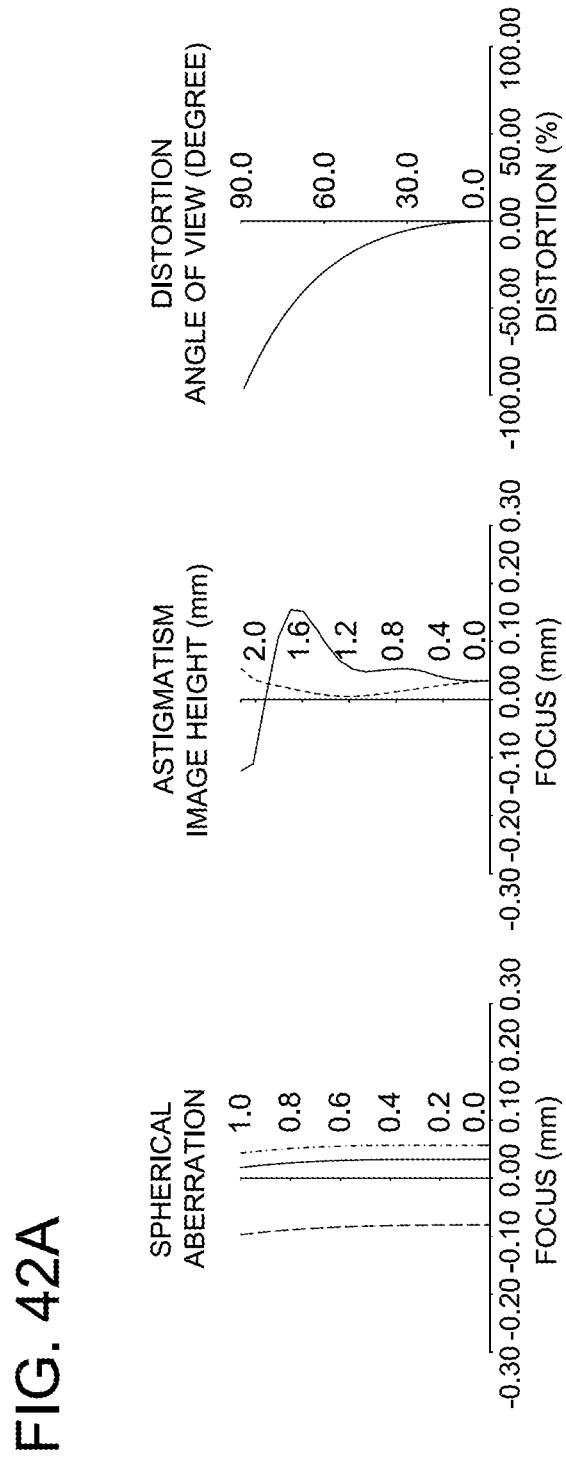

Each of FIGS. 42A and 42B is an aberration diagram of lens groups in a wide-angle optical system in Example 18.

Figure 43A:
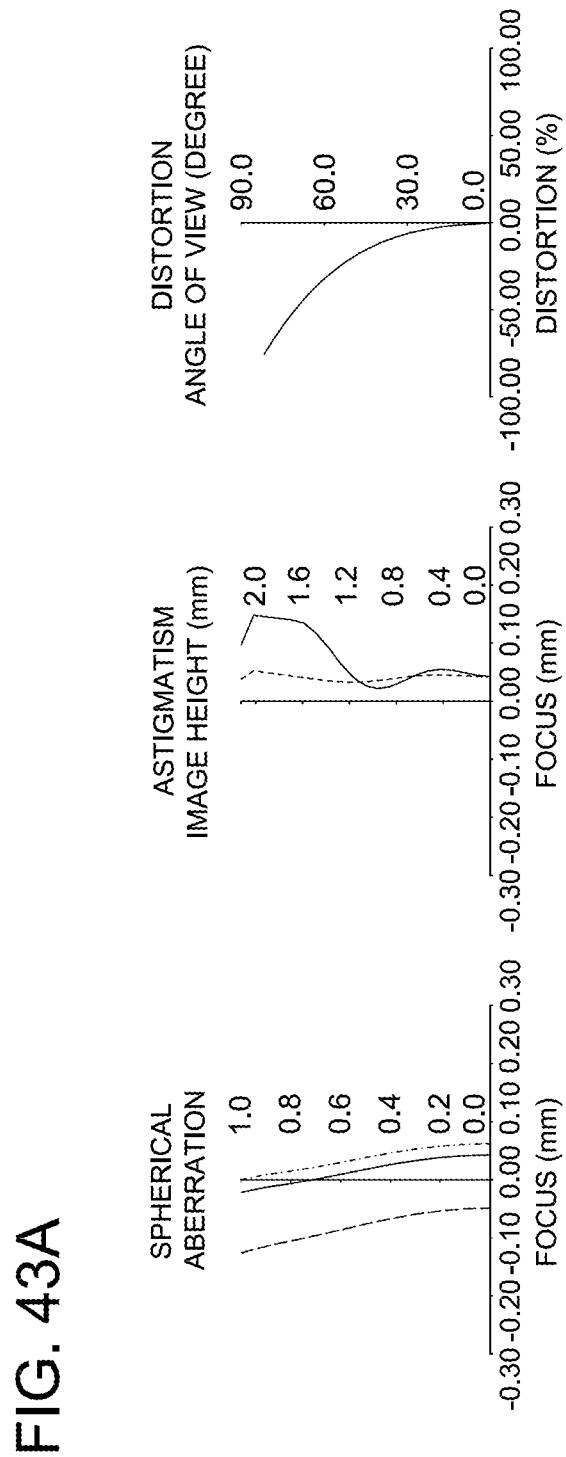

Each of FIGS. 43A and 43B is an aberration diagram of lens groups in a wide-angle optical system in Example 19.

Figure 44A:
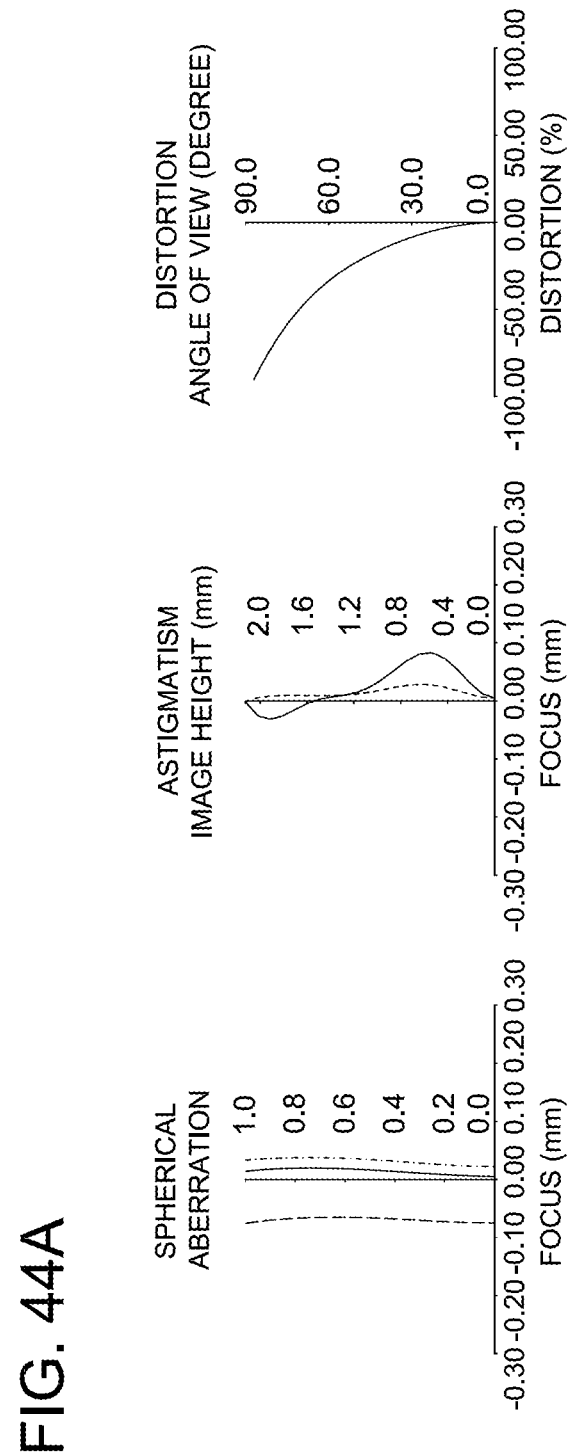

Each of FIGS. 44A and 44B is an aberration diagram of lens groups in a wide-angle optical system in Example 20.

Figure 45:
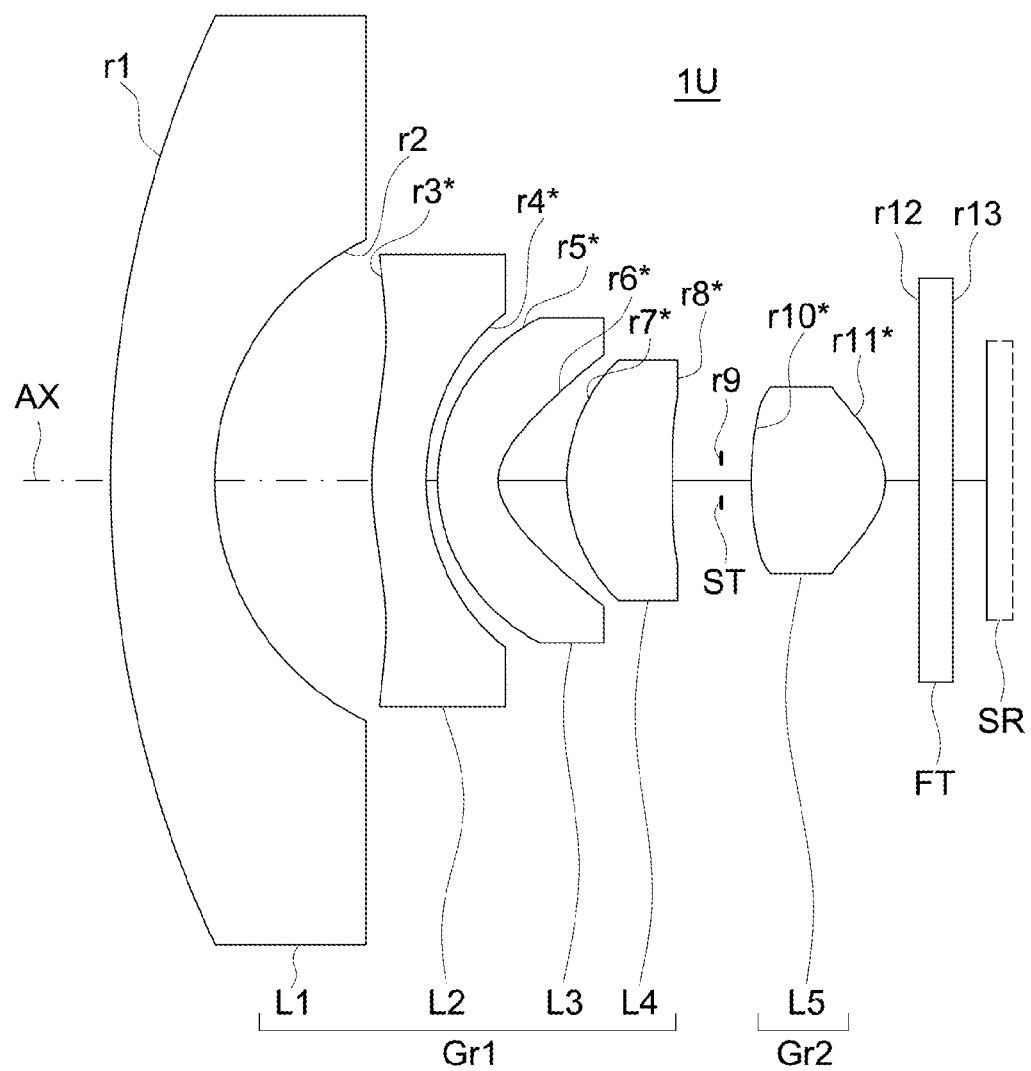

FIG. 45 is a sectional view showing an arrangement of lens groups in a wide-angle optical system of Example 21.

Figure 46:
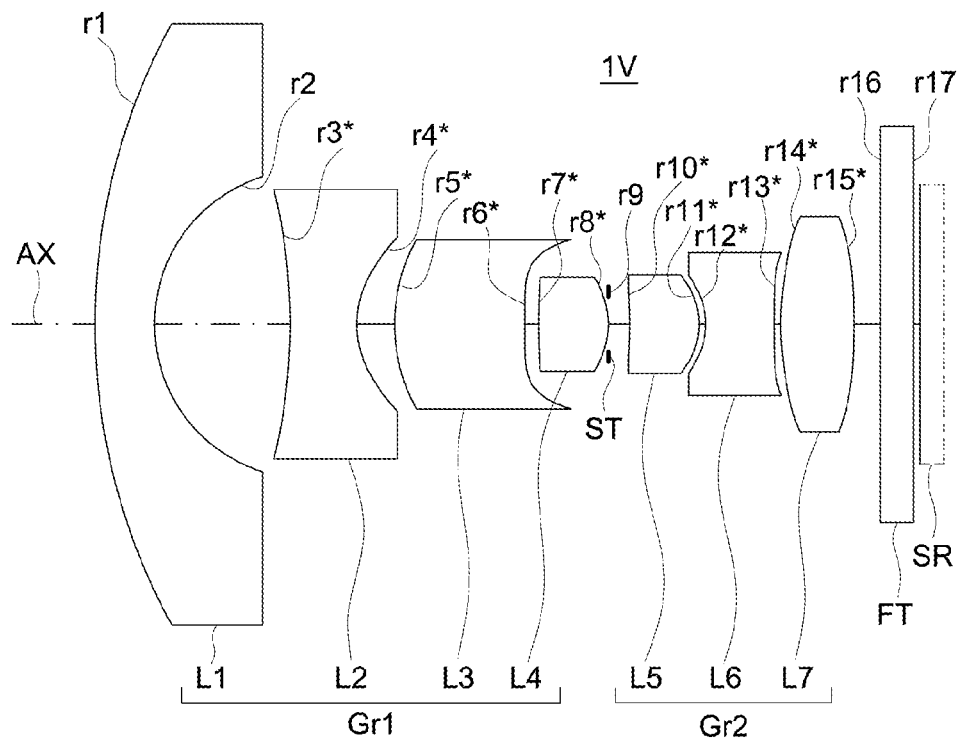

FIG. 46 is a sectional view showing an arrangement of lens groups in a wide-angle optical system of Example 22.

Figure 47:
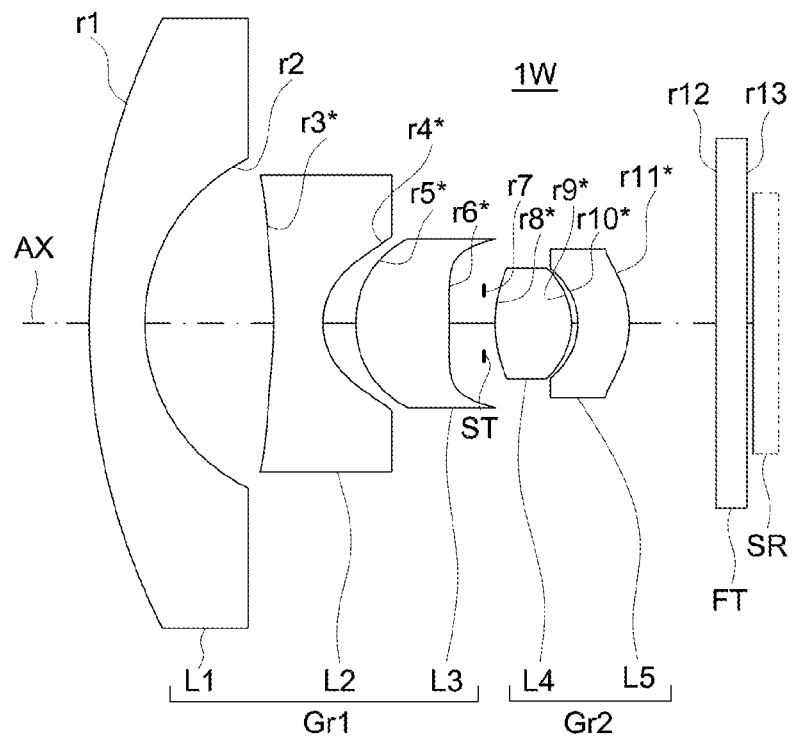

FIG. 47 is a sectional view showing an arrangement of lens groups in a wide-angle optical system of Example 23.

Figure 48A:
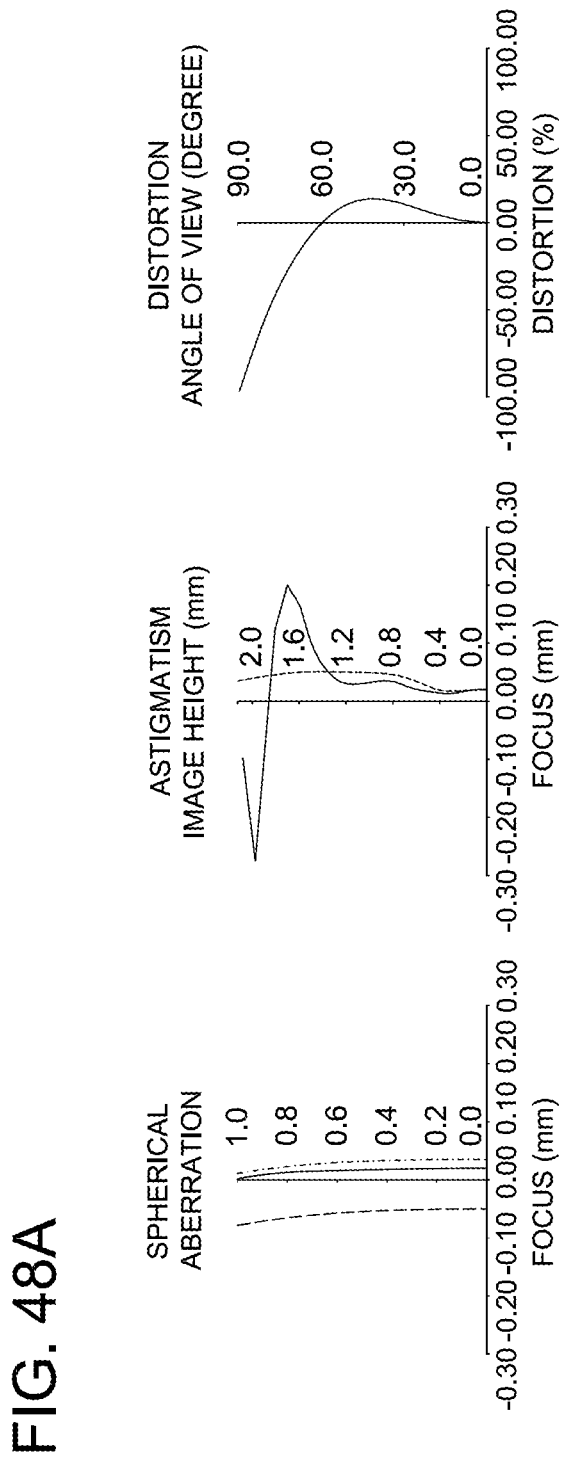

Each of FIGS. 48A and 48B is an aberration diagram of lens groups in a wide-angle optical system in Example 21.

Figure 49A:
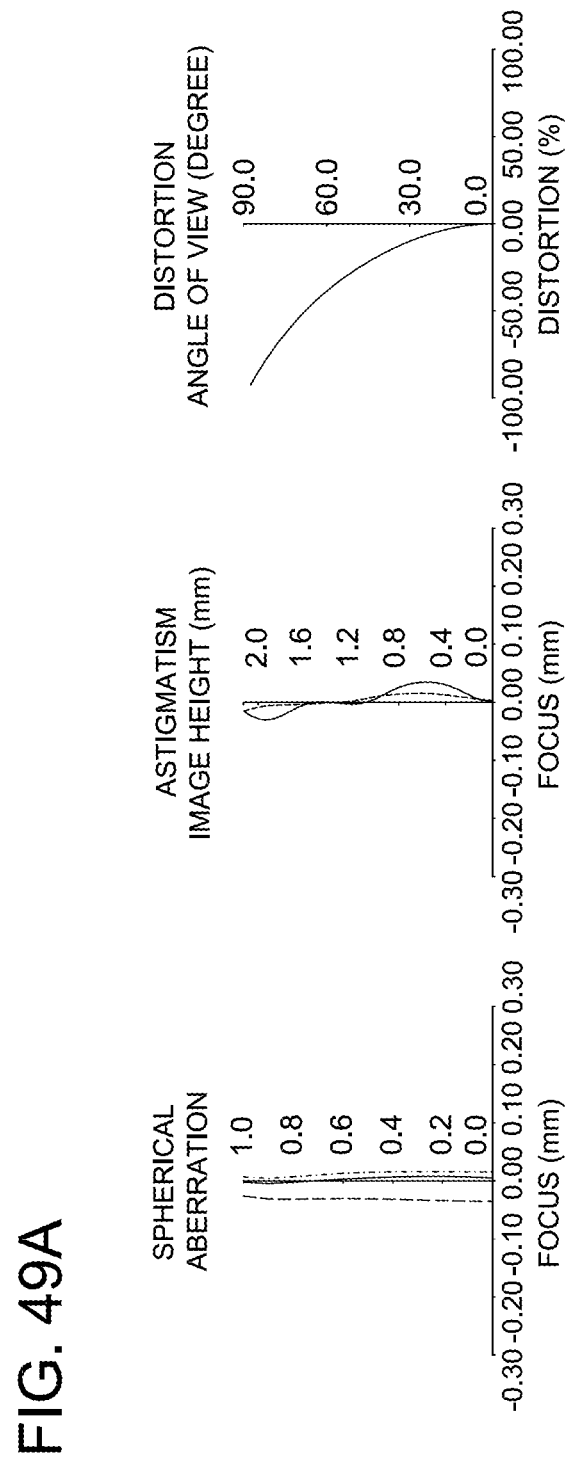

Each of FIGS. 49A and 49B is an aberration diagram of lens groups in a wide-angle optical system in Example 22.

Each of FIGS. 50A and 50B is an aberration diagram of lens groups in a wide-angle optical system in Example 23.

| REFERENCE SIGNS LIST | |
|---|---|
| AX: | Optical axis |
| 1, 1A-1T: | Wide-angle optical system |
| 3: | Digital apparatus |
| 5: | Cell-phone |
| 7: | Monitor camera |
| 9: | Vehicle |
| 11, Gr1: | Front lens group |
| 12, Gr2: | Rear lens group |
| 15, SR: | Image pickup element |
| 21: | Image pickup device |

BEST MODE FOR CARRYING OUT THE INVENTION

An embodiment relating to the present invention will be described as follows, referring to the drawings. Meanwhile, items each having the same sign in respective drawings are of the same items, and explanations for them are omitted accordingly.

Figure 1:
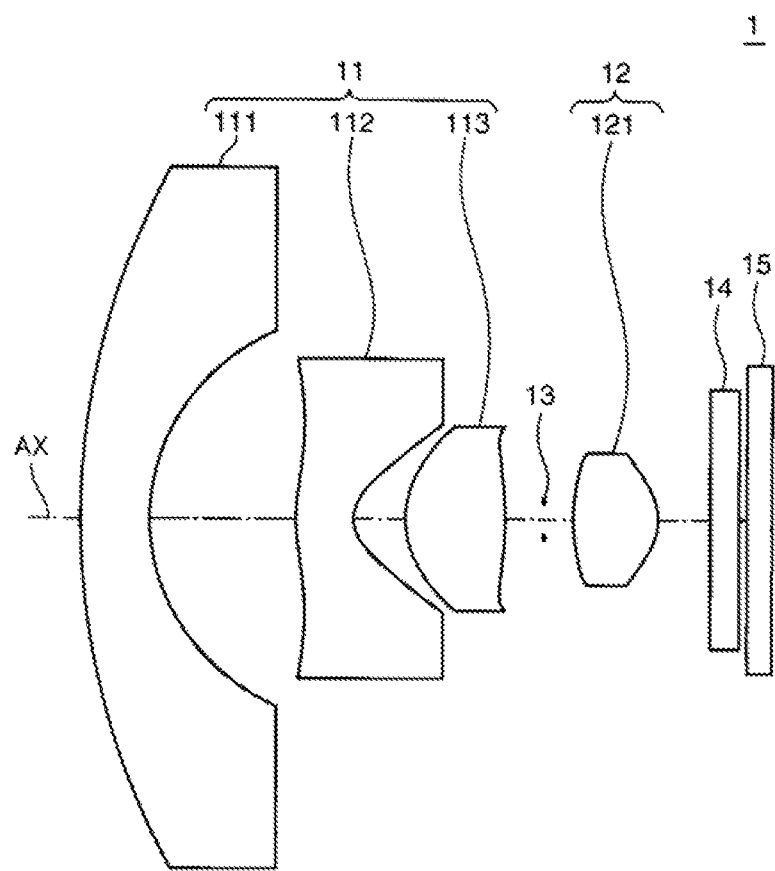
FIG. 1 is a sectional view of lenses for the explanation of a wide-angle optical system in an embodiment, showing the schematic structure.

FIG. 1 is a sectional view for the explanation of a wide-angle optical system in an embodiment, and shows a schematic structure.

Wide-angle optical system 1 in FIG. 1, is equipped favorably on an image pickup lens device whose structure capable of forming an optical image of an object (photographic object) on a predetermined image forming surface, for example, on a light-receiving surface (image plane) of image pickup element 15 that converts an optical image into electric signal. Wide-angle optical system 1 is composed of front lens group 11, rear lens group 12, and aperture stop 13 arranged between the front lens group and the rear lens group. Incidentally, the structure of wide-angle optical system 1 exemplified in FIG. 1 is the same as that of wide-angle optical system 1A (FIG. 5) in Example 1 which will be described later.

FIG. 1 shows an example structured as follows: the front lens group 11 arranged to be closer to the object side than the aperture stop 13, is composed of negative meniscus lens 111 whose convex surface faces the object side, negative meniscus lens 112 whose convex surface faces the object side and of biconvex positive lens 113; and the rear lens group 12 arranged to be closer to the image side than the aperture stop 13, is composed of biconvex positive lens 121. Namely, the wide-angle optical system shown in FIG. 1 includes negative meniscus lens 111, negative meniscus lens 112, positive lens 113, aperture stop 13 and positive lens 121, in order toward the image side from the object side. Each of the negative meniscus lens 112, the positive lens 113 and the positive lens 121 representing respectively the second, third and fourth lens which are defined by numbering in order from the object side, has opposing aspheric surfaces. Each of these negative meniscus lens 112, positive lens 113 and positive lens 121 is made of a resin material such as, for example, plastic.

In the wide-angle optical system 1 shown in FIG. 1 as stated above, front lens group 11 includes at least two negative lenses and at least one positive lens. At least one positive lens among a positive lens or positive lenses included in front lens group 11 has at least one aspheric surface.

Further, with respect to this wide-angle optical system 1, front lens group 11 satisfies the following conditional expression (1), where vdp represents a minimum value of the Abbe number, among the positive lens or positive lenses included in the front lens group 11.

$$vdp < 29 \tag{1}$$

In the wide-angle optical system 1 having the structure of this kind, off-axis aberrations at a wide angle of view can be corrected easily by arranging front lens group 11 and rear lens group 12 with aperture stop 13 interposed between these lens groups. Further, when a negative lens is arranged in front lens group 11, where two negative meniscus lenses 111 and 112 are arranged in the example shown in FIG. 1, the optical system becomes so called a retrofocus type (Inverted telephoto lens). Therefore, a sufficient back focal length can be secured even when the optical system copes with an wide angle or has a short focal length required to realize a super wide angle. Further, when an image is formed on an image pickup element 15, the incident angle of a ray entering an image plane can be brought to a telecentric condition. When at least one positive lens is arranged in the front lens group 11, where positive lens 113 is arranged in the example shown in FIG. 1, Petzval's sum can be controlled and astigmatism can be corrected easily. When at least one positive lens among a positive lens or positive lenses included in the front lens group 11 includes at least one aspheric surface, where two aspheric surfaces are included in the example shown in FIG. 1, spherical aberration, coma and astigmatism are improved greatly. When trying to obtain desired negative optical power with one negative lens, its curvature radius becomes small, which hinders easy manufacturing of the negative lens. However, when at least two negative lenses are arranged in the front lens group 11, where two negative meniscus lenses 111 and 112 are arranged in the example shown in FIG. 1, desired negative optical power is distributed to at least two negative lenses, which makes manufacturing of the negative lenses easy. As a result, productivity is improved, and its cost is reduced. Then, when a value of the conditional expression (1) exceeds the upper limit, correction of the magnification chromatic aberration becomes insufficient to cause deterioration of image quality caused by a decline of contrast. However, the decline of the contrast is improved when the front lens group 11 satisfies the conditional expression (1). Accordingly, wide-angle optical system 1 with such the structure has more excellent optical property, is manufactured at a reduced cost, and makes to be compact (downsized).

Further, from the viewpoint of correcting magnification chromatic aberration more effectively, it is more preferable that wide-angle optical system 1 satisfies the following conditional expression (1').

$$vdp < 25 \tag{1'}$$

In addition, on the image side of the wide-angle optical system 1, there are arranged filter 14 and image pickup element 15. The filter 14 is an optical element in a shape of parallel flat plate, and indicates various types of optical filters and a cover-glass of an image pickup element schematically. An arbitral optical filter such as a lowpass filter and an infrared blocking filter can be arranged, depending on its purpose, a type of image pickup element, and a camera construction. The image pickup element 15 is an element that photo-electrically converts an optical image of a photographic object formed by wide-angle optical system 1 into image signal with each of components of R (red), G (green) and B (blue), corresponding to the light amount in the optical image, and that outputs the signal to the predetermined image processing circuit (which is not shown). Owing to the foregoing, the optical image of a photographic object at the object side are guided to a light-receiving surface of image pickup element 15 by wide-angle optical system 1 along the optical axis AX, and the optical image of the photographic object is picked up by image pickup element 15.

In wide-angle optical system 1, a positive lens that satisfies the conditional expression (1) is a lens made of a resin material. It is therefore possible to achieve cost reduction of wide-angle optical system 1.

In wide-angle optical system 1, when the second lens is defined by numbering in order from the object side, the second lens is a lens which is made of a resin material and includes at least one aspheric surface. Namely, in the example shown in FIG. 1, negative meniscus lens 112 is a lens which is made of a resin material and includes opposing aspheric surfaces. Since the second lens numbering in the order from the object side includes at least one aspheric surface as stated above, distortion can be corrected effectively. Further, by forming the second lens with at least one aspheric surface out of a resin material, it is possible to obtain a low cost lens with relatively high property.

In wide-angle optical system 1, when the fourth lens is defined by numbering in order from the object side, the fourth lens is a lens which is made of a resin material and includes at least one aspheric surface. Namely, in the example shown in FIG. 1, positive lens 121 is a lens which is made of a resin material and includes opposing aspheric surfaces. Since the fourth lens numbering in the order from the object side includes at least one aspheric surface as stated above, spherical aberration, coma and astigmatism can be corrected effectively. Further, by forming the fourth lens with at least one aspheric surface out of a resin material, it is possible to obtain a low-cost lens with relatively high property.

In wide-angle optical system 1, when the negative second lens and the positive fourth lens are defined by numbering in order from the object side, each of the negative second lens and the positive fourth lens is a lens made of a resin material. Namely, in the example shown in FIG. 1, each of the negative meniscus lens 112 and the positive lens 121 is a lens made of a resin material. Therefore, even in the case where a range of temperatures to be used is relatively broad as in intended purposes like onboard application and monitoring application, it is possible to control fluctuations of back focal length corresponding to temperature changes.

In wide-angle optical system 1, front lens group 11 is composed of three lenses, and rear lens group 12 is composed of one lens, which enables aberration correction and downsizing and further enables cost reduction.

Alternatively, in wide-angle optical system 1, front lens group 11 is composed of three lenses, and rear lens group 12 is composed of three lenses. By constituting the front lens group with three lenses in total including two negative lenses and one positive lens, the following matters is available with the smallest number of lenses in a viewpoint of aberration correction: it is possible to distribute an increased negative power because of achieving a super-wide angle to two negative lenses, and further possible to satisfactory correct magnification chromatic aberration and astigmatism caused by the negative lenses with the positive lens. Furthermore, it is possible to achieve low cost because the number of lenses becomes small. By constituting the rear lens group with three lenses, it becomes possible to control sensitivity for decentration error and to improve productivity, in addition to excellent correction of spherical aberration and longitudinal chromatic aberration.

Alternatively, in wide-angle optical system 1, front lens group 11 is composed of four lenses, and rear lens group 12 is composed of two lenses. By constituting the front lens group with four lenses, it is possible to loosen a surface angle of negative lenses having a large outside diameter, and to improve productivity of the negative lenses, compared with a state that the front lens group is composed of three lenses. Further, by constituting the rear lens group with two lenses, spherical aberration and longitudinal chromatic aberration can be corrected successfully.

Alternatively, in wide-angle optical system 1, front lens group 11 is composed of three lenses, and rear lens group 12 is composed of two lenses. By constituting the front lens group with three lenses in total including two negative lenses and one positive lens, the following matters is available with the smallest number of lenses in a viewpoint of aberration correction: it is possible to distribute an increased negative power because of achieving a super-wide angle to two negative lenses, and further possible to satisfactory correct magnification chromatic aberration and astigmatism caused by the negative lenses with the positive lens. Furthermore, it is possible to achieve low cost because the number of lenses becomes small. By constituting the rear lens group with two lenses, spherical aberration and longitudinal chromatic aberration can by corrected successfully.

Alternatively, as for the wide-angle optical system 1, two negative meniscus lenses 111 and 112 whose convex surfaces face the object side and biconvex positive lens 113 are arranged in order from the object side in front lens group 11, and biconvex positive lens 121 is arranged in order from the object side in rear lens group 12. Therefore, optical power of each lens can be controlled and productivity of lenses is improved, while a wide angle of view or super wide angle of view is achieved. Further, by arranging two negative meniscus lenses 111 and 112 in the order from the object side, back focal length can be secured sufficiently, while optical power of each negative lens is controlled. Further, when two biconvex positive lenses 113 and 121 are arranged on the image side (image side of negative meniscus lens 112) with aperture stop 13 interposed between the biconvex positive lenses, the structure becomes symmetry about aperture stop 13, and distortion and astigmatism are corrected effectively.

In the wide-angle optical system 1, it is preferable that a positive lens satisfying the conditional expression (1) satisfies the following conditional expression (2), where Hp represents a height (distance from the optical axis) of a principal ray of a light flux corresponding to the maximum image height on the lens surface facing the object side in the aforesaid positive lens, and Rp represents a maximum effective radius of the lens surface facing the object side in the aforesaid positive lens.

$$|Hp|/Rp>0.65 \quad (2)$$

If a value of the conditional expression (2) becomes lower than the lower limit, correction of magnification chromatic aberration becomes insufficient, which is not preferable. However, since the positive lens satisfying the aforesaid conditional expression (1) also satisfies the conditional expression (2), it enables to correct the magnification chromatic aberration.

In the wide-angle optical system 1, it is preferable that a positive lens satisfying the conditional expression (1) also satisfies the following conditional expression (3), where Ndp represents a refractive index of the aforesaid positive lens.

$$Ndp>1.6 \quad (3)$$

If a value of the conditional expression (3) becomes lower than the lower limit, restriction of Petzval's sum becomes difficult and correction of astigmatism becomes to be insufficient, which are not preferable. However, since the positive lens satisfying the aforesaid conditional expression (1) also satisfies the conditional expression (3), it makes Petzval's sum small and enables to correct astigmatism.

In the wide-angle optical system 1, it is more preferable that a positive lens satisfying the conditional expression (1) also satisfies the following conditional expression (3').

$$Ndp>1.62 \quad (3')$$

When a positive lens satisfying the conditional expression (1) also satisfies the following conditional expression (3'), it becomes possible to correct astigmatism more effectively.

In the wide-angle optical system 1, it is preferable that a lens arranged at the closest position to the object is a negative lens which satisfies the following conditional expression (4), where vd1 represents the Abbe number of the lens arranged at the closest position to the object.

$$33<vd1<47 \quad (4)$$

In this construction, when a negative lens is arranged to be closest to the object side, the back focal length is secured, and telecentricity on the image plane becomes more excellent condition. If a value of the conditional expression exceeds the upper limit, or if the value becomes lower than the lower limit, it becomes difficult to correct magnification chromatic aberration, in both occasions, which is not preferable. However, since the lens arranged at the closest position to the object satisfies the conditional expression (4), it enables to correct magnification chromatic aberration.

In the wide-angle optical system 1, it is preferable that, when the first lens and the second lens are defined by numbering in order from the object side, the first lens and the second lens satisfy the conditional expression (5), where D12 represents a distance on the optical axis between the first lens and the second lens, and f represents a focal length of the total system of wide-angle optical system 1.

$$2.1<D12/f<5.3 \quad (5)$$

If a value of the conditional expression (5) exceeds the upper limit, an outside diameter of the first lens, namely, negative meniscus lens 111 in the example shown in FIG. 1, becomes too large, and the wide-angle optical system becomes hard to be downsized, which is not preferable. Further, if the value becomes lower than the lower limit of the conditional expression (5), it becomes difficult to strengthen optical power of the image-side surface of the first lens and of the object-side surface of the second lens, namely, negative meniscus lens 112 in the example shown in FIG. 1. As a result, the curvature of the image-side surface of the second lens becomes extremely large, which is not preferable. In addition, composite optical power of the first lens and the second lens becomes too strong, and correcting distortion becomes difficult, which is not preferable. However, since the first lens and the second lens which are defined by numbering from the object side satisfy the conditional expression (5), it enables downsizing and correction of distortion.

Further, in the wide-angle optical system 1, it is preferable that the first lens and the second lens which are defined by numbering in order from the object side, satisfy the conditional expression (5').

$$2.5<D12/f<4.5 \quad (5')$$

If a value of the conditional expression (5') exceeds the upper limit, composite optical power of the first lens and the second lens is weakened, thus, telecentricity on the image plane is worsened. Further, if the value becomes lower than the lower limit of the conditional expression (5'), interference between edge portions of the first lens and the second lens tends to be caused, thus, avoiding this interference makes a lens shape or a lens barrel shape to be complicated.

In the wide-angle optical system 1, it is preferable that the second lens and the third lens which are defined by numbering in order from the object side, satisfy the following conditional expression (6), where D23 represents a distance on the optical axis between the second lens and the third lens, and f represents a focal length of the total system of the wide-angle optical system 1.

$$1<D23/f<2.2 \quad (6)$$

If a value of the conditional expression (6) exceeds the upper limit, the total optical length of wide-angle optical system 1 and an outside diameter of the front lens are greatly increased, which makes downsizing of wide-angle optical system 1 difficult. If a value of the conditional expression (6) becomes lower than the lower limit, interference between edge portions of the second lens and the third lens, namely, between negative meniscus lens 112 and positive lens 113 in the example shown in FIG. 1, tends to be caused, thus, avoiding this interference makes a lens shape or a lens barrel shape to be complicated, which is not preferable. However, since the second lens and the third lens which are defined by numbering in order from the object side satisfy the conditional expression (6), it enables downsizing of the wide-angle optical system and enables to avoid a lens shape or lens frame shape from being complicated.

In the wide-angle optical system 1, it is preferable that the third lens and the fourth lens which are defined by numbering in order from the object side, and the third lens and fourth lens satisfy the following conditional expression (7), where D34 represents a distance on the optical axis between the third lens and the fourth lens, and f represents a focal length of the total system of the wide-angle optical system 1.

$$1.1<D34/f<1.77 \quad (7)$$

If a value of the conditional expression (7) exceeds the upper limit, composite optical power of the third lens and the fourth lens, namely, of the positive lens 113 and positive lens 121 in the example shown in FIG. 1, is weakened, and correction of distortion and securing of telecentricity on the image plane become difficult accordingly, which is not preferable. If a value of the conditional expression (7) becomes lower than the lower limit, an error sensitivity of a coaxial system of the third lens and fourth lens and a decentration system rises and cost is increased, which is not preferable. In addition, because an off-axis ray passes low positions at the third lens and fourth lens, magnification chromatic aberration, astigmatism, coma and distortion are insufficiently corrected, which is not preferable. However, since the third lens and the fourth lens which are defined by numbering in order from the object side, satisfy the conditional expression (7), it enables correction of distortion and securing of telecentricity on the image plane, thus, avoids the cost from increasing, and further enables to correct magnification chromatic aberration, astigmatism, coma and distortion.

In the wide-angle optical system 1, it is preferable that a negative meniscus lens whose convex surface faces the object side, a negative lens, a biconvex lens, an aperture stop, a biconvex lens, a negative meniscus lens whose convex surface faces the image side, and a biconvex lens are arranged in this order from the object side. By employing this structure, it is possible to control respective lens powers, and to improve productivity of lenses while a super-wide angle of view is attained. In particular, by arranging two negative lenses at a closer position to the object, it is possible to secure a sufficient back focal length under the condition that power of each negative lens is controlled. Further, by arranging two biconvex lenses and a negative meniscus lens on the image side of the two negative lenses, with a stop interposed among them, symmetric property concerning the stop in the total lens system is greatly improved, which enhances correction effects of distortion and astigmatism.

In the wide-angle optical system 1, it is preferable that a negative meniscus lens whose convex surface faces the object side, a negative lens, a biconvex lens, a positive lens, an aperture stop, a positive lens, and a negative meniscus lens whose convex surface faces the image side, are arranged in this order from the object side. By employing this structure, it is possible to control respective lens powers, and to improve productivity of lenses while a super-wide angle of view is attained. In particular, by arranging two negative lenses at a closer position to the object, it is possible to secure a sufficient back focal length under the condition than power of each negative lens is controlled. Further, by arranging three positive lenses and a negative meniscus lens on the image side, with a stop interposed among them, symmetric property concerning the stop in the total lens system is greatly improved, which enhances correction effects of distortion and astigmatism. By dividing the positive lens arranged closer to the object than the stop, into two lenses, it is possible to control occurrence of not only astigmatism and magnification chromatic aberration but also spherical aberration and longitudinal chromatic aberration, which achieves higher image quality.

In the wide-angle optical system 1, it is preferable that a negative meniscus lens whose convex surface faces the object side, a negative lens, a positive lens, an aperture stop, a biconvex lens, and a negative meniscus lens whose convex surface faces the image side, are arranged in this order from the object side. By employing this structure, it is possible to control powers of respective lenses and to improve productivity of lenses, while super-wide angle of view is achieved. In particular, by arranging two negative lenses at a closest position to the object, it is possible to secure a sufficient back focal length under the condition that power of each negative lens is controlled. Further, by arranging three positive lenses and a negative meniscus lens on the image side of the two negative lenses, with a stop interposed among them, symmetric property concerning the stop is greatly improved, which enhances correction effects of distortion and astigmatism. By dividing a positive lens arranged at the closer position to the object side than the stop, into two lenses, it is possible to control occurrence of not only astigmatism and magnification chromatic aberration but also spherical aberration and longitudinal chromatic aberration, which achieves higher image quality.

In the wide-angle optical system 1, it is preferable that a lens arranged at the closest position to the object is made of glass. When the lens closest to the object side, namely a negative meniscus lens 111 in the example shown in FIG. 1 is composed of a glass lens as state above, the lens is high in strength, and its anti-scratch property can be improved, even when, for example, a lens protective member is not arranged in front of wide-angle optical system 1 and the lens closest to the object side is exposed. Therefore, occurrence of flare caused by a scratch can be reduced, and deterioration of the image pickup efficiency can be controlled.

Further, it is preferable that such the positive glass lens arranged at the closest position to the object side satisfies the following conditional expression (8), where DA1 represents a value of acid resistance which is obtained by putting powder of a glass material of the lens arranged at the closest position into nitric acid solution with a concentration of 0.01 mol/l, heating the nitric acid solution in a boiling bath, and measuring a reduced mass (%) of the power of the glass material as the value representing acid-resistance.

$$DA1<0.35 \tag{8}$$

Considering the situation that the lens arranged at the closest position to the object side is exposed to an outside environment as the lens is bare, if a value of the conditional expression (8) exceeds the upper limit, chemical reaction such as so-called the tarnish is caused in lenses under the situation and the optical property of wide-angle optical system 1 is deteriorated, which is not preferable. However, since the lens arranged the closest position to the object satisfies the conditional expression (8), it is possible to control the deterioration of the optical property. In this case, this numerical value and its measurement methods are based on the description of the optical glass catalog of HOYA CORPORATION or on the description of the optical glass catalog of SUMITA Optical glass, Inc.

The wide-angle optical system 1 preferably satisfies the following conditional expression (9) for a principal ray of a light flux with a half angle of view of 90 degrees, where Yr represents a position (distance from the optical axis) of a principal ray on the image plane, and f represents a focal length of the total system of the wide-angle optical system 1.

$$-0.3 \le (Yr/2f)-1<0.7 \tag{9}$$

If a value of the conditional expression (9) exceeds the upper limit, off-axis aberrations, in particular, astigmatism and magnification chromatic aberration become difficult to be corrected, which is not preferable. Further, if a value of the conditional expression (9) becomes lower than the lower limit, a compressibility of a peripheral image becomes too high to cause a lack of an information amount on the peripheral portion. As a result, resolution on the peripheral portion deteriorates even after the image is corrected with image processing, which is not preferable. However, since the conditional expression (9) is satisfied for a principal ray of a light flux with a half angle of view of 90 degrees, off-axis aberrations can be corrected, and it is possible to control the lack of an information amount of the peripheral portion.

The wide-angle optical system 1 more preferably satisfies the following conditional expression (9') for the principal ray of the light flux with a half angle of view of 90 degrees.

$$-0.2<(Yr/2f)-1<0.6 \tag{9'}$$

If a value of the conditional expression (9') exceeds the upper limit, the number of lenses needs to be increased for correction of off-axis aberrations, thus, the total optical length increases, resulting in cost increase. If a value of the conditional expression (9) becomes lower than the lower limit, it causes the lack of an information amount on the peripheral portion, and a merit of monitoring (surveillance) over a wide angle of view is lost.

The wide-angle optical system 1 preferably satisfies the following conditional expression (10), where Y' represents a maximum image height, and TL represents a distance on the optical axis from a surface vertex on the lens surface arranged at the closest position to the object, to the image plane (where the back focal length measured in an air conversion length).

$$Y'/TL>0.1 \tag{10}$$

If a value of the conditional expression (10) becomes lower than the lower limit, the total optical length of the wide-angle optical system 1 unwillingly increases to make downsizing of the wide-angle optical system 1 difficult, which is not preferable. However, since the wide-angle optical system satisfies the conditional expression (10), it enables the wide-angle optical system to be compact.

The wide-angle optical system 1 more preferably satisfies the following conditional expression (10').

$$Y'/TL>0.12 \tag{10'}$$

If a value of the conditional expression (10') becomes lower than the lower limit, an outside diameter of the front lens unwillingly increases to make downsizing of the wide-angle optical system 1 difficult.

The wide-angle optical system 1 preferably satisfies the following conditional expression (11), where Ep represents a position (distance from the image plane) of an exit pupil for a principal ray corresponding to the maximum image height, and Lb represents a back focal length (measured in air conversion length).

$$|Ep|/Lb>2.2 \tag{11}$$

If a value of the conditional expression (11) becomes lower than the lower limit, a decline in illuminance on the periphery is hardly controlled, even when a lens array is arranged at the front of the image pickup surface. However, since the wide-angle optical system satisfies the conditional expression (11), the decline in illuminance on the periphery can be controlled.

Further, the wide-angle optical system 1 more preferably satisfies the following conditional expression (11').

$$|Ep|/Lb>2.6 \tag{11'}$$

If a value of the conditional expression (11') becomes lower than the lower limit, the deterioration in illuminance on the periphery caused by shading becomes conspicuous, and an amount of information is reduced on the periphery of an image.

In the wide-angle optical system 1, it is preferable that all the lens surfaces exposed to the air excluding the lens arranged at the closest position to the object, are aspheric surfaces. Employing such the structure enables to realize both of downsizing and high image quality of the wide-angle optical system 1.

The wide-angle optical system 1 preferably includes a means controlling transmission of an ultraviolet ray, arranged on an optical surface at a closer position to the object than the positive lens satisfying the conditional expression (1) or on an object-side surface of the positive lens. Considering that transmittance for wavelengths which are shorter than the visible wavelength range, is lowered because of destruction of resin structure resulted from irradiation of an ultraviolet ray, employing such the structure prevents the lowering of the transmittance and the color reproducibility of an image can be kept to be excellent In the wide-angle optical system 1, a glass lens having an aspheric surface may also be a molded glass lens with an aspheric surface, a grinded glass lens with an aspheric surface, or a complex aspheric lens (a lens such that a resin material is formed into an aspheric surface on a spherical glass lens). The molded glass lens with an aspheric surface is preferable because it is suitable for mass production, and the complex aspheric lens provides increased latitude of design because there are various types of glass materials which are available for the substrates. In particular, as for an aspheric lens formed of a material with a high refractive index, a complex type aspheric lens is preferable because the molding process for the material is not easy. Further, a lens with a single aspheric surface can use the maximum advantage of the complex type aspheric lens.

In wide-angle optical system 1, it is preferable that a lens at the closest position to the object, satisfies any one of the following conditional expressions (12) and (13), or satisfies both of them, where Hk1 represents Knoop hardness, and DS1 is a value obtained as follows. There is prepared a glass member which is 43.7 mm in diameter (30 cm² in the area of the opposing surfaces), and is 5 mm in thickness. The opposing surfaces of the glass member are polished. There is further prepared solution of pentasodium triphosphate ($Na_5P_3O_{10}$) which is 0.01 mol/l in concentration, is 50° C. in temperature, and is stirred up sufficiently. The optical member is dipped in the solution for one hour, and a reduced mass (mg/(cm²·h)) of the dipped glass member per unit area is measured as the value of DS1.

$$Hk1 > 350 \tag{12}$$

$$DS1 \le 0.01 \tag{13}$$

A glass material that satisfies at least one of the conditional expressions (12) and (13) is excellent on the points of hardiness, chemical proof and water proof property. Since the lens arranged at the closest position to the object is formed of such the glass material, it is excellent on the points of hardiness, chemical proof and on water proof property, even when, for example, a lens protective member is not arranged in front of the wide-angle optical system 1 and the lens closest to the object side is exposed. It controls the deterioration of the image pickup property, which is preferable. In particular, the forefront surface is exposed in many optical systems for the onboard application, and the glass material is suitable to such the application.

In the wide-angle optical system 1, it is preferable that the resin lens which is the positive lens satisfying the conditional expression (1) is formed of a material such that particles with the maximum size of 30 nanometers or less are dispersed in a resin material.

In the wide-angle optical system 1, it is preferable that a lens made of resin material, for example, the second lens and the fourth lens which is defined by numbering in order from the object side, in the example shown in FIG. 1, are formed of the material such that particles with the maximum size of 30 nanometers or less are dispersed in a resin material.

In general, when particles are mixed with transparent resin material, light scatters and transmittance is lowered in the material. Therefore, it has been difficult to use the resin material as an optical material. However, by making a size of the particles smaller than a wavelength of the transmitted light flux, the resin material can be prepared so as not to cause the scattering substantially.

A refractive index change due to temperature change will be descried as follows. A change in refractive index due to a temperature change n(T) is represented by the expression (14), which is based on the Lorentz-Lorenz equation and is obtained by differentiating the refractive index n by temperature T.

$$n(T) = ((n2+2) \times (n2-1))/6n \times (-3\alpha + (1/[R]) \times (\partial[R]/\partial T)) \tag{14}$$

In the aforesaid expression, α represents a linear expansion coefficient, and [R] represents a molecular refraction.

With respect to a resin material, the second term in the expression (14) makes a smaller contribution to the dependence of refractive index on temperature than the first term in the expression (14), which is almost negligible. For example, as for a PMMA resin, linear expansion coefficient α is $7 \times 10^{-5}$. When it is substituted in the expression (14), $n(T) = -1.2 \times 10^{-4}$ (1° C.) is obtained, which agrees with an actual measurement.

A resin material has a refractive index which is lowered when a temperature raises, but inorganic particles has a refractive index which is raised when a temperature rises. Therefore, when these dependence properties on the temperature is used such that the dependence properties on temperature are acted to be cancelled mutually, a resin material which does not cause the refractive index change substantially, can be prepared. For example, by dispersing inorganic particles with the maximum size of 30 nanometers or less into a resin material as a base material, a material with extremely low dependency of refractive index on temperature change can be prepared. For example, by dispersing microparticles of niobium oxide ($Nb_2O_5$) into acrylic resin, a material with low dependency of refractive index on temperature change can be prepared. According to the above structure, when such the resin material in which inorganic particles are dispersed is employed to the resin lens which is the positive lens satisfying the conditional expression (1), or to resin lenses among lenses excluding the positive lens satisfying the conditional expression (1), a shift of back focal length caused by change of environmental temperature in the present wide-angle optical system, can be controlled to be small.

From the viewpoint to control the shift of back focal length caused by the environmental temperature change in the wide-angle optical system 1 to be small, the change of refractive index due to temperature n(T) is preferable to be less than $8 \times 10^{-5}$(/° C.) in the absolute value, and is more preferable to be less than $6 \times 10^{-5}$(/° C.) in the absolute value. When the change of refractive index due to temperature n(T) is less than $6 \times 10^{-5}$(/° C.) in the absolute value, a shift amount of back focal length caused by the environmental temperature change in the wide-angle optical system 1 is controlled to be about a half.

Therefore, as such the resin material, polyolefin-based resin materials and polycarbonate-based resin materials are preferable. In polyolefin-based resin materials, the change of refractive index due to temperature n(T) becomes about $-11 \times 10^{-5}$(/° C.). In polycarbonate-based resin materials, the change of refractive index due to temperature n(T) becomes about $-14 \times 10^{-5}$(/° C.).

<Digital Apparatus Equipped with a Wide-Angle Optical System>

Next, a digital apparatus equipped with the aforesaid wide-angle optical system 1 will be explained.

Figure 2:
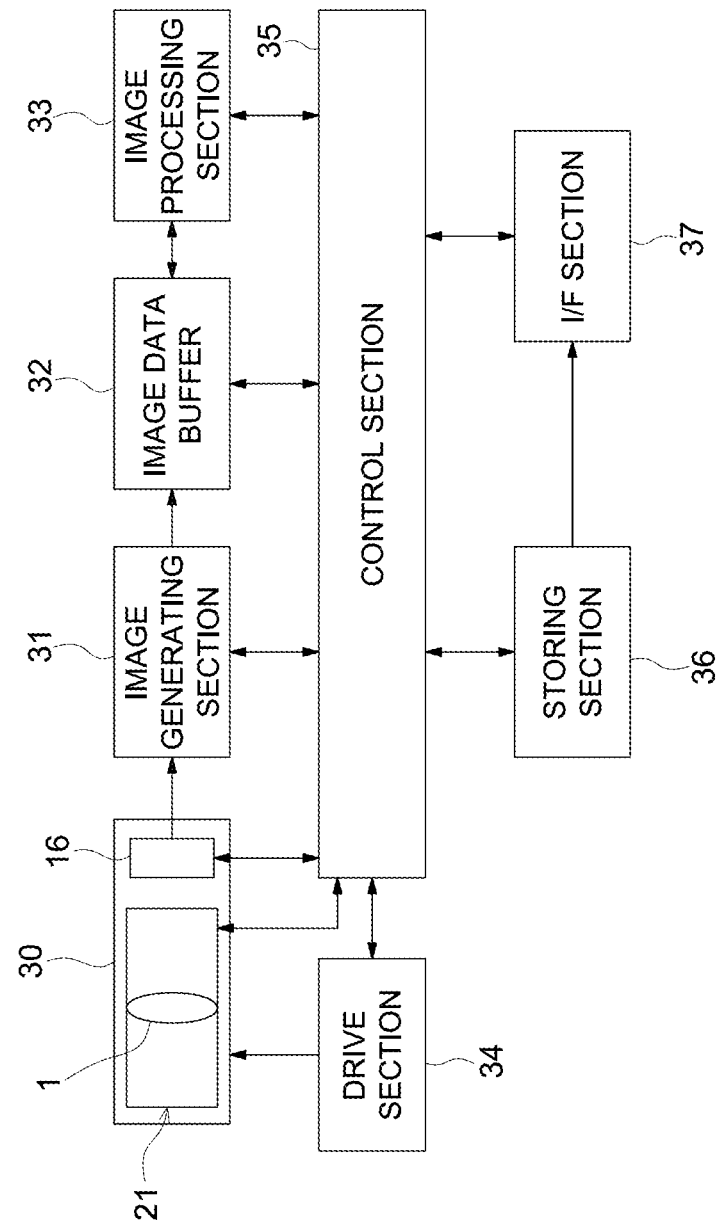
FIG. 2 is a block diagram showing the structure of a digital apparatus in an embodiment.

FIG. 2 is a block diagram showing a structure of a digital apparatus in the present embodiment. In FIG. 2, digital apparatus 3 is composed of image pickup section 30, image generating section 31, image data buffer 32, image processing section 33, drive section 34, control section 35, storing section 36 and of I/F section 37, for the image pickup functions. As the digital apparatus 3, there are given, for example, a digital still camera; a digital video camera; a monitor camera for a surveillance and onboard purposes; a mobile terminal such as a cell-phone and a mobile information terminal (PDA), a personal computer, and a mobile computer, which may include peripheral devices of these apparatuses (for example, a mouse, a scanner and a printer).

Image pickup section 30 is composed of image pickup device 21 and image pickup element 16. The image pickup device 21 is equipped with wide-angle optical system 1 shown in FIG. 1, and is further equipped with an image pickup lens device which is not illustrated and has a structure capable of forming an optical image of the photographic object on image pickup element 16 in the example shown in FIG. 2. Further, the image pickup device 21 is equipped with a lens drive device which is not illustrated and is adopted to drive a lens in the optical axis direction for focusing. The wide-angle optical system 1 forms an image on a light-receiving surface of the image pickup element 16 with a ray from the photographic object, and the ray becomes an optical image of the photographic object.

Image pickup element 16 is an element which converts the optical image of the photographic object guided by the image pickup lens device of the image pickup device 21 into electric signal. As described above, the image pickup element 16 converts the optical image of the photographic object formed by the wide-angle optical system 1 into electric signal (image signal) with each of color components of R, G, and B, and outputs the resulting signal to image generating section 31 as image signal of each of colors of R, G, and B. The image pickup element 16 is controlled by control section 35 in terms of image pickup operations such as shooting of a static image or video, and reading (horizontal synchronizing, vertical synchronizing, and transmission) of output signal of each pixel in image pickup element 16. The image pickup element 16 can be a solid-state image pickup element such as CCD and CMOS, and can be a color image pickup element or a monochrome image pickup element.

Image generating section 31 applies an amplification and a digital conversion processing to analog output signal from image pickup element 16, and further applies well-known image processing such as a definition of proper black level, γ correction, white balance adjustment (WB adjustment), outline correction, and color shading correction, for the whole area of the image, to generate image data of respective pixels from the image signal. The image data generated by image generating section 31 is outputted to image data buffer 32.

Image data buffer 32 is a memory that is used as a working area on which image data temporarily is stored and a processing which will be described later is applied to the image data, and is structured by RAM (Random Access Memory) representing a volatile storing element, for example.

Image processing section 33 is a circuit that performs image processing such as resolution conversion for the image data in image data buffer 32. The image processing section 33 may also be constructed, as occasion demands, to correct aberrations that has not been corrected sufficiently by wide-angle optical system 1 with well-known distortion correction processing that corrects distortion in an optical image of the photographic object which is formed on a light-receiving surface of image pickup element 16. The distortion correction makes it possible to correct the image that is deformed by aberrations, for example, distortion, into a distortion-free image which is natural and is in a similar figure that is the same as that in the scene viewed by the naked eye.

Drive section 34 is a circuit to drive the lens drive device which is not illustrated, based on controlling signal outputted from control section 35, to perform a focusing of wide-angle optical system.

Control section 35 is composed of, for example, a microprocessor, a storing element and their peripheral circuits. The control section 35 controls operations of respective sections including image pickup section 30, image generating section 31, image data buffer 32, image processing section 33, drive section 34, storing section 36 and I/F section 37, depending on their functions. Namely, the control section 35 controls image pickup device 21 to shoot at least one of a static image of the photographic object or a movie the photographic object.

Storing section 36 is a storing circuit that stores image data generated through shooting static image or movie of the photographic object, and it is composed, for example, of ROM (Read Only Memory) representing a nonvolatile storing element, EEPROM (Electrically Erasable Programmable Read Only Memory) representing nonvolatile storing element capable of rewriting, and RAM. In short, the storing section 36 has functions as a memory for a static image and a movie.

I/F section 37 is an interface that transmits and receives image data with outer equipment and for example, it is an interface that is in conformity to standards such as USB and IEEE1294.

Image pickup operations of digital apparatus 3 having such the structure will be described as follows.

When a static image is shot, control section 35 controls to make image pickup device 21 shoot a static image. The control section 35 further drives the image drive device, which is not illustrated, in the image pickup device 21 through drive section 34, to perform the focusing operation. Thereby, optical images on which the focus is adjusted are periodically and repeatedly formed on a light-receiving surface of image pickup element 16, and are converted into image signal with each of color components of R, G, and B, then, the image signal is outputted to image generating section 31. The image signal is stored in image data buffer 32 temporally, and image processing section 33 applies image processing to the image signal, then, an image based on the image signal is displayed on a display (display device) which is not illustrated. Then, a cameraman can adjust the main photographic object to be placed at the desired position in an image area by viewing the display. When a shutter button is pushed under this state, the image data is stored in storing section 36 as a memory for a static image, and a static image is obtained.

When a movie is shot, controller 35 controls image pickup device 21 to shoot a movie. After the similar processing to the static image, the cameraman can adjust the main photographic object to be placed at the desired position in the image area by viewing the display. When a shutter button is pushed under this state, similarly to the static image, the shooting operation of a movie starts.

When a move is shot, control section 35 controls to make image pickup device 21 shoot a movie. The control section 35 further drives the image drive device in the image pickup device 21 through drive section 34, to perform the focusing operation. Thereby, optical images on which the focus is adjusted are periodically and repeatedly formed on a light-receiving surface of image pickup element 16, and are converted into image signal with each of color components of R, G, and B, then, the image signal is outputted to image generating section 31. The image signal is stored in image data buffer 32 temporally, and image processing section 33 applies image processing to the image signal, then, the image based on the image signal is displayed on a display which is not illustrated. When a shutter button is pushed again, the shooting of the movie ends. The movie which has been shot is led to storing section 36 to be stored.

Such the digital apparatus 3 and image pickup device 21 (the above image pickup lens device) employ wide-angle optical system 1 having an optical property which is more excellent than that of the prior arts despite of its compactness. Therefore, the digital apparatus 3 and image pickup device 21 can employ image pickup element 16 with a large number of pixels while downsizing of the digital apparatus 3 and image pickup device 21 is achieved.

Next, as a concrete example of the wide-angle optical system 1, image pickup device 21 built in a mobile cell-phone and image pickup device 21 built in an onboard monitor camera will be described below.

Each of FIGS. 3A and 3B is an external block diagram of a cell-phone equipped with a camera showing an embodiment of a digital apparatus. FIG. 3A shows an operation surface of the cell-phone, and FIG. 3B shows the opposite side of the operation surface that is a back side.

In FIGS. 3A and 3B, antenna 51 is equipped on an upper part of cell-phone 5. On its operation surface, there are provided, as shown in FIG. 3A, rectangular display 52; image shooting button 53 that starts a mode of image shooting and switches shooting of a static image and shooting of a movie; shutter button 55; and dial button 56. In this cell-phone 5, a circuit that realizes telephone functions through a cell-phone network is incorporated. There are further equipped the image pickup section 30, image generating section 31, image data buffer 32, image processing section 33, drive section 34, control section 35, and storing section 36, in the cell-phone 5. The image pickup device 21 in the image pickup section 30 is placed on its back surface.

When the image shooting button 53 is operated, control signal indicating the operation contents are outputted to control section 35, and the control section 35 carries out operations depending on the contents of the operation. Then, when shutter button 55 is operated, the control signal indicating the contents of the operation are outputted to control section 35, thus, the control section 35 carries out operations based on the contents of the operation. In this way, a static image or movie is shot.

Further, wide-angle optical system 1 relating to the present embodiment is attached on the prescribed position, to be preferably built in a monitor camera which takes an image of a photographic object within a prescribed area surrounding the position where the wide-angle optical system is attached, for example, an onboard monitor camera which takes an image within an area surrounding a vehicle.

FIG. 4 is a diagram for explaining an outline of an onboard monitor camera showing an embodiment of a digital apparatus. In FIG. 4, onboard monitor camera 7 is arranged at a predetermined position at a rear portion of vehicle 9 so as to take an image at a rear portion of vehicle 9, for example. The image of a photographic object which has been taken is displayed on a monitor which is not illustrated and is placed on a dash-board, for example. Onboard monitor camera 7 is attached on vehicle 9 in a posture to be inclined downward obliquely so that its optical axis AX may point downward obliquely, because a field of view upward vehicle 9 is not generally requested. Then, in the vertical direction, the onboard monitor camera 7 has an angle of view 2ϕ whose upper end is a horizontal line passing through a position where monitor camera 7 is attached. In the present description, an angle of view in the horizontal direction is also 2ϕ in the same way as in the vertical direction, but the invention is not limited to this, and an angle of view in the vertical direction may be different from that in the horizontal direction.

A flow of the processing in the case where onboard camera 7 having the aforesaid structure is used as a rear-view monitor, will be explained as follows as an outline. A user (driver) reverses vehicle 7 while observing a monitor (display device), which is not illustrated, installed on a dash board of vehicle 9, for example. When an area where the driver desires to observe is displaced from an area taken by onboard camera 7, the driver conducts prescribed operations such as operations of buttons provided on a dash board, which is not illustrated.

Receiving the operations, control section 35 controls drive section 34 and adjusts a direction of image pickup section 30. After that, control section 35 drives the aforesaid lens drive device of the image pickup device 21, to adjust the focus of wide-angle optical system 1. Owing to this, an optical image on which the focus is adjusted is formed on a light-receiving surface of image pickup element 16, and is converted in image signal with each of color components of R, G, and B, then, the image signal is outputted to image generating section 31. The image signal is stored temporarily in image data buffer 32, and image processing is applied by image processing section 33. Accordingly, an image which is almost natural and is placed within an area where the driver desires to observe, is displayed on the monitor installed on the dash board.

As stated above, according to the present invention, when the front lens group is arranged at a closer position to the object than the aperture stop, and the rear lens group is arranged at a closer position to the image than the aperture stop, which enables to correct off-axis aberrations over the wide angle of view easily. Further, when a negative lens is arranged in the front lens group, the optical system becomes so called a retrofocus type (Inverted telephoto lens), it allows the optical system to secure a sufficient back focal length even when the optical system copes with an wide angle or has a short focal length required to realize a super wide angle. Further, when the optical system forms an image on an image pickup element such as a CCD, the incident angle of a ray entering an image plane can be brought to a telecentric condition. When at least one positive lens is arranged in the front lens group, Petzval's sum can be controlled and astigmatism can be corrected easily. Further, when at least one positive lens among a positive lens or positive lenses included in the front lens group includes at least one aspheric surface, spherical aberration, coma and astigmatism are improved greatly. When trying to obtain desired negative optical power with one negative lens, its curvature radius becomes small, which hinders easy manufacturing of the negative lens. However, when at least two negative lenses are arranged in the front lens group, desired negative optical power is distributed to at least two negative lenses, resulting in improved productivity, which enables a cost reduction. Then, if the value of the conditional expression (1) exceeds the upper limit, correction of the magnification chromatic aberration becomes insufficient to cause deterioration of image quality caused by a decline of contrast. However, the decline of the contrast is improved since the front lens group satisfies the conditional expression (1). Therefore, the wide-angle optical system having such the structure can provide a wide-angle optical system that has more excellent optical efficiency and is made to be compact (downsized), an image pickup lens device, a monitor camera and a digital apparatus.

<Description of Specific Embodiment of Wide-Angle Optical System>

Specific constructions of wide-angle optical system 1 shown in FIG. 1, namely, of wide-angle optical system 1 equipped on image pickup device 21 to be built in digital apparatus 3 shown in FIG. 2 will be explained as follows, referring to drawings.

EXAMPLES

Example 1

FIG. 5 is a sectional view showing an arrangement of lens groups in wide-angle optical system of Example 1. Each of FIGS. 25A and 25B is an aberration diagram of lens groups in wide-angle optical system in Example 1.

Wide-angle optical system 1A of Example 1 has a two-component structure of positive-positive components, which includes, as shown in FIG. 5, front lens group (Gr1) having a positive optical power as the whole lens group, aperture stop ST for adjusting a light amount, and a rear lens group (Gr2) having a positive optical power as the whole lens group, which are arranged in order from the object side to the image side. Front lens group (Gr1) and rear lens group (Gr2) are arranged at the both sides of the aperture stop.

More specifically, in wide-angle optical system 1A of Example 1, lens groups (Gr1 and G22) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

On the image side of the lens group (Gr2) as the rear lens group, there is arranged a light-receiving surface of image pickup element SR through parallel flat plate FT serving as a filter. The parallel flat plate FT indicates various types of optical filters and a cover glass of the image pickup element.

The sign ri given to respective lens surfaces (i=1, 2, 3, . . . ) in FIG. 5 represents the i-th lens surface which is defined by numbering from the object side (where the cemented lens surfaces are defined to be numbered as one surface). The surface represented by sign ri followed by the asterisk "*" indicates that it is an aspheric surface. Incidentally, each of aperture stop ST, opposing sides of parallel flat plate FT and a light-receiving surface of image pickup element SR is handled as one surface. Such the handling and the meaning of signs are the same as those in Examples 2 to 23 which will be described later (in FIGS. 6 to 24 and FIGS. 45 to 47). However, the aforesaid meaning of "the same" does not signify "exactly the same". For example, the lens surfaces arranged at the closest position to the object is represented by the same sign (r1) in FIGS. 6 to 24 and FIGS. 45 to 47 of Examples 2 to 23, respectively. However, it does not mean that each lens surface has the same curvature radius through Examples 2 to 23.

Under the structure of this kind, a ray entering from the object side passes through first lens group (Gr1), aperture stop ST, second lens group (Gr2) and parallel flat plate FT in this order, along optical axis AX, and forms an optical image of a photographic object on a light-receiving surface of image pickup element SR. Then, in the image pickup element SR, the optical image is converted into electric signal. A predetermined digital image processing is applied to this electric signal in case of need, and the resulting electric signal is recorded on a memory of a digital apparatus such as, for example, a digital camera, as digital image signals, or is transmitted to other digital apparatuses through wire or through wireless communications.

Construction data of respective lenses in wide-angle optical system 1A of Example 1 will be shown below.

Numerical Example 1

Unit: mm

Surface data

| Surface Number | r | d | nd | vd |
|---|---|---|---|---|
| Object plane | ∞ | ∞ | | |
| 1 | 14.154 | 1.200 | 1.83481 | 42.72 |
| 2 | 3.840 | 2.530 | | |
| 3* | 2.887 | 1.000 | 1.53048 | 55.72 |
| 4* | 0.693 | 0.895 | | |
| 5* | 1.942 | 1.729 | 1.63550 | 23.89 |
| 6* | −5.435 | 0.671 | | |
| 7(Stop) | ∞ | 0.504 | | |
| 8* | 3.154 | 1.471 | 1.53048 | 55.72 |
| 9* | −1.066 | 0.900 | | |
| 10 | ∞ | 0.500 | 1.51680 | 64.20 |
| 11 | ∞ | 0.100 | | |
| Image plane | ∞ | | | |

Aspheric surface data

Third surface

K = −3.0000e+001, A4 = −1.3364e−002, A6 = 1.3918e−003,
A8 = −6.9228e−005, A10 = 1.3057e−006, A12 = 0.0000e+000

Fourth surface

K = −1.0000e+000, A4 = −1.2584e−002, A6 = −8.8066e−002,
A8 = 3.71501e−002, A10 = −4.8796e−003, A12 = 0.0000e+000

Fifth surface

K = 0.0000e+000, A4 = 4.6932e−002, A6 = −6.3958e−002,
A8 = 2.4821e−002, A10 = −3.6310e−003, A12 = 0.0000e+000

Sixth surface

K = 0.0000e+000, A4 = 2.3370e−002, A6 = 1.8813e−003,
A8 = −2.2382e−003, A10 = −5.8927e−004, A12 = 5.1484e−004

Eighth surface

K = 0.0000e+000, A4 = −8.2144e−002, A6 = 1.3260e−001,
A8 = −1.4095e−001, A10 = 5.9375e−002, A12 = 0.0000e+00

Ninth surface

K = −2.0000e+000, A4 = −7.4633e−002, A6 = 1.1084e−001,
A8 = −5.9296e−002, A10 = 1.2612e−002, A12 = 0.0000e+000

Various types of data

| | |
|---|---|
| Focal length | 0.753 |
| F number | 2.801 |
| Half angle of view | 101.595 |
| Image height | 1.700 |
| Total lens length | 11.352 |
| BF | 1.352 |

In the aforesaid surface data, each of the surface numbers corresponds to number i in sign ri (i=1, 2, 3, . . . ) given to each lens shown in FIG. 5. The surface represented by the number i followed by the asterisk "*" indicates that it is an aspheric surface (a surface having a refractive optical surface in a aspheric shape, or having a refractive function which are equivalent to an aspheric surface).

Further, "r" represents a curvature radius (where, unit is mm) of each surface, "d" represents a space between lens surfaces on the optical axis (an axial surface distance) under the condition that the focus is adjusted to infinity, "nd" represents a refractive index at d line (wavelength 587.56 nm) of each lens, and "vd" represents the Abbe number. Incidentally, the curvature radius of each surface of aperture stop ST, opposing sides of parallel flat plate, and of a light-receiving surface of imaging element SR is ∞ (infinity), because the each surface is flat.

The aforesaid aspheric surface data shows values of a quadratic surface parameter (conic constant K) and aspheric surface constant Ai (i=4, 6, 8, 10, and 12) of a surface represented as an aspheric surface (the surface represented by the number i followed by the asterisk "*"). An aspheric shape of an optical surface is defined by the following expression with a local orthogonal coordinate system (x, y, z), where a surface vertex is at the origin and the direction from the object toward the image pickup element is defined to direct a positive direction of z-axis $$z(h) = ch^2/[1+\sqrt{\{1-(1+K)c^2h^2\}}] + \Sigma Ai \cdot hi.$$

In the expression, z(h) represents an amount of displacement (measured from the surface vertex) in the z-axis direction at a position of height h, h represents a height ($h^2=x^2 y^2$) in the direction perpendicular to the z-axis, c represents a paraxial curvature (reciprocal of curvature radius), Ai represents an aspheric surface coefficient in i-th order, and K represents a quadratic surface parameter (conic constant). Aberrations of wide-angle optical system 1A of Example 1 under the aforesaid lens arrangement and structure are shown in FIGS. 25A and 25B. In respective diagrams of FIG. 25A, spherical aberration (sine condition) (LONGITUDINAL SPHERICAL ABERRATION), astigmatism (ASTIGMATISM FIELD CURVER) and distortion aberration (DISTORTION) are shown in this order from the left. The horizontal axis of the spherical aberration indicates shift of a focal point position in a unit of mm, and its vertical axis indicates a value normalized by an incident height. The horizontal axis of the astigmatism indicates shift of a focal point position in a unit of mm, and its vertical axis indicates an image height in a unit of mm. The horizontal axis of the distortion indicates a ratio (%) of an actual image height to an ideal image height, which represents the distortion, and the vertical axis indicates its angle of view in a unit of degree (which indicates the angle of view up to a half angle of view of 90° in this case). In the diagram of astigmatism, dotted lines indicate a sagittal surface, and solid lines indicate a tangential surface respectively. Then, FIG. 25B shows a lateral aberration, and the left portion indicates that for a tangential (meridional) surface, the right portion indicates that for a sagittal (radial) surface. Further, FIG. 25B shows the lateral aberrations for the maximum angle of view and the medium angle of view, and that on the axis, in this order from the upper part. The horizontal axis indicates a height of incident ray corresponding to the principal ray, as a value normalized by the coordinates of the aperture stop, and the vertical axis indicates shift from the principal ray on the image plane in a unit of mm.

The diagrams of spherical aberration and lateral aberration show aberrations of three rays: d line in a solid line (wavelength 587.56 nm), g line in a broken line (wavelength 435.84 nm) and C line in a one-dot chain line (wavelength 656.28 nm). Diagrams of astigmatism and distortion are results of using the aforesaid d line (wavelength 587.56 nm).

The arrangement mentioned above is the same as those in the construction data relating to Examples 2 to 23 shown below and those in FIGS. 26A to 44B and FIGS. 48A to 50B which show the various aberrations.

Example 2

FIG. 6 is a sectional view showing an arrangement of lens groups in a wide-angle optical system of Example 2. Each of FIGS. 26A and 26B is an aberration diagram of lens groups in a wide-angle optical system in Example 2.

The wide-angle optical system 1B of Example 2 has a two-component structure of positive-positive components which includes, as shown in FIG. 6, front lens group (Gr1) having a positive optical power as the whole lens group, aperture stop ST for adjusting a light amount, and rear lens group (Gr2) having a positive optical power as the whole lens group, which are arranged in order from the object side to the image side.

More specifically, in the wide-angle optical system 1B of Example 2, lens groups (Gr1 and Gr2) as the front lens group and the rear lens group are arranged in order from the object side to the image side and are structured as follows:

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and made, for example, of a resin material.

The second lens group (Gr2) is composed of a biconvex positive lens (fourth lens L4). The fourth lens L4 has a single aspheric surface at one side.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1B of Example 2 will be shown below.

Numerical Value Example 2

| Unit mm | | | | |
|---|---|---|---|---|
| Surface data | | | | |
| Surface Number | r | d | nd | vd |
| Object plane | ∞ | ∞ | | |
| 1 | 14.266 | 1.198 | 1.83481 | 42.72 |
| 2 | 3.882 | 2.547 | | |
| 3* | 2.690 | 1.000 | 1.53048 | 55.72 |
| 4* | 0.694 | 0.859 | | |
| 5* | 1.967 | 1.745 | 1.63550 | 23.89 |
| 6* | −6.055 | 0.671 | | |
| 7(Stop) | ∞ | 0.547 | | |
| 8 | 3.184 | 1.433 | 1.58913 | 61.24 |
| 9* | −1.177 | 0.900 | | |
| 10 | ∞ | 0.500 | 1.51680 | 64.20 |
| 11 | ∞ | 0.100 | | |
| Image plane | ∞ | | | |

| Aspheric surface data |
|---|
| Third surface |
| K = −3.0000e+001, A4 = −1.3478e−002, A6 = 1.3586e−003, A8 = −5.5396e−005, A10 = 4.5377e−007, A12 = 0.0000e+000 |
| Fourth surface |
| K = −1.0000e+000, A4 = −1.4175e−002, A6 = −8.8830e−002, A8 = 3.8392e−002, A10 = −5.0309e−003, A12 = 0.0000e+000 |
| Fifth surface |
| K = 0.0000e+000, A4 = 5.6194e−002, A6 = −6.4821e−002, A8 = 2.4513e−002, A10 = −3.5021e−003, A12 = 0.0000e+000 |
| Sixth surface |
| K = 0.0000e+000, A4 = 3.2029e−002, A6 = −6.3523e−003, A8 = 1.7772e−003, A10 = −1.4859e−003, A12 = 5.7499e−004 |
| Ninth surface |
| K = −2.0000e+000, A4 = −2.3177e−002, A6 = 9.0449e−002, A8 = −4.5930e−002, A10 = 8.6151e−003, A12 = 0.0000e+000 |

| Various types of data | |
|---|---|
| Focal length | 0.753 |
| F number | 2.796 |
| Half angle of view | 102.149 |
| Image height | 1.701 |
| Total lens length | 11.350 |
| BF | 1.350 |

Aberrations including spherical aberration (sine condition), astigmatism, distortion and lateral aberration of wide-angle optical system 1B of Example 2 under the aforesaid lens arrangement and structure are shown in FIGS. 26A and 26B.

Example 3

FIG. 7 is a sectional view showing an arrangement of lens groups in a wide-angle optical system of Example 3. Each of FIGS. 27A and 276 is an aberration diagram of lens groups in a wide-angle optical system in Example 3.

The wide-angle optical system 1C of Example 3 has a two-component structure of positive-positive components which includes, as shown in FIG. 7, front lens group (Gr1) having a positive optical power as the whole lens group, aperture stop ST for adjusting a light amount, and rear lens group (Gr2) having a positive optical power as the whole lens group, which are arranged in order from the object side to the image side.

More specifically, in the wide-angle optical system 1C of Example 3, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and the second lens L2 is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1C of Example 3 will be shown below.

Numerical Example 3

Unit mm

Surface data

| Surface Number | r | d | nd | vd |
|---|---|---|---|---|
| Object plane | ∞ | ∞ | | |
| 1 | 13.984 | 1.200 | 1.83481 | 42.72 |
| 2 | 3.657 | 2.473 | | |
| 3* | 2.957 | 1.000 | 1.53048 | 55.72 |
| 4* | 0.692 | 0.863 | | |
| 5* | 2.001 | 1.650 | 1.80542 | 26.13 |
| 6* | −11.213 | 0.646 | | |
| 7(Stop) | ∞ | 0.385 | | |
| 8* | 5.618 | 1.513 | 1.53048 | 55.72 |
| 9* | −0.907 | 0.900 | | |
| 10 | ∞ | 0.500 | 1.51680 | 64.20 |
| 11 | ∞ | 0.100 | | |
| Image plane | ∞ | | | |

Aspheric surface data

Third surface $K = -3.0000e+001, A4 = -1.7603e-002, A6 = 2.2353e-003,$
$A8 = -1.4527e-004, A10 = 4.0508e-006, A12 = 0.0000e+000$
Fourth surface $K = -1.0000e+000, A4 = -4.7670e-002, A6 = -6.3674e-002,$
$A8 = 3.2022e-002, A10 = -4.5557e-003, A12 = 0.0000e+000$
Fifth surface $K = 0.0000e+000, A4 = 3.0319e-002, A6 = -4.6400e-002,$
$A8 = 1.9102e-002, A10 = -2.8174e-003, A12 = 0.0000e+000$
Sixth surface $K = 0.0000e+000, A4 = 1.0089e-003, A6 = 1.9847e-002,$
$A8 = -8.0153e-003, A10 = -4.5280e-004, A12 = 8.4110e-004$
Eighth surface $K = 0.0000e+000, A4 = -1.8624e-001, A6 = 2.8312e-001,$
$A8 = -3.0529e-001, A10 = 1.2919e-001, A12 = 0.0000e+000$
Ninth surface $K = -2.0000e+000, A4 = -1.5315e-001, A6 = 1.3069e-001,$
$A8 = -9.6264e-002, A10 = 2.8352e-002, A12 = 0.0000e+000$ Various types of data

| | |
|---|---|
| Focal length | 0.753 |
| F number | 2.796 |
| Half angle of view | 100.105 |
| Image height | 1.699 |
| Total lens length | 11.082 |
| BF | 1.351 |

Aberrations including spherical aberration (sine condition), astigmatism, distortion and lateral aberration in wide-angle optical system 1C of Example 3 under the aforesaid lens arrangement and structure are shown in FIGS. 27A and 27B.

Example 4

FIG. 8 is a sectional view showing an arrangement of lens groups in a wide-angle optical system of Example 4. Each of FIGS. 28A and 28B is an aberration diagram of lens groups in a wide-angle optical system in Example 4.

The wide-angle optical system 1D of Example 4 has a two-component structure of positive-positive components which includes, as shown in FIG. 8, front lens group (Gr1) having a positive optical power as the whole lens group, aperture stop ST for adjusting a light amount, and rear lens group (Gr2) having a positive optical power as the whole lens group, which are arranged in order from the object side to the image side.

More specifically, in the wide-angle optical system 1D of Example 4, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1D of Example 4 will be shown below.

Numerical Example 4

| Unit mm | | | | |
|---|---|---|---|---|
| Surface data | | | | |
| Surface Number | r | d | nd | vd |
| Object plane | ∞ | ∞ | | |
| 1 | 13.999 | 1.100 | 1.88300 | 40.81 |
| 2 | 3.837 | 2.690 | | |
| 3* | 29.399 | 1.000 | 1.53048 | 55.72 |
| 4* | 1.016 | 0.799 | | |
| 5* | 1.962 | 1.747 | 1.63200 | 23.41 |
| 6* | −5.019 | 0.640 | | |
| 7(Stop) | ∞ | 0.478 | | |
| 8* | 4.008 | 1.461 | 1.53048 | 55.72 |
| 9* | −1.098 | 0.565 | | |
| 10 | ∞ | 0.500 | 1.51680 | 47.00 |
| 11 | ∞ | 0.520 | | |
| Image plane | ∞ | | | |

Aspheric surface data

Third surface $K = -3.0000e+001, A4 = -5.4043e-003, A6 = 4.0794e-005,$
$A8 = 5.0085e-005, A10 = -3.0399e-006, A12 = 0.0000e+000$
Fourth surface $K = -2.0788e+000, A4 = 2.4740e-001, A6 = -1.7754e-001,$
$A8 = 5.7603e-002, A10 = -6.9424e-003, A12 = 0.0000e+000$
Fifth surface $K = 0.0000e+000, A4 = 5.5106e-002, A6 = -6.3595e-002,$
$A8 = 2.4535e-002, A10 = -3.6937e-003, A12 = 0.0000e+000$
Sixth surface $K = 0.0000e+000, A4 = 4.9789e-002, A6 = -3.3464e-002,$
$A8 = 2.1739e-002, A10 = -9.4383e-003, A12 = 1.9006e-003$
Eighth surface $K = 0.0000e+000, A4 = -1.2333e-001, A6 = 1.7672e-001,$
$A8 = -2.1232e-001, A10 = 8.5862e-002, A12 = 0.0000e+000$
Ninth surface $K = -2.0000e+000, A4 = -7.5634e-002, A6 = 5.8591e-002,$
$A8 = -2.2662e-002, A10 = 1.3248e-003, A12 = 0.0000e+000$

| Various types of data | |
|---|---|
| Focal length | 0.753 |
| F number | 2.887 |
| Half angle of view | 103.802 |
| Image height | 1.750 |
| Total lens length | 11.345 |
| BF | 1.430 |

Aberrations including spherical aberration (sine condition), astigmatism, distortion and lateral aberration in wide-angle optical system 1D of Example 4 under the aforesaid lens arrangement and structure are shown in FIGS. 28A and 28B.

Example 5

FIG. 9 is a sectional view showing an arrangement of lens groups in a wide-angle optical system of Example 5. Each of FIGS. 29A and 29B is an aberration diagram of lens groups in a wide-angle optical system in Example 5.

The wide-angle optical system 1E of Example 5 has a two-component structure of positive-positive components which includes, as shown in FIG. 9, front lens group (Gr1) having a positive optical power as the whole lens group, aperture stop ST for adjusting a light amount, and rear lens group (Gr2) having a positive optical power as the whole lens group, which are arranged in order from the object side to the image side.

More specifically, in the wide-angle optical system 1E of Example 5, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1E of Example 5 will be shown below.

Numerical Example 5

| Unit mm | | | | |
|---|---|---|---|---|
| Surface data | | | | |
| Surface Number | r | d | nd | vd |
| Object plane | ∞ | ∞ | | |
| 1 | 14.435 | 1.400 | 1.88300 | 40.81 |
| 2 | 4.201 | 2.806 | | |
| 3* | 18.046 | 1.000 | 1.53048 | 55.72 |
| 4* | 1.035 | 1.311 | | |
| 5* | 1.901 | 1.740 | 1.63200 | 23.41 |
| 6* | −7.145 | 0.540 | | |
| 7(Stop) | ∞ | 0.725 | | |
| 8* | 2.837 | 1.629 | 1.53048 | 55.72 |
| 9* | −1.663 | 0.502 | | |
| 10 | ∞ | 0.500 | 1.56400 | 47.00 |
| 11 | ∞ | 0.100 | | |
| Image plane | ∞ | | | |

Aspheric surface data

Third surface $K = -5.0000e+000, A = -2.8407e-003, A6 = -2.0654e-004,$
$A8 = 1.8328e-005, A10 = 1.3083e-006, A12 = -1.1270e-007$
Fourth surface $K = -2.0000e+000, A4 = 1.6634e-001, A6 = -8.7701e-002,$
$A8 = 2.0131e-002, A10 = -1.3772e-003, A12 = -9.1985e-005$
Fifth surface $K = 0.0000e+000, A4 = 3.0146e-003, A6 = -2.1090e-002,$
$A8 = 5.9446e-003, A10 = -2.8002e-005, A12 = -3.0303e-004$ -continued Unit mm Sixth surface K = 0.0000e+000, A4 = 2.0048e-002, A6 = -2.3632e-003,
A8 = 2.2588e-004, A10 = -2.2209e-003, A12 = 9.1617e-004
Eighth surface K = 0.0000e+000, A4 = -6.6502e-002, A6 = 7.7287e-002,
A8 = -5.9858e-002, A10 = 2.3673e-002, A12 = -4.0895e-003
Ninth surface K = -2.0000e+000, A4 = -1.3332e-002, A6 = 2.3115e-002,
A8 = 1.7916e-003, A10 = -3.5067e-003, A12 = 4.7323e-004

Various types of data

| | |
|---|---|
| Focal length | 0.891 |
| F number | 2.795 |
| Half angle of view | 104.564 |
| Image height | 2.068 |
| Total lens length | 12.508 |
| BF | 1.357 |

Aberrations including spherical aberration (sine condition), astigmatism, distortion and lateral aberration in wide-angle optical system 1E of Example 5 under the lens arrangement and structure are shown in FIGS. 29A and 29B.

Example 6

FIG. 10 is a sectional view showing an arrangement of lens groups in a wide-angle optical system of Example 6. Each of FIGS. 30A and 30B is an aberration diagram of lens groups in a wide-angle optical system in Example 6.

The wide-angle optical system 1F of Example 6 has a two-component structure of positive-positive components which includes, as shown in FIG. 10, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1E of Example 6, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1F of Example 6 will be shown below.

Numerical Example 6

Unit mm

Surface data

| Surface Number | r | d | nd | vd |
|---|---|---|---|---|
| Object plane | ∞ | ∞ | | |
| 1 | 14.723 | 1.400 | 1.88300 | 40.81 |
| 2 | 4.376 | 2.824 | | |
| 3* | 11.328 | 1.000 | 1.53048 | 55.72 |
| 4* | 1.060 | 1.144 | | |
| 5* | 1.997 | 1.870 | 1.63200 | 23.41 |
| 6* | -10.601 | 0.479 | | |
| 7(Stop) | ∞ | 0.881 | | |
| 8* | 3.921 | 1.973 | 1.53048 | 55.72 |
| 9* | -1.761 | 1.024 | | |
| 10 | ∞ | 0.500 | 1.56400 | 47.00 |
| 11 | ∞ | 0.500 | | |
| Image plane | ∞ | | | |

Aspheric surface data

Third surface

K = -2.8612e+001, A4 = -2.0350e-003, A6 = -1.6746e-004,
A8 = 7.2034e-006, A10 = 1.3033e-006, A12 = -7.3695e-008
Fourth surface K = -2.0000e+000, A4 = 1.1433e-001, A6 = -4.2316e-002,
A8 = 5.1180e-003, A10 = 4.1021e-004, A12 = -1.0701e-004
Fifth surface K = 0.0000e+000, A4 = -3.0906e-003, A6 = -3.3491e-003,
A8 = -2.9631e-003, A10 = 1.8309e-003, A12 = -3.3866e-004
Sixth surface K = 0.0000e+000, A4 = 1.6870e-002, A6 = -1.1841e-003,
A8 = 4.9275e-003, A10 = -5.8262e-003, A12 = 1.7245e-003
Eighth surface K = 0.0000e+000, A4 = -3.2047e-002, A6 = 2.2974e-002,
A8 = -1.0720e-002, A10 = 2.7148e-003, A12 = -3.1166e-004
Ninth surface K = 2.0000e+000, A4 = -2.4097e-003, A6 = 1.8993e-003,
A8 = 1.5419e-003, A10 = -3.7264e-004, A12 = 9.0955e-006

Various types of data

| | |
|---|---|
| Focal length | 1.122 |
| F number | 2.791 |
| Halt angle of view | 104.156 |
| Image height | 2.757 |
| Total lens length | 13.462 |
| BF | 1.891 |

Aberrations including spherical aberration (sine condition), astigmatism, distortion and lateral aberration in wide-angle optical system 1F of Example 6 under the aforesaid lens arrangement and structure are shown in FIGS. 30A and 30B.

Example 7

FIG. 11 is a sectional view showing an arrangement of lens groups in a wide-angle optical system of Example 7. Each of FIGS. 31A and 31B is an aberration diagram of lens groups in a wide-angle optical system in Example 7.

The wide-angle optical system 1G of Example 7 has a two-component structure of negative-positive components which includes, as shown in FIG. 11, a front lens group (Gr1)

having a negative optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1G of Example 7, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a biconcave negative lens (second lens L2) and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1G of Example 7 will be shown below.

Numerical Example 7

Unit mm

Surface data

| Surface Number | r | d | nd | νd |
|---|---|---|---|---|
| Object plane | ∞ | ∞ | | |
| 1 | 11.636 | 1.400 | 1.88300 | 40.81 |
| 2 | 3.826 | 3.513 | | |
| 3* | −5.985 | 0.764 | 1.53048 | 55.72 |
| 4* | 0.772 | 0.407 | | |
| 5* | 1.168 | 1.413 | 1.63200 | 23.41 |
| 6* | −8.197 | 0.361 | | |
| 7(Stop) | ∞ | 0.185 | | |
| 8* | 3.200 | 1.441 | 1.53048 | 55.72 |
| 9* | −0.917 | 0.800 | | |
| 10 | ∞ | 0.300 | 1.56400 | 47.00 |
| 11 | ∞ | 0.300 | | |
| Image plane | ∞ | | | |

Aspheric surface data

Third surface

K = −5.0000e+000, A4 = −3.6223e−003, A6 = 1.1909e−003,
A8 = −6.3586e−005, A10 = 1.9291e−005, A12 = −3.0988e−006
Fourth surface K = −3.6201e+000, A4 = 1.0213e+000, A6 = −1.1904e+000,
A8 = 5.4191e−001, A10 = 2.9634e−002, A12 = −7.9731e−002
Fifth surface K = 0.0000e+000, A4 = 1.3442e−001, A6 = 5.5084e−002,
A8 = −6.8268e−001, A10 = 8.1707e−001, A12 = −3.6301e−001
Sixth surface K = 0.0000e+000, A4 = 2.4454e−001, A6 = −2.9441e−001,
A8 = −9.8690e−002, A10 = 6.1323e−003, A12 = 8.8561e−002
Eighth surface K = 0.0000e+000, A4 = −2.9917e−001, A6 = 2.3425e+000, -continued Unit mm A8 = −8.9235e+000, A10 = 1.5921e+001, A12 = −8.2016e+000
Ninth surface K = −2.0000e+000, A4 = −1.8169e−001, A6 = 2.8826e−001,
A8 = −1.8024e−001, A10 = 9.6407e−002, A12 = 7.3851e−003

Various types of data

| Focal length | 0.665 |
|---|---|
| F number | 2.806 |
| Half angle of view | 104.016 |
| Image height | 1.378 |
| Total lens length | 10.799 |
| BF | 1.315 |

Aberrations including spherical aberration (sine condition), astigmatism, distortion and lateral aberration in wide-angle optical system 1G of Example 7 under the aforesaid lens arrangement and structure are shown in FIGS. 31A and 31B.

Example 8

FIG. 12 is a sectional view showing an arrangement of lens groups in a wide-angle optical system of Example 8. Each of FIGS. 32A and 32B is an aberration diagram of lens groups in a wide-angle optical system in Example 8.

The wide-angle optical system 1H of Example 8 has a two-component structure of negative-positive components which includes, as shown in FIG. 12, a front lens group (Gr1) having a negative optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1H of Example 8, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (the second lens L2) whose convex surface faces the object side and of positive meniscus lens (third lens L3) whose convex surface faces the object side. Each of the second lens L2 and the third lens L3 has opposing aspheric surfaces, and the second lend L2 is made of, for example, a resin material.

The second lens group (Gr2) is composed of a biconvex positive lens (fourth lens L4). The fourth lens L4 has opposing aspheric surfaces, and is made of, for example, a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1H of Example 8 will be shown below.

Numerical Example 8

| Unit mm | | | | |
|---|---|---|---|---|
| Surface data | | | | |
| Surface Number | r | d | nd | vd |
| Object plane | ∞ | ∞ | | |
| 1 | 15.120 | 1.400 | 1.89800 | 34.01 |
| 2 | 4.206 | 2.648 | | |
| 3* | 5.115 | 1.000 | 1.53048 | 55.72 |
| 4* | 0.689 | 1.042 | | |
| 5* | 2.432 | 1.603 | 2.00170 | 20.64 |
| 6* | 39.577 | 0.662 | | |
| 7(Stop) | ∞ | 0.391 | | |
| 8* | 3.773 | 1.867 | 1.53048 | 55.72 |
| 9* | −0.847 | 0.500 | | |
| 10 | ∞ | 0.500 | 1.51680 | 64.20 |
| 11 | ∞ | 0.500 | | |
| Image plane | ∞ | | | |

Aspheric surface data

Third surface $K = -8.9708e+000, A4 = -8.5404e-003, A6 = 1.6037e-004,$
$A8 = 1.7163e-005, A10 = 1.8196e-006, A12 = -1.6486e-007$
Fourth surface $K = -2.0582e+000, A4 = 1.4364e-001, A6 = -9.2621e-002,$
$A8 = 2.4919e-002, A10 = -1.8777e-003, A12 = -1.2094e-004$
Fifth surface $K = 0.0000e+000, A4 = -8.1504e-003, A6 = 2.8126e-003,$
$A8 = -3.3407e-003, A10 = 2.0200e-003, A12 = -3.4010e-004$
Sixth surface $K = 0.0000e+000, A4 = 1.4359e-002, A6 = -9.5648e-003,$
$A8 = 2.2659e-002, A10 = -1.4797e-002, A12 = 2.8253e-003$
Eighth surface $K = 0.0000e+000, A4 = -9.4837e-002, A6 = 1.8112e-001,$
$A8 = -1.9637e-001, A10 = 9.9926e-002, A12 = -1.9270e-002$
Ninth surface $K = -2.0000e+000, A4 = -6.5541e-003, A6 = -4.3145e-002,$
$A8 = 3.7525e-002, A10 = -1.0082e-002, A12 = 6.7158e-004$

| Various types of data | |
|---|---|
| Focal length | 0.599 |
| F number | 2.745 |
| Half angle of view | 103.387 |
| Image height | 2.068 |
| Total lens length | 11.963 |
| BF | 1.349 |

Aberrations including spherical aberration (sine condition), astigmatism, distortion and lateral aberration in wide-angle optical system 1H of Example 8 under the aforesaid lens arrangement and structure are shown in FIGS. 32A and 32B.

Example 9

FIG. 13 is a sectional view showing an arrangement of lens groups in a wide-angle optical system of Example 9. Each of FIGS. 33A and 33B is an aberration diagram of lens groups in a wide-angle optical system in Example 9.

The wide-angle optical system 1I of Example 9 has a two-component structure of positive-positive components which includes, as shown in FIG. 13, a front lens group (Gr1) having s positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1I of Example 9, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1I of Example 9 will be shown below.

Numerical Example 9

| Unit mm | | | | |
|---|---|---|---|---|
| Surface data | | | | |
| Surface Number | r | d | nd | vd |
| Object plane | ∞ | ∞ | | |
| 1 | 15.758 | 1.400 | 1.88300 | 40.81 |
| 2 | 4.186 | 2.487 | | |
| 3* | 3.491 | 1.000 | 1.53048 | 55.72 |
| 4* | 0.703 | 1.752 | | |
| 5* | 2.081 | 1.780 | 1.75120 | 24.80 |
| 6* | −19.680 | 0.618 | | |
| 7(Stop) | ∞ | 0.602 | | |
| 8* | 3.778 | 1.575 | 1.53048 | 55.72 |
| 9* | −1.296 | 0.533 | | |
| 10 | ∞ | 0.500 | 1.51680 | 64.20 |
| 11 | ∞ | 0.500 | | |
| Image plane | ∞ | | | |

Aspheric surface data

Third surface $K = -7.2600e+000, A4 = -5.4462e-003, A6 = -4.4312e-004,$
$A8 = 4.5943e-005, A10 = 1.8651e-006, A12 = -1.8278e-007$
Fourth surface $K = -2.0000e+000, A4 = 1.7009e-001, A6 = -9.2952e-002,$
$A8 = 2.1326e-002, A10 = -1.8453e-003, A12 = 9.8857e-006$
Fifth surface $K = 0.0000e+000, A4 = -1.3670e-002, A6 = 5.3090e-003,$
$A8 = -5.6228e-003, A10 = 2.3670e-003\ -3.5594e-004$
Sixth surface $K = 0.0000e+000, A4 = 9.2507e-003, A6 = 1.1698e-002,$
$A8 = -4.3537e-003, A10 = 0.0000e+000, A12 = 0.0000e+000$ -continued Unit mm Eighth surface K = 0.0000e+000, A4 = −6.7739e−002, A6 = 1.0282e−001,
A8 = −1.1549e−001, A10 = 6.5513e−002, A12 = −1.3741e−002

Ninth surface

K = −2.0000e+000, A4 = 5.3266e−002, A6 = −8.3637e−002,
A8 = 7.4917e−002, A10 = −3.2920e−002, A12 = −5.6561e−003

Various types of data

| | |
|---|---|
| Focal length | 0.740 |
| F number | 2.753 |
| Half angle of view | 104.394 |
| Image height | 2.068 |
| Total lens length | 12.607 |
| BF | 1.392 |

Aberrations including spherical aberration (sine condition), astigmatism, distortion and lateral aberration in wide-angle optical system 1I of Example 9 under the aforesaid lens arrangement and structure are shown in FIGS. 33A and 33B.

Example 10

FIG. 14 is a sectional view showing an arrangement of lens groups in a wide-angle optical system of Example 10. Each of FIGS. 34A and 34B is an aberration diagram of lens groups in a wide-angle optical system in Example 10.

The wide-angle optical system 1J of Example 10 has a two-component structure of negative-positive components which includes, as shown in FIG. 14, a front lens group (Gr1) having a negative optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1J of Example 10, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1J of Example 10 will be shown below.

Numerical Example 10

Unit mm

Surface data

| Surface Number | r | d | nd | vd |
|---|---|---|---|---|
| Object plane | ∞ | ∞ | | |
| 1 | 18.040 | 1.400 | 1.88300 | 40.81 |
| 2 | 4.970 | 3.207 | | |
| 3* | 4.198 | 1.000 | 1.53048 | 55.72 |
| 4* | 0.673 | 1.247 | | |
| 5* | 2.224 | 1.709 | 1.76130 | 18.40 |
| 6* | −27.171 | 0.733 | | |
| 7(Stop) | ∞ | 0.460 | | |
| 8* | 3.506 | 1.684 | 1.53048 | 55.72 |
| 9* | −1.142 | 0.743 | | |
| 10 | ∞ | 0.500 | 1.51680 | 64.20 |
| 11 | ∞ | 0.500 | | |
| Image plane | ∞ | | | |

Aspheric surface data

Third surface

K = −1.1384e+001, A4 = −2.0656e−003, A6 = −3.9876e−004,
A8 = 2.9770e−005, A10 = 8.1903e−007, A12 = −7.3470e−008

Fourth surface

K = −2.0000e+000, A4 = 1.6836e−001, A6 = −9.3318e−002,
A8 = 2.1430e−002, A10 = −1.7746e−003, A12 = −2.3299e−006

Fifth surface

K = 0.0000e+000, A4 = −2.7011e−002, A6 = 7.8703e−003,
A8 = −5.9471e−003, A10 = 2.3364e−003, A12 = −3.1493e−004

Sixth surface

K = 0.0000e+000, A4 = −6.7325e−003, A6 = 2.0818e−002,
A8 = −5.6452e−003, A10 = 0.0000e+000, A12 = 0.0000e+000

Eighth surface

K = 0.0000e+000, A4 = −7.3548e−002, A6 = 1.2354e−001,
A8 = −1.3762e−001, A10 = 7.8947e−002, A12 = −1.6892e−002

Ninth surface

K = −2.0000e+000, A4 = 1.8419e−002, A6 = −6.8344e−002,
A8 = 7.3910e−002, A10 = −3.4047e−002, A12 = 6.0222e−003

Various types of data

| | |
|---|---|
| Focal length | 0.691 |
| F number | 2.750 |
| Half angle of view | 104.090 |
| Image height | 2.068 |
| Total lens length | 13.040 |
| BF | 1.601 |

Aberrations including spherical aberration (sine condition), astigmatism, distortion and lateral aberration in wide-angle optical system 1J of Example 10 under the aforesaid lens arrangement and structure are shown in FIGS. 34A and 34B.

Example 11

FIG. 15 is a sectional view showing an arrangement of lens groups in a wide-angle optical system of Example 11. Each of FIGS. 35A and 35B is an aberration diagram of lens groups in a wide-angle optical system in Example 11.

The wide-angle optical system 1K of Example 11 has a two-component structure of positive-positive components which includes, as shown in FIG. 15, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1K of Example 11, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1K of Example 11 will be shown below.

Numerical Example 11

| Unit mm | | | | |
|---|---|---|---|---|
| Surface data | | | | |
| Surface Number | r | d | nd | vd |
| Object plane | ∞ | ∞ | | |
| 1 | 17.607 | 1.400 | 1.83481 | 42.72 |
| 2 | 4.970 | 3.583 | | |
| 3* | 10.000 | 1.000 | 1.53048 | 55.72 |
| 4* | 0.925 | 1.562 | | |
| 5* | 1.836 | 1.794 | 1.61420 | 25.59 |
| 6* | −5.646 | 0.528 | | |
| 7(Stop) | ∞ | 0.515 | | |
| 8* | 3.421 | 1.299 | 1.53048 | 55.72 |
| 9* | −1.692 | 0.500 | | |
| 10 | ∞ | 0.500 | 1.51680 | 64.20 |
| 11 | ∞ | 0.500 | | |
| Image plane | ∞ | | | |

| Aspheric surface data |
|---|
| Third surface |

K = −1.5496e+001, A4 = −3.6093e−003, A6 = −2.0553e−004,
A8 = 2.1383e−005, A10 = 1.6335e−006, A12 = −1.3189e−007
Fourth surface K = −2.1529e+000, A4 = 1.5000e−001, A6 = −8.7614e−002,
A8 = 2.1241e−002, A10 = −1.4261e−003, A12 = −9.2773e−005
Fifth surface K = 0.0000e+000, A4 = −1.3976e−002, A6 = −2.1039e−002,
A8 = 6.3676e−003, A10 = 8.2538e−004, A12 = −6.5452e−004
Sixth surface K = 0.0000e+000, A4 = 1.9629e−002, A6 = 5.7736e−003,
A8 = −8.1620e−003, A10 = −9.7389e−004, A12 = 1.3283e−003

| -continued |
|---|
| Unit mm |
| Eighth surface |

K = 0.0000e+000, A4 = −2.6676e−002, A6 = 4.1736e−002,
A8 = −7.3223e−002, A10 = 5.6967e−002, A12 = −1.3970e−002
Ninth surface K = −2.0000e+000, A4 = 5.1901e−002, A6 = 2.1804e−002,
A8 = −9.0973e−003, A10 = −8.7537e−003, A12 = 4.3291e−003

| Various types of data | |
|---|---|
| Focal length | 0.811 |
| F number | 2.781 |
| Half angle of view | 103.960 |
| Image height | 2.068 |
| Total lens length | 13.043 |
| BF | 1.361 |

Aberrations including spherical aberration (sine condition), astigmatism, distortion and lateral aberration in wide-angle optical system 1K of Example 11 under the aforesaid lens arrangement and structure are shown in FIGS. 35A and 35B.

Example 12

FIG. 16 is a sectional view showing an arrangement of lens groups in a wide-angle optical system of Example 12. Each of FIGS. 36A and 36B is an aberration diagram of lens groups in a wide-angle optical system in Example 12.

The wide-angle optical system 1L of Example 12 has a two-component structure of positive-positive components which includes, as shown in FIG. 16, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1L of Example 12, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1L of Example 12 will be shown below.

Numerical Example 12

Unit mm

Surface data

| Surface Number | r | d | nd | vd |
|---|---|---|---|---|
| Object plane | ∞ | ∞ | | |
| 1 | 16.088 | 1.400 | 1.81600 | 46.55 |
| 2 | 4.205 | 2.861 | | |
| 3* | 145.176 | 1.000 | 1.53048 | 55.72 |
| 4* | 1.009 | 1.105 | | |
| 5* | 1.835 | 2.337 | 1.62090 | 24.44 |
| 6* | −4.093 | 0.490 | | |
| 7(Stop) | ∞ | 0.580 | | |
| 8* | 3.166 | 1.706 | 1.53048 | 55.72 |
| 9* | −2.092 | 0.500 | | |
| 10 | ∞ | 0.500 | 1.51680 | 64.20 |
| 11 | ∞ | 0.500 | | |
| Image plane | ∞ | | | |

Aspheric surface data

Third surface

K = −5.0000e+000, A4 = −1.7796e−003, A6 = −7.4829e−005,
A8 = 1.4634e−005, A10 = 9.4500e−007, A12 = −9.8801e−008
Fourth surface K = −2.0000e+000, A4 = 1.4934e−001, A6 = −8.9554e−002,
A8 = 2.3089e−002, A10 = −1.1566e−003, A12 = −2.6233e−004
Fifth surface K = 0.0000e+000, A4 = −1.2787e−002, A6 = −2.5416e−002,
A8 = 4.8999e−003, A10 = 7.7868e−004, A12 = −5.8450e−004
Sixth surface K = 0.0000e+000, A4 = 8.1740e−003, A6 = −6.4806e−003,
A8 = −4.4905e−003, A10 = 3.3276e−003, A12 = −4.7852e−004
Eighth surface K = 0.0000e+000, A4 = −4.9925e−002, A6 = 7.2763e−002,
A8 = −8.0620e−002, A10 = 4.7746e−002, A12 = −1.0609e−002
Ninth surface K = −2.0000e+000, A4 = −2.1696e−003, A6 = 2.6139e−002,
A8 = −3.1309e−003, A10 = −4.3895e−003, A12 = 1.5380e−003

Various types of data

| | |
|---|---|
| Focal length | 0.963 |
| F number | 2.797 |
| Half angle of view | 103.708 |
| Image height | 2.068 |
| Total lens length | 12.849 |
| BF | 1.370 |

Aberrations including spherical aberration (sine condition), astigmatism, distortion and lateral aberration in wide-angle optical system 1L of Example 12 under the aforesaid lens arrangement and structure are shown in FIGS. 36A and 36B.

Example 13

FIG. 17 is a sectional view showing an arrangement of lens groups in a wide-angle optical system of Example 13. Each of FIGS. 37A and 37B is an aberration diagram of lens groups in a wide-angle optical system in Example 13.

The wide-angle optical system 1M of Example 13 is has a two-component structure of positive-positive components which includes, as shown in FIG. 17, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1M of Example 13, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1M of Example 13 will be shown below.

Numerical Example 13

Unit mm

Surface data

| Surface Number | r | d | nd | vd |
|---|---|---|---|---|
| Object plane | ∞ | ∞ | | |
| 1 | 15.285 | 1.076 | 1.80420 | 46.49 |
| 2 | 4.371 | 2.835 | | |
| 3* | 10.000 | 1.000 | 1.53048 | 55.72 |
| 4* | 0.955 | 1.257 | | |
| 5* | 2.039 | 2.757 | 1.63200 | 23.41 |
| 6* | −3.690 | 0.375 | | |
| 7(Stop) | ∞ | 0.682 | | |
| 8* | 4.609 | 1.522 | 1.53048 | 55.72 |
| 9* | −2.124 | 0.679 | | |
| 10 | ∞ | 0.500 | 1.51680 | 64.20 |
| 11 | ∞ | 0.500 | | |
| Image plane | ∞ | | | |

Aspheric surface data

Third surface

K = −1.2923e+001, A4 = −7.2249e−003, A6 = 2.8311e−004,
A8 = 1.8963e−005, A10 = −5.9761e−007, A12 = −4.4340e−008
Fourth surface K = −2.0000e+000, A4 = 1.8628e−001, A6 = −1.0117e−001,
A8 = 2.1556e−002, A10 = −1.1189e−003, A12 = −1.1522e−004
Fifth surface K = 0.0000e+000, A4 = −7.4072e−003, A6 = −1.5642e−002,
A8 = 7.4547e−004, A10 = 0.0000e+000, A12 = 0.0000e+000
Sixth surface K = 0.0000e+000, A4 = 2.3906e−003, A6 = −6.7022e−003,
A8 = 4.5067e−003, A10 = 0.0000e+000, A12 = 0.0000e+000

-continued

Unit mm

Eighth surface

K = 0.0000e+000, A4 = −7.9528e−002, A6 = 1.1752e−001,
A8 = −1.2420e−001, A10 = 7.0527e−002, A12 = −1.5163e−002
Ninth surface K = −2.0000e+000, A4 = −3.8524e−002, A6 = 2.3014e−002,
A8 = 4.1851e−004, A10 = −4.8948e−003, A12 = 1.5599e−003

Various types of data

| | |
|---|---|
| Focal length | 1.017 |
| F number | 2.802 |
| Half angle of view | 103.831 |
| Image height | 2.068 |
| Total lens length | 13.061 |
| BF | 1.558 |

Aberrations including spherical aberration (sine condition), astigmatism, distortion and lateral aberration in wide-angle optical system 1M of Example 13 under the aforesaid lens arrangement and structure are shown in FIGS. 37A and 37B.

Example 14

FIG. 18 is a sectional view showing an arrangement of lens groups in a wide-angle optical system of Example 14. Each of FIGS. 38A and 38B is an aberration diagram of lens groups in a wide-angle optical system in Example 14.

The wide-angle optical system 1N of Example 14 has a two-component structure of positive-positive components which includes, as shown in FIG. 18, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1N of Example 14, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1N of Example 14 will be shown below.

Numerical Example 14

Unit mm

Surface data

| Surface Number | r | d | nd | vd |
|---|---|---|---|---|
| Object plane | ∞ | ∞ | | |
| 1 | 14.617 | 1.400 | 1.83400 | 37.35 |
| 2 | 4.061 | 3.011 | | |
| 3* | 14.980 | 1.000 | 1.53048 | 55.72 |
| 4* | 0.982 | 1.281 | | |
| 5* | 1.868 | 1.786 | 1.63450 | 23.90 |
| 6* | −6.594 | 0.529 | | |
| 7 (Stop) | ∞ | 0.732 | | |
| 8* | 3.117 | 1.607 | 1.53048 | 55.72 |
| 9* | −1.562 | 0.500 | | |
| 10 | ∞ | 0.500 | 1.51680 | 64.20 |
| 11 | ∞ | 0.500 | | |
| Image plane | ∞ | | | |

Aspheric surface data

Third surface

K = −3.0000e+001, A4 = −3.2061e−003, A6 = −2.1451e−004,
A8 = 1.8572e−005, A10 = 1.4226e−006, A12 = −1.1201e−007
Fourth surface K = −2.0000e+000, A4 = 1.6697e−001, A6 = −8.8464e−002,
A8 = 2.0375e−002, A10 = −1.4067e−003, A12 = −9.5828e−005
Fifth surface K = 0.0000e+000, A4 = 4.2952e−003, A6 = −2.0660e−002,
A8 = 5.8774e−003, A10 = 2.4104e−004, A12 = −4.0028e−004
Sixth surface K = 0.0000e+000, A4 = 2.5865e−002, A6 = −5.4384e−004,
A8 = −1.4984e−003, A10 = −2.8890e−003, A12 = 1.4917e−003
Eighth surface K = 0.0000e+000, A4 = −6.2949e−002, A6 = 7.4237e−002,
A8 = −6.1957e−002, A10 = 2.5910e−002, A12 = −4.6203e−003
Ninth surface K = −2.0000e+000, A4 = −7.9903e−003, A6 = 1.9876e−002,
A8 = 1.1896e−003, A10 = −3.5518e−003, A12 = 5.8601e−004

Various types of data

| | |
|---|---|
| Focal length | 0.860 |
| F number | 2.785 |
| Half angle of view | 104.045 |
| Image height | 2.068 |
| Total lens length | 12.709 |
| BF | 1.363 |

Aberrations including spherical aberration (sine condition), astigmatism, distortion and lateral aberration in wide-angle optical system 1M of Example 14 under the aforesaid lens arrangement and structure are shown in FIGS. 38A and 38B.

Example 15

FIG. 19 is a sectional view showing an arrangement of lens groups in a wide-angle optical system of Example 15. Each of FIGS. 39A and 39B is an aberration diagram of lens groups in a wide-angle optical system in Example 15.

The wide-angle optical system 1O of Example 15 has a two-component structure of positive-positive components which includes, as shown in FIG. 19, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1O of Example 15, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1O of Example 15 will be shown below.

Numerical Example 15

| Unit mm | | | | |
|---|---|---|---|---|
| Surface data | | | | |
| Surface Number | r | d | nd | vd |
| Object plane | ∞ | ∞ | | |
| 1 | 15.303 | 1.400 | 1.80420 | 46.49 |
| 2 | 4.089 | 2.796 | | |
| 3* | 28.709 | 1.000 | 1.53048 | 55.72 |
| 4* | 1.031 | 1.354 | | |
| 5* | 1.845 | 1.740 | 1.60700 | 27.10 |
| 6* | −5.314 | 0.522 | | |
| 7 (Stop) | ∞ | 0.792 | | |
| 8* | 3.186 | 1.545 | 1.53048 | 55.72 |
| 9* | −1.760 | 0.500 | | |
| 10 | ∞ | 0.500 | 1.51680 | 64.20 |
| 11 | ∞ | 0.500 | | |
| Image plane | ∞ | | | |

Aspheric surface data

Third surface

K = −3.0000e+001, A4 = −2.1351e−003, A6 = −1.7353e−004,
A8 = 1.1791e−005, A10 = 8.6785e−007, A12 = −6.5507e−008
Fourth surface K = −2.0727e+000, A4 = 1.6966e−001, A6 = −8.9161e−002,
A8 = 2.0913e−002, A10 = −1.4759e−003, A12 = −1.0723e−004
Fifth surface K = 0.0000e+000, A4 = 2.0822e−004, A6 = −2.4385e−002,
A8 = 6.2483e−003, A10 = 9.1390e−004, A12 = −6.6165e−004
Sixth surface K = 0.0000e+000, A4 = 1.6334e−002, A6 = 5.5332e−003,
A8 = −7.8608e−003, A10 = 1.1285e−003, A12 = 2.4314e−004

-continued

| Unit mm |
|---|
| Eighth surface |

K = 0.0000e+000, A4 = −7.7296e−002, A6 = 8.5276e−002,
A8 = −6.4871e−002, A10 = 2.4873e−002, A12 = −4.1132e−003
Ninth surface K = −2.0000e+000, A4 = −2.8534e−002, A6 = 2.7877e−002,
A8 = 9.9006e−004, A10 = −4.0566e−003, A12 = 6.9885e−004

| Various types of data | |
|---|---|
| Focal length | 0.905 |
| F number | 2.789 |
| Half angle of view | 104.349 |
| Image height | 2.068 |
| Total lens length | 12.512 |
| BF | 1.363 |

Aberrations including spherical aberration (sine condition), astigmatism, distortion and lateral aberration in wide-angle optical system 1O of Example 15 under the aforesaid lens arrangement and structure are shown in FIGS. 39A and 39B.

Example 16

FIG. 20 is a sectional view showing an arrangement of lens groups in a wide-angle optical system of Example 16. Each of FIGS. 40A and 40B is an aberration diagram of lens groups in a wide-angle optical system in Example 16.

The wide-angle optical system 1P of Example 16 has a two-component structure of positive-positive components which includes, as shown in FIG. 20, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1P of Example 16, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1P of Example 16 will be shown below.

Numerical Example 16

| Unit mm | | | | |
|---|---|---|---|---|
| Surface data | | | | |
| Surface Number | r | d | nd | vd |
| Object plane | ∞ | ∞ | | |
| 1 | 14.951 | 1.400 | 1.80420 | 46.49 |
| 2 | 4.018 | 3.116 | | |
| 3* | 15.445 | 1.000 | 1.53048 | 55.72 |
| 4* | 0.996 | 1.356 | | |
| 5* | 1.856 | 1.801 | 1.60280 | 28.30 |
| 6* | −4.704 | 0.537 | | |
| 7 (Stop) | ∞ | 0.758 | | |
| 8* | 3.403 | 1.510 | 1.53048 | 55.72 |
| 9* | −1.756 | 0.500 | | |
| 10 | ∞ | 0.500 | 1.51680 | 64.20 |
| 11 | ∞ | 0.500 | | |
| Image plane | ∞ | | | |

Aspheric surface data

Third surface

K = −2.9172e+001, A4 = −2.8984e−003, A6 = −1.9962e−004,
A8 = 1.2592e−005, A10 = 9.2223e−007, A12 = −5.2269e−008
Fourth surface K = −2.0000e+000, A4 = 1.6709e−001, A6 = −8.9139e−002,
A8 = 2.0888e−002, A10 = −1.5288e−003, A12 = −8.6482e−005
Fifth surface K = 0.0000e+000, A4 = 8.1748e−004, A6 = −2.3735e−002,
A8 = 5.8736e−003, A10 = 9.5558e−004, A12 = −6.1595e−004
Sixth surface K = 0.0000e+000, A4 = 1.9053e−002, A6 = 6.2215e−003,
A8 = −8.4784e−003, A10 = 1.5257e−003, A12 = 1.8851e−004
Eighth surface K = 0.0000e+000, A4 = −6.9402e−002, A6 = 7.8209e−002,
A8 = −6.7923e−002, A10 = 2.7912e−002, A12 = −4.4255e−003
Ninth surface K = −2.0000e+000, A4 = −1.9873e−002, A6 = 2.9005e−002,
A8 = −1.7074e−003, A10 = −4.7814e−003, A12 = 1.1174e−003

| Various types of data | |
|---|---|
| Focal length | 0.880 |
| F number | 2.784 |
| Half angle of view | 104.051 |
| Image height | 2.068 |
| Total lens length | 12.839 |
| BF | 1.362 |

Aberrations including spherical aberration (sine condition), astigmatism, distortion and lateral aberration in wide-angle optical system 1P of Example 16 under the aforesaid lens arrangement and structure are shown in FIGS. 40A and 40B.

Example 17

FIG. 21 is a sectional view showing an arrangement of lens groups in a wide-angle optical system of Example 17. Each of FIGS. 41A and 41B is an aberration diagram of lens groups in a wide-angle optical system in Example 17.

The wide-angle optical system 1Q of Example 17 is has a two-component structure of positive-positive components which includes, as shown in FIG. 21, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1Q of Example 17, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1Q of Example 17 will be shown below.

Numerical Example 17

| Unit mm | | | | |
|---|---|---|---|---|
| Surface data | | | | |
| Surface Number | r | d | nd | vd |
| Object plane | ∞ | ∞ | | |
| 1 | 16.431 | 1.233 | 1.80420 | 46.49 |
| 2 | 4.389 | 3.274 | | |
| 3* | 6.543 | 1.000 | 1.53048 | 55.72 |
| 4* | 1.133 | 1.864 | | |
| 5* | 2.165 | 1.622 | 1.63200 | 23.41 |
| 6* | −6.485 | 0.764 | | |
| 7 (Stop) | ∞ | 0.549 | | |
| 8* | 2.537 | 1.135 | 1.53048 | 55.72 |
| 9* | −5.774 | 0.741 | | |
| 10 | ∞ | 0.500 | 1.51680 | 64.20 |
| 11 | ∞ | 0.500 | | |
| Image plane | ∞ | | | |

Aspheric surface data

Third surface

K = −2.5804e+001, A4 = −6.4905e−003, A6 = 3.6426e−004,
A8 = 1.3427e−005, A10 = −1.2708e−006, A12 = 7.3342e−009
Fourth surface K = −3.3384e+000, A4 = 1.5983e−001, A6 = −7.9551e−002,
A8 = 1.9165e−002, A10 = −1.7730e−003, A12 = 1.8885e−005
Fifth surface K = 0.0000e+000, A4 = −1.8953e−002, A6 = −7.5001e−003,
A8 = 0.0000e+000, A10 = 0.0000e+000, A12 = 0.0000e+000
Sixth surface K = 0.0000e+000, A4 = −8.1454e−003, A6 = −9.3080e−004,
A8 = 3.6177e−004, A10 = 0.0000e+000, A12 = 0.0000e+000

-continued

Unit mm

Eighth surface

K = 0.0000e+000, A4 = −6.0740e−002, A6 = 1.0765e−001,
A8 = −1.3288e−001, A10 = 8.0788e−002, A12 = −1.8140e−002
Ninth surface K = −2.0000e+000, A4 = −9.7980e−003, A6 = 4.3295e−002,
A8 = −1.4020e−002, A10 = −5.1790e−003, A12 = 2.9976e−003

Various types of data

| | |
|---|---|
| Focal length | 1.083 |
| F number | 2.816 |
| Half angle of view | 105.096 |
| Image height | 2.068 |
| Total lens length | 13.065 |
| BF | 1.624 |

Aberrations including spherical aberration (sine condition), astigmatism, distortion and lateral aberration in wide-angle optical system 1Q of Example 17 under the aforesaid lens arrangement and structure are shown in FIGS. 41A and 41B.

Example 18

FIG. 22 is a sectional view showing an arrangement of lens groups in a wide-angle optical system of Example 18. Each of FIGS. 42A and 42B is an aberration diagram of lens groups in a wide-angle optical system in Example 18.

The wide-angle optical system 1R of Example 18 is has a two-component structure of positive-positive components which includes, as shown in FIG. 22, a front lens group (Gr1) having a positive optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1R of Example 18, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and the second lens L2 is made, for example, of a resin material.

The second lens group (Gr2) is composed of a biconvex positive lens (fourth lens L4). The fourth lens L4 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1R of Example 18 will be shown below.

Numerical Example 18

Unit mm

Surface data

| Surface Number | r | d | nd | vd |
|---|---|---|---|---|
| Object plane | ∞ | ∞ | | |
| 1 | 15.904 | 1.400 | 1.88300 | 40.81 |
| 2 | 4.450 | 2.690 | | |
| 3* | −93.715 | 1.000 | 1.53048 | 55.72 |
| 4* | 1.037 | 1.060 | | |
| 5* | 2.407 | 1.433 | 2.00170 | 20.64 |
| 6* | 150.420 | 0.643 | | |
| 7 (Stop) | ∞ | 0.539 | | |
| 8* | 2.865 | 1.747 | 1.53048 | 55.72 |
| 9* | −1.239 | 0.500 | | |
| 10 | ∞ | 0.500 | 1.51680 | 64.20 |
| 11 | ∞ | 0.500 | | |
| Image plane | ∞ | | | |

Aspheric surface data

Third surface

K = −5.0000e+000, A4 = 7.2028e−005, A6 = −4.7541e−005,
A8 = −4.9807e−006, A10 = 1.0917e−006, A12 = −4.1925e−008
Fourth surface K = −2.6295e+000, A4 = 1.6884e−001, A6 = −9.2907e−002,
A8 = 2.4144e−002, A10 = −1.4670e−003, A12 = −2.3485e−004
Fifth surface K = 0.0000e+000, A4 = −6.6165e−003, A6 = −8.9634e−003,
A8 = 1.1261e−003, A10 = 1.8961e−003, A12 = −5.1884e−004
Sixth surface K = 0.0000e+000, A4 = −6.0750e−003, A6 = −4.9882e−004,
A8 = 1.9403e−002, A10 = −1.4315e−002, A12 = 2.7769e−003
Eighth surface K = 0.0000e+000, A4 = −9.7847e−002, A6 = 1.3276e−001,
A8 = −1.0979e−001, A10 = 4.5566e−002, A12 = −7.8168e−003
Ninth surface K = −2.0000e+000, A4 = −9.8150e−003, A6 = −9.7246e−003,
A8 = 2.4119e−002, A10 = −9.2684e−003, A12 = 1.0023e−003

Various types of data

| | |
|---|---|
| Focal length | 0.855 |
| F number | 2.785 |
| Half angle of view | 103.981 |
| Image height | 2.068 |
| Total lens length | 11.873 |
| BF | 1.362 |

Aberrations including spherical aberration (sine condition), astigmatism, distortion and lateral aberration in wide-angle optical system 1R of Example 18 under the aforesaid lens arrangement and structure are shown in FIGS. 42A and 42B.

Example 19

FIG. 23 is a sectional view showing an arrangement of lens groups in a wide-angle optical system of Example 19. Each of FIGS. 43A and 43B is an aberration diagram of lens groups in a wide-angle optical system in Example 19.

Wide-angle optical system 1S of Example 19 has a two-component structure of negative-positive components which includes, as shown in FIG. 23, a front lens group (Gr1) having a negative optical power as the whole lens group, aperture stop ST for adjusting a light amount, and a rear lens group (Gr2) having a positive optical power as the whole lens group, which are arranged in order from the object side to the image side.

More specifically, in the wide-angle optical system 1S of Example 19, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, and of a biconvex positive lens (third lens L3). Each of the second lens L2 and the third lens L3 has opposing aspheric surfaces, and is made, for example, of a resin material.

The second lens group (Gr2) is composed of a biconvex positive lens (fourth lens L4), a negative meniscus lens (fifth lens L5) whose convex surface faces the image side and of a biconvex positive lens (sixth lens L6). Each of the fourth to the sixth lenses L4, L5 and L6 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1S of Example 19 will be shown below.

Numerical Example 19

| Unit mm | | | | |
|---|---|---|---|---|
| Surface data | | | | |
| Surface Number | r | d | nd | vd |
| Object plane | ∞ | ∞ | | |
| 1 | 10.286 | 0.900 | 1.83481 | 42.72 |
| 2 | 2.300 | 1.638 | | |
| 3* | 38.903 | 0.800 | 1.53048 | 55.72 |
| 4* | 0.812 | 0.416 | | |
| 5* | 1.623 | 1.392 | 1.63200 | 23.41 |
| 6* | −4.562 | 0.561 | | |
| 7 (Stop) | ∞ | 0.132 | | |
| 8* | 6.361 | 0.921 | 1.53048 | 55.72 |
| 9* | −1.232 | 0.171 | | |
| 10* | −1.225 | 0.800 | 1.63200 | 23.41 |
| 11* | −3.876 | 0.100 | | |
| 12* | 3.352 | 0.800 | 1.53048 | 55.72 |
| 13* | −3.490 | 1.400 | | |
| 14 | ∞ | 0.500 | 1.51680 | 64.20 |
| 15 | ∞ | 0.100 | | |
| Image plane | ∞ | | | |

Aspheric surface data

Third surface

K = 2.9236e+002, A4 = −3.1371e−002, A6 = 2.2308e−003,
A8 = 5.2741e−004, A10 = −1.5873e−005, A12 = −1.1768e−005
Fourth surface K = −1.0000e+000, A4 = 1.7580e−002, A6 = −1.7156e−002,
A8 = −3.7365e−003, A10 = −5.6654e−003, A12 = 2.7674e−003
Fifth surface K = 0.0000e+000, A4 = 3.8489e−002, A6 = 7.7933e−003,
A8 = −7.6891e−003, A10 = −2.8251e−003, A12 = 0.0000e+000

-continued

| Unit mm |
|---|
| Sixth surface |

K = 0.0000e+000, A4 = 4.9059e−002, A6 = 2.0210e−002,
A8 = −8.2269e−004, A10 = −1.0916e−002, A12 = 0.0000e+000
Eighth surface K = 0.0000e+000, A4 = 2.0052e−002, A6 = −1.8626e−001,
A8 = −4.0585e−001, A10 = 4.0853e−001, A12 = 0.0000e+000
Ninth surface K = 0.0000e+000, A4 = 8.8455e−002, A6 = −2.7312e−001,
A8 = −2.4511e−001, A10 = 2.9471e−001, A12 = 0.0000e+000
Tenth surface K = 0.0000e+000, A4 = 6.2956e−002, A6 = −1.5499e−001,
A8 = −2.8720e−001, A10 = 4.2477e−001, A12 = 0.0000e+000
Eleventh surface K = 0.0000e+000, A4 = −1.0227e−001, A6 = 3.3583e−002,
A8 = 2.6008e−002, A10 = −1.4902e−002, A12 = 0.0000e+000
Twelfth surface K = 0.0000e+000, A4 = 1.1593e−002, A6 = 4.0494e−003,
A8 = −1.0841e−003, A10 = 5.4889e−004, A12 = −1.1743e−003
Thirteenth surface K = −5.4212e−001, A4 = 1.7965e−001, A6 = −3.1584e−002,
A8 = 8.0520e−004, A10 = −9.2598e−005, A12 = −1.0121e−004

| Various types of data | |
|---|---|
| Focal length | 1.010 |
| F number | 2.828 |
| Half angle of view | 104.183 |
| Image height | 2.110 |
| Total lens length | 10.503 |
| BF | 1.872 |

Aberrations including spherical aberration (sine condition), astigmatism, distortion and lateral aberration in wide-angle optical system 1S of Example 19 under the aforesaid lens arrangement and structure are shown in FIGS. 43A and 43B.

Example 20

FIG. 24 is a sectional view showing an arrangement of lens groups in a wide-angle optical system of Example 20. Each of FIGS. 44A and 44B is an aberration diagram of lens groups in a wide-angle optical system in Example 20.

Wide-angle optical system 1T of Example 20 has a two-component structure of positive-positive components which includes, as shown in FIG. 24, a front lens group (Gr1) having a positive optical power as the whole lens group, aperture stop ST for adjusting an amount of light, and a rear lens group (Gr2) having a positive optical power as the whole lens group, which are arranged in order from the object side to the image side.

More specifically, in the wide-angle optical system 1T of Example 20, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a biconcave negative lens (second lens L2), a biconvex positive lens (third lens L3) and of a positive meniscus lens (fourth lens L4) whose convex surface faces the image side. Each of the second to the fourth lenses L2, L3 and L4 has opposing aspheric surfaces, and is made, for example, of a resin material.

The second lens group (Gr2) is composed of a biconvex positive lens (fifth lens L5) and a negative meniscus lens (sixth lens L6) whose convex surface faces the image side. Each of the fifth lens L5 and the sixth lens L6 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1T of Example 20 will be shown below.

Numerical Example 20

| Unit mm | | | | |
|---|---|---|---|---|
| Surface data | | | | |
| Surface Number | r | d | nd | vd |
| Object plane | ∞ | ∞ | | |
| 1 | 11.656 | 0.900 | 1.83481 | 42.72 |
| 2 | 2.952 | 2.056 | | |
| 3* | −10.397 | 0.800 | 1.53048 | 55.72 |
| 4* | 1.182 | 0.435 | | |
| 5* | 1.808 | 1.498 | 1.63200 | 23.41 |
| 6* | −4.493 | 0.222 | | |
| 7* | −3.735 | 0.800 | 1.53048 | 55.72 |
| 8* | −3.285 | 0.000 | | |
| 9 (Stop) | ∞ | 0.195 | | |
| 10* | 135.095 | 1.195 | 1.53048 | 55.72 |
| 11* | −0.806 | 0.100 | | |
| 12* | −1.050 | 0.800 | 1.63200 | 23.41 |
| 13* | −1.688 | 1.400 | | |
| 14 | ∞ | 0.500 | 1.51680 | 64.20 |
| 15 | ∞ | 0.100 | | |
| Image plane | ∞ | | | |

Aspheric surface data

Third surface

K = 5.4000e+000, A4 = 2.1197e−002, A6 = −8.1048e−003,
A8 = 1.1911e−003, A10 = −6.1743e−005

Fourth surface

K = −1.0075e+000, A4 = 1.0270e−001, A6 = −6.6789e−002,
A8 = 7.4458e−003, A10 = 1.4415e−003

Fifth surface

K = 0.0000e+000, A4 = 1.7489e−002, A6 = −1.0330e−002,
A8 = 4.0519e−003, A10 = 0.0000e+000

Sixth surface

K = 0.0000e+000, A4 = 6.7744e−002, A6 = 1.9910e−002,
A8 = 1.3107e−002, A10 = 0.0000e+000

Seventh surface

K = 0.0000e+000, A4 = 1.1942e−001, A6 = −2.2076e−003,
A8 = 2.0294e−002, A10 = 1.8559e−002

Eighth surface

K = 0.0000e+000, A4 = 2.6510e−001, A6 = −1.3237e−001,
A8 = 1.4367e+000, A10 = −2.4886e+000

Tenth surface

K = 0.0000e+000, A4 = 1.7803e−001, A6 = −1.2722e−001,
A8 = 2.6231e−001, A10 = −3.1844e−001

Eleventh surface

K = −2.0000e+000, A4 = −2.5170e−001, A6 = 2.5052e−001,
A8 = −1.2915e−002, A10 = −1.4578e−001

-continued

| Unit mm |
|---|
| Twelfth surface |

K = 0.0000e+000, A4 = −1.6735e−001, A6 = 6.1925e−001,
A8 = −2.9850e−001, A10 = 4.2240e−002

Thirteenth surface

K = 0.0000e+000, A4 = −8.5301e−002, A6 = 1.0428e−001,
A8 = −2.3519e−003, A10 = −5.1011e−003

| Various types of data | |
|---|---|
| Focal length | 0.960 |
| F number | 2.764 |
| Half angle of view | 101.625 |
| Image height | 2.110 |
| Total lens length | 10.835 |
| BF | 1.835 |

Aberrations including spherical aberration (sine condition), astigmatism, distortion and lateral aberration in wide-angle optical system 1T of Example 20 under the aforesaid lens arrangement and structure are shown in FIGS. 44A and 44B.

Example 21

FIG. 45 is a sectional view showing an arrangement of lens groups in a wide-angle optical system of Example 21. Each of FIGS. 48A and 48B is an aberration diagram of lens groups in a wide-angle optical system in Example 21.

Wide-angle optical system 1U of Example 21 has a two-component structure of positive-positive components which includes, as shown in FIG. 45, a front lens group (Gr1) having a positive optical power as the whole lens group, aperture stop ST for adjusting an amount of light, and a rear lens group (Gr2) having a positive optical power as the whole lens group, which are arranged in order from the object side to the image side.

More specifically, in the wide-angle optical system 1U of Example 21, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a negative meniscus lens (second lens L2) whose convex surface faces the object side, a negative meniscus lens (third lens L3) whose convex surface faces the object side and of a positive meniscus lens (fourth lens L4) whose convex surface faces the image side. Each of the second to fourth lenses L2, L3 and L4 has opposing aspheric surfaces, and each of the second and third lenses L2 and L3 is made, for example, of a resin material.

The second lens group (Gr2) is composed of a biconvex positive lens (fifth lens L5). The fifth lens L5 has opposing aspheric surfaces, and is made of, for example, a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1U of Example 21 will be shown below.

Numerical Example 21

Unit mm

Surface data

| Surface Number | r | d | nd | vd |
|---|---|---|---|---|
| Object plane | ∞ | ∞ | | |
| 1 | 16.114 | 1.541 | 1.89800 | 34.01 |
| 2 | 3.963 | 2.337 | | |
| 3* | 4.926 | 0.800 | 1.53048 | 55.72 |
| 4* | 3.158 | 0.173 | | |
| 5* | 2.678 | 0.900 | 1.53048 | 55.72 |
| 6* | 0.662 | 1.019 | | |
| 7* | 2.294 | 1.565 | 2.00170 | 20.64 |
| 8* | 21.978 | 0.728 | | |
| 9 (Stop) | ∞ | 0.441 | | |
| 10* | 4.012 | 1.996 | 1.53048 | 55.72 |
| 11* | −0.832 | 0.500 | | |
| 12 | ∞ | 0.500 | 1.51680 | 64.20 |
| 13 | ∞ | 0.500 | | |
| Image plane | ∞ | | | |

Aspheric surface data

Third surface

K = −6.4360e+000, A4 = −9.5730e−003, A6 = 1.6361e−004,
A8 = 1.7225e−005, A10 = 1.6924e−006, A12 = 1.4303e−007
Fourth surface K = 0.0000e+000, A4 = −2.1902e−003, A6 = 6.0297e−005,
A8 = 1.6131e−005, A10 = 2.1546e−006
Fifth surface K = 0.0000e+000, A4 = 2.1181e−003, A6 = −1.0224e−004,
A8 = −2.5155e−005, A10 = −3.9136e−006
Sixth surface K = −2.1265e+000, A4 = 1.4057e−001, A6 = −9.1253e−002,
A8 = 2.4765e−002, A10 = −1.9462e−003, A12 = −1.1036e−004
Seventh surface K = 0.0000e−000, A4 = −1.2067e−002, A6 = 3.1910e−003,
A8 = −3.8091e−003, A10 = 2.0015e−003, A12 = −3.2495e−004
Eighth surface K = 0.0000e+000, A4 = 1.8176e−002, A6 = −1.1139e−002,
A8 = 2.3137e−002, A10 = −1.4515e−002, A12 = 2.8361e−003
Tenth surface K = 0.0000e+000, A4 = −9.0214e−002, A6 = 2.0175e−001,
A8 = −2.1783e−001, A10 = 1.0648e−001, A12 = −1.7154e−002
Eleventh surface K = −2.0000e+000, A4 = −3.5627e−003, A6 = −4.5454e−002,
A8 = 4.0068e−002, A10 = −1.0784e−002, A12 = 1.1365e−003

Various types of data

| Focal length | 0.599 |
|---|---|
| F number | 2.737 |
| Half angle of view | 101.958 |
| Image height | 2.068 |
| Total lens length | 12.849 |
| BF | 1.349 |

Aberrations including spherical aberration (sine condition), astigmatism, distortion and lateral aberration in wide-angle optical system 1U of Example 21 under the aforesaid lens arrangement and structure are shown in FIGS. 48A and 48B.

Example 22

FIG. 46 is a sectional view showing an arrangement of lens groups in a wide-angle optical system of Example 22. Each of FIGS. 49A and 49B is an aberration diagram of lens groups in a wide-angle optical system in Example 22.

Wide-angle optical system 1V of Example 22 has a two-component structure of positive-positive components which includes, as shown in FIG. 46, a front lens group (Gr1) having a positive optical power as the whole lens group, aperture stop ST for adjusting an amount of light, and a rear lens group (Gr2) having a positive optical power as the whole lens group, which are arranged in order from the object side to the image side.

More specifically, in the wide-angle optical system 1V of Example 22, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a biconcave negative lens (second lens L2), a biconvex positive lens (third lens L3) and of a biconvex positive lens (fourth lens L4). Each of the second to fourth lenses L2, L3 and L4 has opposing aspheric surfaces, and is made, for example, of a resin material.

The second lens group (Gr2) is composed of a positive meniscus lens (fifth lens L5) whose convex surface faces the image side, a biconcave negative lens (sixth lens L6) and of a biconvex positive lens (seventh lens L7). Each of the fifth through the seventh lenses L5, L6 and L7 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1V of Example 22 will be shown below.

Numerical Example 22

Unit mm

Surface data

| Surface Number | r | d | nd | vd |
|---|---|---|---|---|
| Object plane | ∞ | ∞ | | |
| 1 | 9.515 | 0.900 | 1.83481 | 42.72 |
| 2 | 2.349 | 2.056 | | |
| 3* | −6.196 | 1.009 | 1.53048 | 55.72 |
| 4* | 1.576 | 0.569 | | |
| 5* | 2.751 | 1.971 | 1.63200 | 23.41 |
| 6* | −39.794 | 0.208 | | |
| 7* | 38.176 | 1.053 | 1.53048 | 55.72 |
| 8* | −1.126 | 0.000 | | |
| 9 (Stop) | ∞ | 0.322 | | |
| 10* | −5.579 | 1.053 | 1.53048 | 55.72 |
| 11* | −1.113 | 0.100 | | |
| 12* | −1.122 | 1.032 | 1.63200 | 23.41 |
| 13* | 12.081 | 0.100 | | |
| 14* | 3.788 | 1.111 | 1.53048 | 55.72 |
| 15* | −11.370 | 0.400 | | |
| 16 | ∞ | 0.500 | 1.51680 | 64.20 |
| 17 | ∞ | 0.100 | | |

-continued

Unit mm

| | |
|---|---|
| Image plane | ∞ |

Aspheric surface data

Third surface

K = −5.4000e+000, A4 = 2.0043e−002, A6 = −7.8511e−003,
A8 = 1.1954e−003, A10 = −6.7479e−005
Fourth surface K = −1.3637e+000, A4 = 9.6625e−002, A6 = −6.0707e−002,
A8 = 7.6455e−003, A10 = 2.5856e−003
Fifth surface K = 0.0000e+000, A4 = 1.4884e−002, A6 = −1.4574e−002,
A8 = 5.3641e−003, A10 = 0.0000e+000
Sixth surface K = 0.0000e+000, A4 = 1.1058e−001, A6 = 4.8626e−002,
A8 = 2.7054e−002, A10 = 0.0000e+00
Seventh surface K = 0.0000e+000, A4 = 6.9286e−002, A6 = −5.3877e−003,
A8 = −1.9094e−002, A10 = −5.5597e−002
Eighth surface K = 0.0000e+000, A4 = 2.3802e−001, A6 = −2.6201e−001,
A8 = 2.0775e−001, A10 = 1.9167e−001
Tenth surface K = 0.0000e+000, A4 = 2.0877e−001, A6 = −4.5908e−001,
A8 = 1.2497e−001, A10 = 2.0095e−001
Eleventh surface K = −2.0000e+000, A4 = −2.7392e−001, A6 = 2.3718e−001,
A8 = −5.7976e−002, A10 = −7.8424e−002
Twelfth surface K = 0.0000e+000, A4 = −1.7291e−001, A6 = 6.1696e−001,
A8 = −2.8678e−001, A10 = 1.0266e−002
Thirteenth surface K = 0.0000e+000, A4 = −4.5045e−002, A6 = 1.0183e−001,
A8 = −9.3934e−003, A10 = −9.6520e−003
Fourteenth surface K = 0.0000e+000, A4 = −3.2399e−002, A6 = 2.2703e−003,
A8 = 4.0425e−003, A10 = −6.0866e−004
Fifteen surface K = 0.0000e+000, A4 = −1.7582e−002, A6 = 2.6262e−003,
A8 = −2.7336e−003, A10 = 7.6944e−004

Various types of data

| | |
|---|---|
| Focal length | 1.073 |
| F number | 4.025 |
| Half angle of view | 98.252 |
| Image height | 2.110 |
| Total lens length | 12.316 |
| BF | 0.833 |

Aberrations including spherical aberration (sine condition), astigmatism, distortion and lateral aberration in wide-angle optical system 1V of Example 22 under the aforesaid lens arrangement and structure are shown in FIGS. 49A and 49B.

Example 23

FIG. 47 is a sectional view showing an arrangement of lens groups in a wide-angle optical system of Example 23. Each of FIGS. 50A and 50B is an aberration diagram of lens groups in a wide-angle optical system in Example 23.

Wide-angle optical system 1W of Example 23 has a two-component structure of positive-positive components which includes, as shown in FIG. 47, a front lens group (Gr1) having a positive optical power as the whole lens group, aperture stop ST for adjusting an amount of light, and a rear lens group (Gr2) having a positive optical power as the whole lens group, which are arranged in order from the object side to the image side.

More specifically, in the wide-angle optical system 1W of Example 23, lens groups (Gr1 and Gr2) as the front lens group and the rear lens group are arranged in order from the object side to the image side and are structured as follows.

The first lens group (Gr1) is composed of a negative meniscus lens (first lens L1) whose convex surface faces the object side, a biconcave negative lens (second lens L2) and of a biconvex positive lens (third lens L3). Each of the second and the third lenses L2 and L3 has opposing aspheric surfaces, and is made, for example, of a resin material.

The second lens group (Gr2) is composed of a biconvex positive lens (fourth lens L4) and a negative meniscus lens (fifth lens L5) whose convex surface faces the image side. Each of the fourth and the fifth lenses L4 and L5 has opposing aspheric surfaces, and is made, for example, of a resin material.

Then, on the image side of the lens group (Gr2) as the rear lens group, there is arranged a light-receiving surface of image pickup element SR through parallel flat plate FT serving as a filter. The parallel flat plate FT includes various types of optical filters and a cover glass of the image pickup element.

Construction data of respective lenses in wide-angle optical system 1W of Example 23 will be shown below.

Numerical Example 23

Unit mm

Surface data

| Surface Number | r | d | nd | vd |
|---|---|---|---|---|
| Object plane | ∞ | ∞ | | |
| 1 | 10.907 | 0.900 | 1.83481 | 42.72 |
| 2 | 2.970 | 2.090 | | |
| 3* | −5.962 | 0.800 | 1.53048 | 55.72 |
| 4* | 1.227 | 0.532 | | |
| 5* | 1.718 | 1.512 | 1.63200 | 23.41 |
| 6* | −23.530 | 0.563 | | |
| 7 (Stop) | ∞ | 0.185 | | |
| 8* | 2.259 | 1.235 | 1.53048 | 55.72 |
| 9* | −1.146 | 0.104 | | |
| 10* | −1.177 | 0.835 | 1.63200 | 23.41 |
| 11* | −1.734 | 1.405 | | |
| 12 | ∞ | 0.500 | 1.51680 | 64.20 |
| 13 | ∞ | 0.100 | | |
| Image plane | ∞ | | | |

Aspheric surface data

Third surface

K = −6.4360e+000, A4 = −9.5730e−003, A6 = 1.6361e−004,
A8 = 1.7225e−005, A10 = 1.6924e−006, A12 = 1.4303e−007
Fourth surface K = 0.0000e+000, A4 = −2.1902e−003, A6 = 6.0297e−005,
A8 = 1.6131e−005, A10 = 2.1546e−006
Fifth surface K = 0.0000e+000, A4 = 2.1181e−003, A6 = −1.0224e−004,
A8 = −2.5155e−005, A10 = −3.9136e−006

-continued

Unit mm

Sixth surface

K = −2.1265e+000, A4 = 1.4057e−001, A6 = −9.1253e−002,
A8 = 2.4765e−002, A10 = −1.9462e−003, A12 = −1.1036e−004
Seventh surface K = 0.0000e+000, A4 = −1.2067e−002, A6 = 3.1910e−003,
A8 = −3.8091e−003, A10 = 2.0015e−003, A12 = −3.2495e−004
Eighth surface K = 0.0000e+000, A4 = 1.8176e−002, A6 = −1.1139e−002,
A8 = 2.3137e−002, A10 = −1.4515e−002, A12 = 2.8361e−003
Tenth surface K = 0.0000e+000, A4 = −9.0214e−002, A6 = 2.0175e−001,
A8 = −2.1783e−001, A10 = 1.0648e−001, A12 = −1.7154e−002
Eleventh surface K = −2.0000e+000, A4 = −3.5627e−003, A6 = −4.5454e−002,
A8 = 4.0068e−002, A10 = −1.0784e−002, A12 = 1.1365e−003
Third surface K = −5.4000e+000, A4 = 2.8771e−002, A6 = −7.8527e−003,
A8 = 9.4066e−004, A10 = −4.4711e−005
Fourth surface K = −6.8153e−001, A4 = 1.4988e−001, A6 = −3.2758e−002,
A8 = −7.1048e−003, A10 = −9.5885e−004
Fifth surface K = 0.0000e+000, A4 = 4.3673e−002, A6 = −9.2153e−003,
A8 = 5.5391e−003, A10 = 0.0000e+000
Sixth surface K = 0.0000e+000, A4 = 6.3011e−002, A6 = −5.1472e−003,
A8 = 4.8585e−002, A10 = 0.0000e+000

-continued

Unit mm

Eighth surface

K = 0.0000e+000, A4 = 4.4922e−003, A6 = 2.6549e−002,
A8 = 1.3687e−002,
A10 = −5.5592e−002
Ninth surface K = −2.0000e+000, A4 = −2.3805e−001, A6 = 3.0744e−001,
A8 = −2.4977e−001, A10 = 1.2940e−002
Tenth surface K = 0.0000e+000, A4 = −2.9744e−001, A6 = 5.1914e−001,
A8 = −2.5916e−001, A10 = −3.5720e−002
Eleventh surface K = 0.0000e+000, A4 = −6.5775e−002, A6 = 6.7541e−002,
A8 = 1.7684e−002, A10 = −7.9193e−003

| Various types of data | |
|---|---|
| Focal length | 1.041 |
| F number | 2.775 |
| Half angle of view | 101.046 |
| Image height | 2.110 |
| Total lens length | 10.584 |
| BF | 1.829 |

Aberrations including spherical aberration (sine condition), astigmatism, distortion and lateral aberration in wide-angle optical system 1W of Example 23 under the aforesaid lens arrangement and structure are shown in FIGS. 50A and 50B.

Table 1 through Table 3 show numerical values acquired by using the aforesaid conditional expressions (1) to (13) for variable power optical systems 1A-1W in the aforesaid Examples 1 through 23.

TABLE 1

Table of numerical values of conditional expressions

| | Example 1 | Example 2 | Example 3 | Example 4 | Example 5 | Example 6 | Example 7 | Example 8 | Example 9 | Example 10 |
|---|---|---|---|---|---|---|---|---|---|---|
| **(1) vdp | 23.9 | 23.9 | 26.1 | 23.4 | 23.4 | 23.4 | 23.4 | 20.6 | 24.8 | 18.4 |
| **(2) |Hp|/Rp | 0.81 | 0.83 | 0.80 | 0.80 | 0.77 | 0.76 | 0.81 | 0.87 | 0.79 | 0.85 |
| **(3) Ndp | 1.6355 | 1.6355 | 1.8054 | 1.6320 | 1.6320 | 1.6320 | 1.6320 | 2.0017 | 1.7512 | 1.7613 |
| **(4) vd1 | 42.7 | 42.7 | 42.7 | 40.8 | 40.8 | 40.8 | 40.8 | 34.0 | 40.8 | 40.8 |
| **(5) D12/f | 3.36 | 3.38 | 3.29 | 3.57 | 3.15 | 2.52 | 5.28 | 4.42 | 3.36 | 4.64 |
| **(6) D23/f | 1.19 | 1.14 | 1.15 | 1.06 | 1.47 | 1.02 | 0.61 | 1.74 | 2.37 | 1.80 |
| **(7) D34/f | 1.56 | 1.62 | 1.37 | 1.48 | 1.42 | 1.21 | 0.82 | 1.76 | 1.65 | 1.73 |
| **(8) DA1 | 0.45 | 0.45 | 0.45 | 0.14 | 0.14 | 0.14 | 0.14 | <0.20 | 0.14 | 0.14 |
| **(9) Yr/2f-1 | −0.001 | 0.000 | −0.001 | −0.003 | −0.002 | 0.057 | −0.108 | 0.482 | 0.207 | 0.290 |
| **(10) Y'/TL | 0.15 | 0.15 | 0.15 | 0.15 | 0.16 | 0.20 | 0.13 | 0.17 | 0.16 | 0.16 |
| **(11) |Ep|/Lb | 3.68 | 3.77 | 3.59 | 3.47 | 4.33 | 4.18 | 2.64 | 4.11 | 3.77 | 3.41 |
| **(12) Hk1 | 685 | 685 | 685 | 730 | 730 | 730 | 730 | 751 | 730 | 730 |
| **(13) DS1 | <0.01 | <0.01 | <0.01 | <0.01 | <0.01 | <0.01 | <0.01 | — | <0.01 | <0.01 |

*All the conditional expressions are not listed because expressions numbered as ( ) and ( )' are the same conditional expressions
**Conditional expression

TABLE 2

| | Example 11 | Example 12 | Example 13 | Example 14 | Example 15 | Example 16 | Example 17 | Example 18 | Example 19 | Example 20 |
|---|---|---|---|---|---|---|---|---|---|---|
| **(1) vdp | 25.6 | 24.4 | 23.4 | 23.9 | 27.1 | 28.3 | 23.4 | 20.6 | 23.4 | 23.4 |
| **(2) |Hp|/Rp | 0.77 | 0.79 | 0.78 | 0.76 | 0.74 | 0.74 | 0.76 | 0.80 | 0.69 | 0.81 |
| **(3) Ndp | 1.6142 | 1.6209 | 1.6320 | 1.6345 | 1.6070 | 1.6028 | 1.6320 | 2.0017 | 1.6320 | 1.6320 |
| **(4) vd1 | 42.7 | 46.6 | 46.5 | 37.4 | 46.5 | 46.5 | 46.5 | 40.8 | 42.7 | 42.7 |
| **(5) D12/f | 4.42 | 2.97 | 2.79 | 3.50 | 3.09 | 3.54 | 3.02 | 3.15 | 1.62 | 2.14 |
| **(6) D23/f | 1.93 | 1.15 | 1.24 | 1.49 | 1.50 | 1.54 | 1.72 | 1.24 | 0.41 | 0.45 |

TABLE 2-continued

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| **(7) D34/f | 1.29 | 1.11 | 1.04 | 1.47 | 1.45 | 1.47 | 1.21 | 1.38 | 0.69 | 0.23 |
| **(8) DA1 | 0.45 | 0.37 | 0.46 | 0.58 | 0.46 | 0.46 | 0.46 | 0.14 | 0.45 | 0.45 |
| **(9) Yr/2f-1 | 0.101 | −0.070 | −0.120 | 0.036 | −0.015 | 0.012 | −0.174 | 0.041 | −0.075 | −0.028 |
| **(10) Y'/TL | 0.16 | 0.16 | 0.16 | 0.16 | 0.16 | 0.16 | 0.16 | 0.17 | 0.20 | 0.19 |
| **(11) \|Ep\|/Lb | 2.67 | 3.11 | 3.17 | 4.18 | 4.04 | 3.87 | 2.20 | 4.23 | 2.18 | 2.35 |
| **(12) Hk1 | 685 | 755 | 760 | 695 | 760 | 760 | 760 | 730 | 685 | 685 |
| **(13) DS1 | <0.01 | 0.02-0.20 | 0.02-0.20 | 0.03 | 0.02-0.20 | 0.02-0.20 | 0.02-0.20 | <0.01 | <0.01 | <0.01 |

**Conditional expression

TABLE 3

|  | Example 21 | Example 22 | Example 23 |
|---|---|---|---|
| Conditional expression (1) vdp | 20.6 | 23.4 | 23.4 |
| Conditional expression (2) \|Hp\|/Rp | 0.85 | 0.80 | 0.75 |
| Conditional expression (3) Ndp | 2.0017 | 1.6320 | 1.6320 |
| Conditional expression (4) vd1 | 34.0 | 42.7 | 42.7 |
| Conditional expression (5) D12/f | 3.90 | 1.92 | 2.01 |
| Conditional expression (6) D23/f | 0.29 | 0.53 | 0.51 |
| Conditional expression (7) D34/f | 1.70 | 1.19 | 0.72 |
| Conditional expression (8) DA1 | <0.20 | 0.45 | 0.45 |
| Conditional expression (9) Yr/2f − 1 | 0.481 | −0.132 | −0.103 |
| Conditional expression (10) Y'/TL | 0.16 | 0.17 | 0.20 |
| Conditional expression (11) \|Ep\|/Lb | 4.07 | 4.94 | 2.27 |
| Conditional expression (12) Hk1 | 751 | 685 | 685 |
| Conditional expression (13) DS1 | — | <0.01 | <0.01 |

As stated above, wide-angle optical systems 1A to 1W in the aforesaid Examples 1 to 23 satisfy the required conditions relating to the present invention. As a result, they have more excellent optical properties, achieve to be compact sufficiently for being mounted on digital apparatus, especially for being mounted on an onboard monitor camera or on a mobile terminal, and are capable of achieving cost reduction. In addition, the wide-angle optical systems 1A to 1W in the aforesaid Examples 1 to 23 are capable of achieving a super wide angle which is a total angle of view of 180° or more, in particular.

Although the present invention has been fully and appropriately described in the foregoing by way of embodiments with reference to the accompanying drawings, it is to be understood that various changes and improvements will be apparent to those skilled in the art. Therefore, unless otherwise such changes and improvements depart from the scope of the present invention descried in claims hereinafter defined, they should be construed as being included therein.

The invention claimed is:

1. A wide-angle optical system comprising:
a front lens group;
a rear lens group; and
an aperture stop arranged between the front lens group and the rear lens group,
wherein the front lens group includes at least two negative lenses and at least one positive lens,
at least one of a positive lens or positive lenses in the front lens group includes at least one aspheric surface, and
the front lens group satisfies the following conditional expression:

$$vdp < 29,$$

where vdp is a minimum Abbe number of the positive lens or positive lenses in the front lens group,
wherein the wide-angle optical system satisfies the following conditional expression:

$$Y'/TL > 0.1,$$

where Y' is a maximum image height, and
TL is a distance along an optical axis from a surface vertex on a lens surface arranged at a closest position to an object, to an image plane, where a back focal length is measured in an air conversion length, and
wherein the at least one positive lens satisfies the following conditional expression:

$$|Hp|/Rp > 0.65,$$

where Hp is a height (a distance from an optical axis) of a principal ray of a light flux corresponding to a maximum image height on an object-side surface of the at least one positive lens, and
Rp is a maximum effective radius of the object-side surface of the at least one positive lens.

2. The wide-angle optical system of claim 1,
wherein the at least one positive lens satisfies the following conditional expression:

$$Ndp > 1.6,$$

where Ndp is a refractive index of the positive lens.

3. The wide-angle optical system of claim 1,
wherein the front lens group consists of three lenses, and the rear lens group consists of one lens.

4. The wide-angle optical system of claim 1,
wherein the front lens group consists of four lenses, and the rear lens group consists of two lenses.

5. The wide-angle optical system of claim 1,
wherein the front lens group consists of three lenses, and the rear lens group consists of two lenses.

6. The wide-angle optical system of claim 1,
wherein a first lens and a second lens are defined by numbering in order from an object side of the wide-angle optical system, and
the first lens and the second lens satisfy the following conditional expression:

$$2.1 < D12/f < 5.3,$$

where D12 is a distance on an optical axis between the first lens and the second lens, and
f is a focal length of a total system of the wide-angle optical system.

7. The wide-angle optical system of claim 1,
wherein a second lens and a third lens are defined by numbering in order from an object side of the wide-angle optical system, and
the second lens and the third lens satisfy the following conditional expression:

$$1 < D23/f < 2.2,$$

where D23 is a distance on an optical axis between the second lens and the third lens, and f is a focal length of a total system of the wide-angle optical system.

8. The wide-angle optical system of claim 1,
wherein a third lens and a fourth lens are defined by numbering in order from an object side of the wide-angle optical system, and
the third lens and the fourth lens satisfy the following conditional expression:

$1.1 < D34/f < 1.77$, where D34 is a distance on an optical axis between the third lens and the fourth lens, and
f is a focal length of a total system of the wide-angle optical system.

9. The wide-angle optical system of claim 1,
wherein the front lens group includes two negative meniscus lenses whose convex surfaces face an object side of the wide-angle optical system and a biconvex positive lens, arranged in order from the object side, and
the rear lens group includes a biconvex positive lens.

10. The wide-angle optical system of claim 1,
wherein the wide-angle optical system includes a negative meniscus lens whose convex surface faces an object side of the wide-angle optical system, a negative lens, a biconvex lens, an aperture stop, a biconvex lens, a negative meniscus lens whose convex surface faces an image side of the wide-angle optical system, and a biconvex lens, arranged in order from the object side.

11. The wide-angle optical system of claim 1,
wherein the wide-angle optical system includes a negative meniscus lens whose convex surface faces an object side of the wide-angle optical system, a negative lens, a biconvex lens, a positive lens, an aperture stop, a positive lens, and a negative meniscus lens whose convex surface faces an image side of the wide-angle optical system, arranged in order from the object side.

12. The wide-angle optical system of claim 1,
wherein the wide-angle optical system includes a negative meniscus lens whose convex surface faces an object side of the wide-angle optical system, a negative lens, a positive lens, an aperture stop, a biconvex lens, and a negative meniscus lens whose convex surface faces an image side of the wide-angle optical system, arranged in order from the object side.

13. The wide-angle optical system of claim 1,
wherein a second lens is defined by numbering in order from an object side of the wide-angle optical system, and
the second lens is a lens made of a resin material, including at least one aspheric surface.

14. The wide-angle optical system of claim 1,
wherein the wide-angle optical system satisfies the following conditional expression for a principal ray of a light flux with a half angle of view of 90 degrees:

$-0.3 < (Yr/2f) - 1 < 0.7$, where Yr is a position (distance from an optical axis) of the principal ray on an image plane, and
f is a focal length of a total system of the wide-angle optical system.

15. A wide-angle optical system comprising:
a front lens group;
a rear lens group; and
an aperture stop arranged between the front lens group and the rear lens group,
wherein the front lens group includes at least two negative lenses and at least one positive lens,
at least one of a positive lens or positive lenses in the front lens group includes at least one aspheric surface, and
the front lens group satisfies the following conditional expression:

$vdp < 29$, where vdp is a minimum Abbe number of the positive lens or positive lenses in the front lens group, and
wherein a lens arranged at a closest position to an object is a glass lens and satisfies the following conditional expression:

$DA1 < 0.35$ where DA1 is a value representing acid-resistance which is obtained by putting powder of a glass material of the lens arranged at the closest position to the object into nitric acid solution with a concentration of 0.01 mol/l, heating the nitric acid solution in a boiling bath, and measuring a reduced mass (%) of the powder of the glass material as the value representing acid-resistance.

16. The wide-angle optical system of claim 15, wherein the front lens group consists of three lenses, and the rear lens group consists of one lens.

17. A wide-angle optical system comprising:
a front lens group;
a rear lens group; and
an aperture stop arranged between the front lens group and the rear lens group,
wherein the front lens group includes at least two negative lenses and at least one positive lens,
at least one of a positive lens or positive lenses in the front lens group includes at least one aspheric surface, and
the front lens group satisfies the following conditional expression:

$vdp < 29$, where vdp is a minimum Abbe number of the positive lens or positive lenses in the front lens group,
wherein the wide-angle optical system satisfies the following conditional expression:

$Y'/TL > 0.1$, where Y' is a maximum image height, and
TL is a distance along an optical axis from a surface vertex on a lens surface arranged at a closest position to an object, to an image plane, where a back focal length is measured in an air conversion length, and
wherein a lens arranged at a closest position to an object is a negative lens which satisfies the following conditional expression:

$33 < vd1 < 47$, where vd1 is an Abbe number of the lens arranged at the closest position to the object.

18. The wide-angle optical system of claim 17,
wherein the front lens group consists of three lenses, and the rear lens group consists of one lens.

19. The wide-angle optical system of claim 17,
wherein a second lens and a third lens are defined by numbering in order from an object side of the wide-angle optical system, and
the second lens and the third lens satisfy the following conditional expression:

$1 < D23/f < 2.2$, where D23 is a distance on an optical axis between the second lens and the third lens, and f is a focal length of a total system of the wide-angle optical system.

20. The wide-angle optical system of claim 17,
wherein a third lens and a fourth lens are defined by numbering in order from an object side of the wide-angle optical system, and
the third lens and the fourth lens satisfy the following conditional expression:

$1.1 < D34/f < 1.77$, where D34 is a distance on an optical axis between the third lens and the fourth lens, and
f is a focal length of a total system of the wide-angle optical system.

\* \* \* \* \*